(12) United States Patent
Tamori et al.

(10) Patent No.: US 11,519,741 B2
(45) Date of Patent: Dec. 6, 2022

(54) INFORMATION PROCESSING DEVICE, INFORMATION PROCESSING METHOD, AND MOBILE UNIT

(71) Applicant: SONY CORPORATION, Tokyo (JP)

(72) Inventors: Masahiro Tamori, Kanagawa (JP); Atsushi Ochiai, Kanagawa (JP); Tomoya Fujita, Saitama (JP); Chao Wang, Tokyo (JP); Masaomi Nabeta, Tokyo (JP); Keisuke Maeda, Tokyo (JP); Takamori Yamaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 240 days.

(21) Appl. No.: 16/769,506

(22) PCT Filed: Nov. 30, 2018

(86) PCT No.: PCT/JP2018/044128
§ 371 (c)(1),
(2) Date: Jun. 3, 2020

(87) PCT Pub. No.: WO2019/116925
PCT Pub. Date: Jun. 20, 2019

(65) Prior Publication Data
US 2021/0190515 A1    Jun. 24, 2021

(30) Foreign Application Priority Data

Dec. 14, 2017 (JP) .............................. JP2017-239263
Jun. 13, 2018 (JP) .............................. JP2018-112817

(51) Int. Cl.
*G01C 21/34*    (2006.01)
*G01C 21/36*    (2006.01)
*G06Q 10/08*    (2012.01)

(52) U.S. Cl.
CPC ...... *G01C 21/3438* (2013.01); *G01C 21/3492* (2013.01); *G01C 21/3691* (2013.01); *G06Q 10/08355* (2013.01)

(58) Field of Classification Search
CPC .......... G06Q 10/08355; G01C 21/3691; G01C 21/3492; G01C 21/3438
(Continued)

(56) References Cited

U.S. PATENT DOCUMENTS 7,152,828 B1 * 12/2006 Garcia, Jr. ............. B64D 39/04
                                                     244/135 A
7,837,151 B1 * 11/2010 Garcia, Jr. ............ B64C 39/024
                                                     244/135 R
(Continued)

FOREIGN PATENT DOCUMENTS

CN      1608269 A      4/2005
EP      1468387 A2    10/2004
(Continued)

OTHER PUBLICATIONS

International Search Report and Written Opinion of PCT Application No. PCT/JP2018/044128, dated Feb. 26, 2019, 11 pages of ISRWO.

*Primary Examiner* — Yazan A Soofi
(74) *Attorney, Agent, or Firm* — Chip Law Group

(57) ABSTRACT

Provided is an information processing device that includes a planning unit that sets a joining route on the basis of information about at least one of a planned route of a user mobile unit that uses a service or a planned route of a provider mobile unit that provides the service, the joining route being a zone for the user mobile unit and the provider mobile unit to receive and provide the service, and makes a movement plan including at least one of a route plan for the user mobile unit or a route plan for the provider mobile unit based on the joining route. The information processing
(Continued)

device further includes a service provision unit that controls provision of the service so that the user mobile unit and the provider mobile unit receive and provide the service while moving on the joining route.

18 Claims, 53 Drawing Sheets

(58) Field of Classification Search
USPC .......................................................... 701/422
See application file for complete search history.

(56) References Cited

U.S. PATENT DOCUMENTS

| | | | |
|---|---|---|---|
| 9,261,373 B2* | 2/2016 | Su | G01C 21/3667 |
| 2003/0125963 A1* | 7/2003 | Haken | G06Q 10/08355 |
| | | | 705/26.1 |
| 2003/0144871 A1* | 7/2003 | Turbeville | G06Q 10/08 |
| | | | 705/404 |
| 2008/0250423 A1* | 10/2008 | Bush | G08G 5/0034 |
| | | | 701/423 |
| 2009/0045290 A1* | 2/2009 | Small | B64C 39/024 |
| | | | 244/135 A |
| 2010/0321011 A1 | 12/2010 | Small et al. | |
| 2011/0276510 A1 | 11/2011 | Turbeville et al. | |
| 2012/0323474 A1* | 12/2012 | Breed | B60W 30/18154 |
| | | | 701/117 |
| 2013/0289876 A1* | 10/2013 | Gutman | G01C 21/00 |
| | | | 701/537 |
| 2013/0304378 A1* | 11/2013 | Graells | H04W 4/42 |
| | | | 701/533 |
| 2015/0168147 A1* | 6/2015 | Duleba | G01C 21/3484 |
| | | | 701/538 |
| 2016/0334236 A1* | 11/2016 | Mason | G01C 21/3461 |
| 2016/0364823 A1* | 12/2016 | Cao | G06Q 10/1095 |
| 2017/0191845 A1* | 7/2017 | Marueli | G01C 21/20 |
| 2018/0051996 A1* | 2/2018 | Katsuki | B60W 30/095 |
| 2018/0372503 A1* | 12/2018 | Bagchi | G01C 21/3492 |
| 2019/0377349 A1* | 12/2019 | van der Merwe | G05D 1/0257 |
| 2020/0050198 A1* | 2/2020 | Donnelly | G06Q 50/30 |
| 2021/0140787 A1* | 5/2021 | Zilberman | G01C 21/3679 |
| 2022/0198388 A1* | 6/2022 | Simpson | G06Q 20/4015 |

FOREIGN PATENT DOCUMENTS

| | | |
|---|---|---|
| EP | 2140439 A2 | 1/2010 |
| EP | 2185416 A2 | 5/2010 |
| JP | 2003-063656 A | 3/2003 |
| JP | 2005-514707 A | 5/2005 |
| JP | 2010-523395 A | 7/2010 |
| JP | 2010-536633 A | 12/2010 |
| JP | 2012-121700 A | 6/2012 |
| WO | 2003/058526 A2 | 7/2003 |
| WO | 2008/124216 A2 | 10/2008 |
| WO | 2009/073052 A2 | 6/2009 |

* cited by examiner

FIG. 7

| EVALUATION ITEM | COEFFICIENT | K1 | K2 | K3 |
|---|---|---|---|---|
| FEE | 0.5 | 1 | 2 | 5 |
| ROUTE FLEXIBILITY | 1 | 5 | 2 | 3 |
| JOINING TIME | 2 | 1 | 3 | 3 |
| LOAD AMOUNT | 3 | 1 | 2 | 3 |
| TOTAL EVALUATION VALUE | | 10.5 | 15 | 20.5 |

FIG. 8

| EVALUATION ITEM | COEFFICIENT | K1 | K2 | K3 |
|---|---|---|---|---|
| FEE | 0.5 | 1 | 2 | 5 |
| ROUTE FLEXIBILITY | 1 | 5 | 2 | 3 |
| ARRIVAL TIME | 2 | 1 | 3 | 3 |
| INFLUENCE ON OTHER DELIVERIES | 3 | 1 | 2 | 3 |
| SERVICE SUFFICIENCY | 1 | 2 | 2 | 1 |
| PROVISION DIFFICULTY | 2 | 3 | 1 | 2 |
| TOTAL EVALUATION VALUE | | 18.5 | 19 | 25.5 |

|    | K1 | K2 | K3 | K4 |
|----|----|----|----|----|
| H1 | P  | S  |    |    |
| H2 |    |    |    |    |
| H3 |    |    |    |    |
| H4 |    |    |    |    |

|  | K1 | K2 | K3 | K4 |
|---|---|---|---|---|
| H1 | P |  |  |  |
| H2 | P |  |  |  |
| H3 |  |  |  |  |
| H4 |  |  |  |  |

|  | K1 | K2 | K3 | K4 |
|---|---|---|---|---|
| H1 |  | P |  |  |
| H2 | P |  |  |  |
| H3 |  |  |  |  |
| H4 |  |  |  |  |

|    | K1 | K2 | K3 | K4 |
|----|----|----|----|----|
| H1 | P  |    |    |    |
| H2 |    |    |    |    |
| H3 | P  |    |    |    |
| H4 |    |    |    |    |

|    | K1 | K2 | K3 | K4 |
|----|----|----|----|----|
| H1 |    | P  |    |    |
| H2 |    |    |    |    |
| H3 | P  |    |    |    |
| H4 |    |    |    |    |

FIG. 41

| TIME | AMOUNT OF CHANGE IN POSITION IN HEIGHT DIRECTION (mm) | | HEIGHT DIFFERENCE BETWEEN VEHICLES (mm) | CONTROL AMOUNT (mm) | |
|---|---|---|---|---|---|
| | PROVIDER VEHICLE | USER VEHICLE | | SUPPLY PORT | HEIGHT |
| t0 | — | — | 0 | 0 | 0 |
| t1 | +300 | 0 | +300 | +200 | +100 |
| t2 | +100 | +200 | +200 | +200 | 0 |
| t3 | −200 | +100 | −100 | −100 | 0 |

INFORMATION PROCESSING DEVICE, INFORMATION PROCESSING METHOD, AND MOBILE UNIT

CROSS REFERENCE TO RELATED APPLICATIONS

This application is a U.S. National Phase of International Patent Application No. PCT/JP2018/044128 filed on Nov. 30, 2018, which claims priority benefit of Japanese Patent Application No. JP 2018-112817 filed in the Japan Patent Office on Jun. 13, 2018 and also claims priority benefit of Japanese Patent Application No. JP 2017-239263 filed in the Japan Patent Office on Dec. 14, 2017. Each of the above-referenced applications is hereby incorporated herein by reference in its entirety.

TECHNICAL FIELD

The present technology relates to an information processing device, an information processing method, a program, and a mobile unit, and more particularly, to an information processing device, an information processing method, a program, and a mobile unit that are suitable for use in providing services between mobile units.

BACKGROUND ART

There has been a suggested technique by which an information management center compares the route information about the vehicle A the orderer of a product is on with the route information about the delivery vehicle B for the product, the route information about the two vehicles is changed so that the two vehicles pass through a rendezvous point, and the orderer receives the product from the person in charge of the delivery vehicle B when the two vehicles arrive at the rendezvous point (see Patent Document 1, for example).

CITATION LIST

Patent Document

Patent Document 1: Japanese Patent Application Laid-Open No. 2012-121700

SUMMARY OF THE INVENTION

Problems to be Solved by the Invention

However, Patent Document 1 does not teach that the two vehicles hand over and receive the product while moving ahead.

The present technology has been made in view of such circumstances, and is to enable provision of a service such as delivery of a product from a mobile unit such as a vehicle to another mobile unit that is moving.

Solutions to Problems

An information processing device according to a first aspect of the present technology includes: a planning unit that sets a joining route on the basis of information about at least one of a planned route of a user mobile unit that is a mobile unit to use a service or a planned route of a provider mobile unit that is a mobile unit to provide the service, the joining route being a zone for the user mobile unit and the provider mobile unit to receive and provide the service, and makes a movement plan including at least one of a route plan for the user mobile unit or a route plan for the provider mobile unit in accordance with the joining route; and a service provision unit that controls provision of the service so that the user mobile unit and the provider mobile unit receive and provide the service while moving on the joining route.

An information processing method according to the first aspect of the present technology is implemented by an information processing device, and includes: setting a joining route on the basis of information about at least one of a planned route of a user mobile unit that is a mobile unit to use a service or a planned route of a provider mobile unit that is a mobile unit to provide the service, the joining route being a zone for the user mobile unit and the provider mobile unit to receive and provide the service, and making a movement plan including at least one of a route plan for the user mobile unit or a route plan for the provider mobile unit in accordance with the joining route; and controlling provision of the service so that the user mobile unit and the provider mobile unit receive and provide the service while moving on the joining route.

A program according to the first aspect of the present technology causes a computer to perform a process including: setting a joining route on the basis of information about at least one of a planned route of a user mobile unit that is a mobile unit to use a service or a planned route of a provider mobile unit that is a mobile unit to provide the service, the joining route being a zone for the user mobile unit and the provider mobile unit to receive and provide the service, and making a movement plan including at least one of a route plan for the user mobile unit or a route plan for the provider mobile unit in accordance with the joining route; and controlling provision of the service so that the user mobile unit and the provider mobile unit receive and provide the service while moving on the joining route.

A mobile unit according to a second aspect of the present technology includes: a planning unit that sets a joining route on the basis of information about at least one of a planned route of a user mobile unit that is a mobile unit to use a service or a planned route of the mobile unit, the joining route being a zone for performing provision/reception of the service with the user mobile unit, and makes a movement plan including a route plan in accordance with the joining route; a service provision unit that controls provision of the service so that the service is provided to the user mobile unit on the joining route; and a service provision unit that controls provision of the service so that provision/reception of the service is conducted while the mobile unit is moving with the user mobile unit on the joining route.

A mobile unit according to a third aspect of the present technology includes: a planning unit that sets a joining route on the basis of information about at least one of a planned route of a provider mobile unit that is a mobile unit to provide a service or a planned route of the mobile unit, the joining route being a zone for performing provision/reception of the service with the provider mobile unit, and makes a movement plan including a route plan in accordance with the joining route; and a service use unit that controls use of the service so that provision/reception of the service is conducted while the mobile unit is moving together with the provider mobile unit on the joining route.

In the first aspect of the present technology, a joining route that is a zone for a user mobile unit and a provider mobile unit to receive and provide a service is set on the basis of information about at least one of a planned route of the user mobile unit that is a mobile unit to use the service or a planned route of the provider mobile unit that is a mobile unit to provide the service, and a movement plan including at least one of a route plan for the user mobile unit or a route plan for the provider mobile unit in accordance with the joining route is made. The service is provided so that the user mobile unit and the provider mobile unit receive and provide the service while moving on the joining route.

In the second aspect of the present technology, a joining route that is a zone for performing provision/reception of a service with a user mobile unit is set on the basis of information about at least one of a planned route of the user mobile unit that is a mobile unit to use the service or a planned route of the mobile unit, and a movement plan including a route plan in accordance with the joining route is made. The service is provided so that provision/reception of the service is conducted while the mobile unit is moving together with the user mobile unit on the joining route.

In the third aspect of the present technology, a joining route that is a zone for performing provision/reception of a service with a provider mobile unit is set on the basis of information about at least one of a planned route of the provider mobile unit that is a mobile unit to provide the service or a planned route of the mobile unit, and a movement plan including a route plan in accordance with the joining route is made. The service is used so that provision/reception of the service is conducted while the mobile unit is moving together with the provider mobile unit on the joining route.

Effects of the Invention

According to the first through third aspects of the present technology, a mobile unit can provide a service to another mobile unit that is moving.

Note that the effects of the present technology are not limited to the effects described herein, and may include any of the effects described in the present disclosure.

BRIEF DESCRIPTION OF DRAWINGS

FIG. 7 is a diagram showing an example of an evaluation table.

FIG. 8 is a diagram showing an example of an evaluation table.

FIG. 41 is a diagram for explaining a specific example of pitch control.

MODE FOR CARRYING OUT THE INVENTION

The following is a description of a mode for carrying out the present technology. Explanation will be made in the following order.

Figure 1:
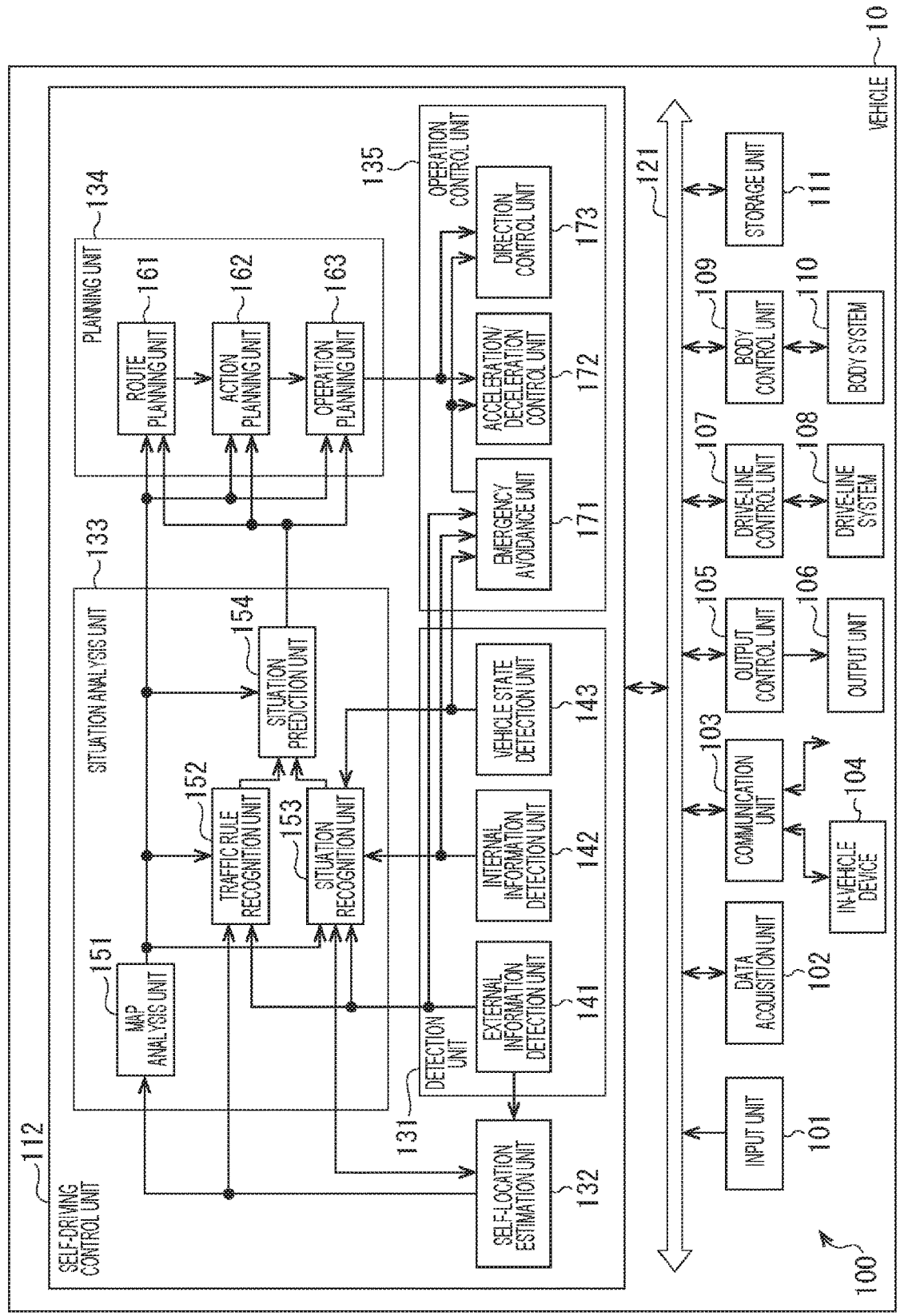
FIG. 1 is a block diagram schematically showing an example functional configuration of a vehicle control system to which the present technology can be applied.

1. Example configuration of a vehicle control system
2. Embodiment
3. Modifications
4. Other aspects 1. Example Configuration of a Vehicle Control System FIG. 1 is a block diagram schematically showing an example functional configuration of a vehicle control system 100 that is an example of a moving object control system to which the present technology can be applied.

The vehicle control system 100 is a system that is provided in a vehicle 10 and performs various kinds of controls on the vehicle 10. Note that, in a case where the vehicle 10 is distinguished from other vehicles, the vehicle 10 will be referred to as the subject vehicle or the subject vehicle.

The vehicle control system 100 includes an input unit 101, a data acquisition unit 102, a communication unit 103, an in-vehicle device 104, an output control unit 105, an output unit 106, a drive-line control unit 107, a drive-line system 108, a body control unit 109, a body system 110, a storage unit 111, and a self-driving control unit 112. The input unit 101, the data acquisition unit 102, the communication unit 103, the output control unit 105, the drive-line control unit 107, the body control unit 109, the storage unit 111, and the self-driving control unit 112 are connected to one another via a communication network 121. The communication network 121 is formed with an in-vehicle communication network compliant with an appropriate standard, such as a controller area network (CAN), a local interconnect network (LIN), a local area network (LAN), or FlexRay (registered trademark), for example. Note that the respective components of the vehicle control system 100 may be connected directly to one another in some cases without the communication network 121.

Note that, in the description below, in a case where the respective components of the vehicle control system 100 perform communication via the communication network 121, any description of the communication network 121 will be omitted. For example, in a case where the input unit 101 and the self-driving control unit 112 perform communication via the communication network 121, the communication will be described simply as communication performed between the input unit 101 and the self-driving control unit 112.

The input unit 101 includes devices that are used by a passenger to input various kinds of data, instructions, and the like. For example, the input unit 101 includes operation devices such as a touch panel, buttons, a microphone, switches, and a lever, and operation devices through which inputs can be made by a method other than a manual operation, such as by voice, gestures, or the like. Further, the input unit 101 may be a remote control device using infrared rays or other radio waves, or an external connection device such as a mobile device or a wearable device compatible with operation of the vehicle control system 100, for example. The input unit 101 generates an input signal on the basis of data, an instruction, or the like that is input by a passenger, and supplies the input signal to the respective components of the vehicle control system 100.

The data acquisition unit 102 includes various kinds of sensors and the like that acquire data to be used in processing to be performed by the vehicle control system 100, and supplies the acquired data to the respective components of the vehicle control system 100.

For example, the data acquisition unit 102 includes various kinds of sensors for detecting the state of the vehicle 10 and the like. Specifically, the data acquisition unit 102 includes a gyroscope sensor, an acceleration sensor, an inertia measurement unit (IMU), and a sensor or the like for detecting an amount of operation of an accelerator pedal, an amount of operation of a brake pedal, a steering angle of a steering wheel, an engine speed, a motor rotation speed, a rotation speed of the wheels, or the like, for example.

The data acquisition unit 102 also includes various kinds of sensors for detecting information about the outside of the vehicle 10, for example. Specifically, the data acquisition unit 102 includes imaging devices such as a time-of-flight (ToF) camera, a stereo camera, a monocular camera, an infrared camera, and other kinds of cameras, for example. The data acquisition unit 102 also includes an environment sensor for detecting weather, climate, or the like, and an ambient information detection sensor for detecting objects around the vehicle 10, for example. The environment sensor is formed with a raindrop sensor, a fog sensor, a sunshine sensor, a snow sensor, or the like, for example. The ambient information detection sensor is formed with an ultrasonic sensor, a radar, or a light detection and ranging or laser imaging detection and ranging (LIDAR) device, a sonar, or the like, for example.

The data acquisition unit 102 further includes various kinds of sensors for detecting the current location of the vehicle 10, for example. Specifically, the data acquisition unit 102 includes a GNSS receiver that receives a GNSS signal from a global navigation satellite system (GNSS) satellite, or the like, for example.

The data acquisition unit 102 also includes various kinds of sensors for detecting information about the inside of the vehicle, for example. Specifically, the data acquisition unit 102 includes an imaging device that captures images of the driver, a biological sensor that detects biological information about the driver, a microphone that collects sound in the vehicle, and the like, for example. The biological sensor is disposed on a seating surface or the steering wheel or the like, for example, and detects biological information about the passenger sitting on the seat or the driver holding the steering wheel.

The communication unit 103 communicates with the in-vehicle device 104 and various devices outside the vehicle, such as servers and base stations. The communication unit 103 transmits data supplied from the respective components of the vehicle control system 100, and supplies received data to the respective components of the vehicle control system 100. Note that the communication protocol supported by the communication unit 103 is not limited to any particular one, and the communication unit 103 can also support a plurality of kinds of communication protocols.

For example, the communication unit 103 performs wireless communication with the in-vehicle device 104 through a wireless LAN, Bluetooth (registered trademark), near field communication (NFC), a wireless USB (WUSB), or the like. The communication unit 103 also performs wired communication with the in-vehicle device 104 through a universal serial bus (USB), a high-definition multimedia interface (HDMI), a mobile high-definition link (MHL), or the like via a connecting terminal (not shown) (and a cable, if necessary), for example.

The communication unit 103 further performs communication with a device (an application server or a control server, for example) existing in an external network (the Internet, a cloud network, or a company-specific network, for example) via a base station or an access point, for example. The communication unit 103 also performs communication with a terminal (a terminal of a pedestrian or a shop, or a machine type communication (MTC) terminal, for example) existing in the vicinity of the vehicle 10, using the peer-to-peer (P2P) technology, for example. The communication unit 103 further conducts V2X communication, such as vehicle-to-vehicle communication, vehicle-to-infrastructure communication, communication between the vehicle 10 and home (vehicle-to-home), and vehicle-to-pedestrian communication, for example. The communication unit 103 also includes a beacon reception unit, to receive radio waves or electromagnetic waves transmitted from a wireless station or the like installed on a road, and acquire information such as the current location, traffic congestion, closing of a road, or a required time, for example.

The in-vehicle device 104 includes a mobile device or a wearable device possessed by a passenger, an information device that is carried into or attached to the vehicle 10, a navigation device that searches for a route to a desired destination, and the like, for example.

The output control unit 105 controls outputs of various kinds of information to a passenger of the vehicle 10 or the outside of the vehicle. For example, the output control unit 105 generates an output signal including at least one piece of visual information (image data, for example) and audio information (audio data, for example), and supplies the output signal to the output unit 106, to control outputs of visual information and audio information from the output unit 106. Specifically, the output control unit 105 generates an overhead image, a panoramic image, or the like by combining image data captured by different imaging devices of the data acquisition unit 102, for example, and supplies an output signal including the generated image to the output unit 106. The output control unit 105 also generates audio data including a warning sound, a warning message, or the like for danger such as a collision, contact, or entry into a dangerous zone, for example, and supplies an output signal including the generated audio data to the output unit 106.

The output unit 106 includes devices capable of outputting visual information or audio information to a passenger of the vehicle 10 or to the outside the vehicle. For example, the output unit 106 includes a display device, an instrument panel, an audio speaker, headphones, a wearable device such as a spectacle-like display to be worn by a passenger, a projector, a lamp, and the like. The display device included in the output unit 106 is not necessarily a device with a conventional display, but may be a display that displays visual information in the driver's field of view, such as a head-up display, a transmissive display, or a display having an augmented reality (AR) display function, for example.

The drive-line control unit 107 generates various kinds of control signals, and supplies the control signals to the drive-line system 108, to control the drive-line system 108. The drive-line control unit 107 also supplies control signals to the respective components other than the drive-line system 108 as necessary, and notifies the other components of a control state of the drive-line system 108 or the like.

The drive-line system 108 includes various kinds of devices related to the drive-line of the vehicle 10. For example, the drive-line system 108 includes a driving force generator for generating a driving force such as an internal combustion engine or a driving motor, a driving force transmission mechanism for transmitting the driving force to the wheels, a steering mechanism for adjusting the steering angle, a braking device that generates a braking force, an antilock brake system (ABS), an electronic stability control (ESC), an electric power steering device, and the like.

The body control unit 109 generates various kinds of control signals, and supplies the control signals to the body system 110, to control the body system 110. The body control unit 109 also supplies control signals to the respective components other than the body system 110 as necessary, and notifies the other components of a control state of the body system 110 or the like.

The body system 110 includes various kinds of body devices that are mounted on the vehicle body. For example, the body system 110 includes a keyless entry system, a smart key system, a powered window device, powered seats, a steering wheel, an air conditioner, various lamps (headlamps, tail lamps, a brake lamp, a blinker, a fog lamp, and the like, for example), and the like.

The storage unit 111 includes a read only memory (ROM), a random access memory (RAM), a magnetic storage device such as a hard disc drive (HDD), a semiconductor storage device, an optical storage device, a magneto-optical storage device, and the like, for example. The storage unit 111 stores various kinds of programs, data, and the like to be used by the respective components of the vehicle control system 100. For example, the storage unit 111 stores map data such as a three-dimensional high-precision map such as a dynamic map, a global map that is less precise than a high-precision map but covers a wider area, and a local map that includes information about the surroundings of the vehicle 10.

The self-driving control unit 112 performs control related to self-driving such as autonomous running or drive assist. Specifically, the self-driving control unit 112 performs cooperative control to achieve the functions of an advanced driver assistance system (ADAS), including collision avoidance or shock mitigation of the vehicle 10, follow-up running based on the distance between vehicles, vehicle speed maintenance running, a collision warning for the vehicle 10, a lane deviation warning for the vehicle 10, or the like, for example. The self-driving control unit 112 also performs cooperative control to conduct self-driving or the like to autonomously travel without depending on the operation by the driver, for example. The self-driving control unit 112 includes a detection unit 131, a self-location estimation unit 132, a situation analysis unit 133, a planning unit 134, and an operation control unit 135.

The detection unit 131 detects various kinds of information necessary for controlling self-driving. The detection unit 131 includes an external information detection unit 141, an internal information detection unit 142, and a vehicle state detection unit 143.

The external information detection unit 141 performs a process of detecting information about the outside of the vehicle 10, on the basis of data or signals from the respective components of the vehicle control system 100. For example, the external information detection unit 141 performs a process of detecting, recognizing, and tracking an object around the vehicle 10, and a process of detecting the distance to the object. Examples of objects to be detected include vehicles, people, obstacles, structures, roads, traffic lights, traffic signs, road signs, and the like. The external information detection unit 141 also performs a process for detecting the environment around the vehicle 10, for example. The ambient environments to be detected include weather, temperature, humidity, brightness, road surface conditions, and the like, for example. The external information detection unit 141 supplies data indicating the results of the detection processes to the self-location estimation unit 132, a map analysis unit 151, a traffic rule recognition unit 152, and a situation recognition unit 153 of the situation analysis unit 133, an emergency avoidance unit 171 of the operation control unit 135, and the like.

The internal information detection unit 142 performs a process of detecting information about the inside of the vehicle, on the basis of data or signals from the respective components of the vehicle control system 100. For example, the internal information detection unit 142 performs a process of authenticating and recognizing the driver, a process of detecting the state of the driver, a process of detecting a passenger, a process of detecting the internal environment of the vehicle, and the like. The states of the driver to be detected includes physical conditions, an arousal level, a concentration level, a fatigue level, a gaze direction, and the like, for example. The internal environments to be detected include temperature, humidity, brightness, odor, and the like, for example. The internal information detection unit 142 supplies data indicating the results of the detection processes to the situation recognition unit 153 of the situation analysis unit 133, the emergency avoidance unit 171 of the operation control unit 135, and the like.

The vehicle state detection unit 143 performs a process of detecting a state of the vehicle 10, on the basis of data or signals from the respective components of the vehicle control system 100. The states of the vehicle 10 to be detected include a velocity, an acceleration, a steering angle, presence/absence and details of an abnormality, a driving operation state, powered seat positions and tilts, a door lock state, states of the other in-vehicle devices, and the like, for example. The vehicle state detection unit 143 supplies data indicating the results of the detection processes to the situation recognition unit 153 of the situation analysis unit 133, the emergency avoidance unit 171 of the operation control unit 135, and the like.

The self-location estimation unit 132 performs a process of estimating the position, the posture, and the like of the vehicle 10, on the basis of data or signals from the respective components of the vehicle control system 100, such as the external information detection unit 141 and the situation recognition unit 153 of the situation analysis unit 133. The self-location estimation unit 132 also generates a local map (hereinafter referred to as the self-location estimation map) to be used for self-location estimation, as necessary. The self-location estimation map is a highly accurate map using a technique such as simultaneous localization and mapping (SLAM), for example. The self-location estimation unit 132 supplies data indicating the result of the estimation process to the map analysis unit 151, the traffic rule recognition unit 152, the situation recognition unit 153, and the like of the situation analysis unit 133. The self-location estimation unit 132 also stores the self-location estimation map into the storage unit 111.

The situation analysis unit 133 performs an analysis process on the situation of the vehicle 10 and the surroundings. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 while using data or signals from the respective components of the vehicle control system 100, such as the self-location estimation unit 132 and the external information detection unit 141, as necessary, and constructs a map that includes the information necessary for a self-driving process. The map analysis unit 151 supplies the constructed map to the traffic rule recognition unit 152, the situation recognition unit 153, the situation prediction unit 154, and a route planning unit 161, an action planning unit 162, an operation planning unit 163, and the like of the planning unit 134.

The traffic rule recognition unit 152 performs a process of recognizing the traffic rules in the surroundings of the vehicle 10, on the basis of data or signals from the respective components of the vehicle control system 100, such as the self-location estimation unit 132, the external information detection unit 141, and the map analysis unit 151. Through this recognition process, the positions and the states of signals around the vehicle 10, the contents of traffic restrictions around the vehicle 10, the lanes that allow running, and the like are recognized, for example. The traffic rule recognition unit 152 supplies data indicating the results of a recognition process to the situation prediction unit 154 and the like.

The situation recognition unit 153 performs a process of recognizing a situation relating to the vehicle 10, on the basis of data or signals from the respective components of the vehicle control system 100, such as the self-location estimation unit 132, the external information detection unit 141, the internal information detection unit 142, the vehicle state detection unit 143, and the map analysis unit 151. For example, the situation recognition unit 153 performs a process of recognizing the situation of the vehicle 10, the situation of the surroundings of the vehicle 10, the situation of the driver of the vehicle 10, and the like. The situation recognition unit 153 also generates a local map (hereinafter referred to as the situation recognition map) to be used for recognition of the situation around the vehicle 10, as necessary. The situation recognition map is an occupancy grid map, for example.

Situations of the vehicle 10 to be recognized include a position, a posture, movement (such as a speed, an acceleration, and a moving direction, for example) of the vehicle 10, presence/absence and the contents of an abnormality, and the like, for example. Situations of the surroundings of the vehicle 10 to be recognized include the types and the positions of stationary objects in the surroundings, the types, the positions, and the movement (such as speeds, accelerations, and moving directions, for example) of moving objects in the surroundings, the configuration of the roads and the states of the road surfaces in the surroundings, the weather, the temperature, the humidity, and brightness of the surroundings, and the like, for example. States of the driver to be recognized includes physical conditions, an arousal level, a concentration level, a fatigue level, movement of a sight line, a driving operation, and the like, for example.

The situation recognition unit 153 supplies data (including the situation recognition map, as necessary) indicating the results of the recognition process to the self-location estimation unit 132, the situation prediction unit 154, and the like. The situation recognition unit 153 also stores the situation recognition map into the storage unit 111.

The situation prediction unit 154 performs a process of predicting a situation related to the vehicle 10, on the basis of data or signals from the respective components of the vehicle control system 100, such as the map analysis unit 151, the traffic rule recognition unit 152, and the situation recognition unit 153. For example, the situation prediction unit 154 performs a process of predicting a situation of the vehicle 10, a situation of the surroundings of the vehicle 10, a situation of the driver, and the like.

Situations of the vehicle 10 to be predicted include a behavior of the vehicle 10, an occurrence of an abnormality, a distance that can be covered, and the like, for example. Situations of the surroundings of the vehicle 10 to be predicted include behaviors of moving objects in the surroundings of the vehicle 10, changes in signal states, changes in the environments such as weather, and the like, for example. Situations of the driver to be predicted include, for example, behaviors, physical conditions, and the like of the driver.

The situation prediction unit 154 supplies data indicating the results of the prediction process, together with the data from the traffic rule recognition unit 152 and the situation recognition unit 153, to the route planning unit 161, the action planning unit 162, the operation planning unit 163, and the like of the planning unit 134.

The route planning unit 161 plans a route to a destination, on the basis of data or signals from the respective components of the vehicle control system 100, such as the map analysis unit 151 and the situation prediction unit 154. For example, the route planning unit 161 sets a route from the current location to a designated destination, on the basis of the global map. The route planning unit 161 also changes routes as appropriate, on the basis of situations such as a traffic jam, an accident, a traffic restriction, and a construction, the physical conditions of the driver, and the like, for example. The route planning unit 161 supplies data indicating the planned route to the action planning unit 162 and the like.

On the basis of data or signals from the respective components of the vehicle control system 100, such as the map analysis unit 151 and the situation prediction unit 154, the action planning unit 162 plans an action of the vehicle 10 to safely travel the route planned by the route planning unit 161 within a planned period of time. For example, the action planning unit 162 plans a start, a stop, a traveling direction (such as a forward direction, a backward direction, a left turn, a right turn, or a change of direction, for example), the current running lane, a running velocity, passing, or the like.

The action planning unit 162 supplies data indicating the planned action of the vehicle 10 to the operation planning unit 163 and the like.

On the basis of data or signals from the respective components of the vehicle control system 100, such as the map analysis unit 151 and the situation prediction unit 154, the operation planning unit 163 plans an operation of the vehicle 10 to realize the action planned by the action planning unit 162. For example, the operation planning unit 163 plans acceleration, deceleration, a traveling track, or the like. The operation planning unit 163 supplies data indicating the planned operation of the vehicle 10 to an acceleration/deceleration control unit 172, a direction control unit 173, and the like of the operation control unit 135.

The operation control unit 135 controls operation of the vehicle 10. The operation control unit 135 includes the emergency avoidance unit 171, the acceleration/deceleration control unit 172, and the direction control unit 173.

The emergency avoidance unit 171 performs a process of detecting an emergency situation such as a collision, contact, entry into a danger zone, an abnormality of the driver, an abnormality of the vehicle 10, or the like, on the basis of results of detection performed by the external information detection unit 141, the internal information detection unit 142, and the vehicle state detection unit 143. In a case where an occurrence of an emergency situation is detected, the emergency avoidance unit 171 plans an operation of the vehicle 10 to avoid an emergency situation such as a sudden stop or a sudden turn. The emergency avoidance unit 171 supplies data indicating the planned operation of the vehicle 10 to the acceleration/deceleration control unit 172, the direction control unit 173, and the like.

The acceleration/deceleration control unit 172 performs acceleration/deceleration control for realizing an operation of the vehicle 10 planned by the operation planning unit 163 or the emergency avoidance unit 171. For example, the acceleration/deceleration control unit 172 calculates a control target value for a driving force generator or a braking device to perform planned acceleration, deceleration, or a sudden stop, and supplies a control command indicating the calculated control target value to the drive-line control unit 107.

The direction control unit 173 performs direction control for realizing an operation of the vehicle 10 planned by the operation planning unit 163 or the emergency avoidance unit 171. For example, the direction control unit 173 calculates a control target value for the steering mechanism to travel a traveling track or perform a sudden turn planned by the operation planning unit 163 or the emergency avoidance unit 171, and supplies a control command indicating the calculated control target value to the drive-line control unit 107.

2. Embodiment

Referring now to FIGS. 2 through 35, an embodiment of the present technology is described.

Note that this embodiment mainly relates to the processes to be performed by the self-location estimation unit 132, the situation analysis unit 133, the planning unit 134, and the operation control unit 135 of the vehicle control system 100 shown in FIG. 1.

<Example Configuration of a Service Provision/Reception System>

Figure 2:
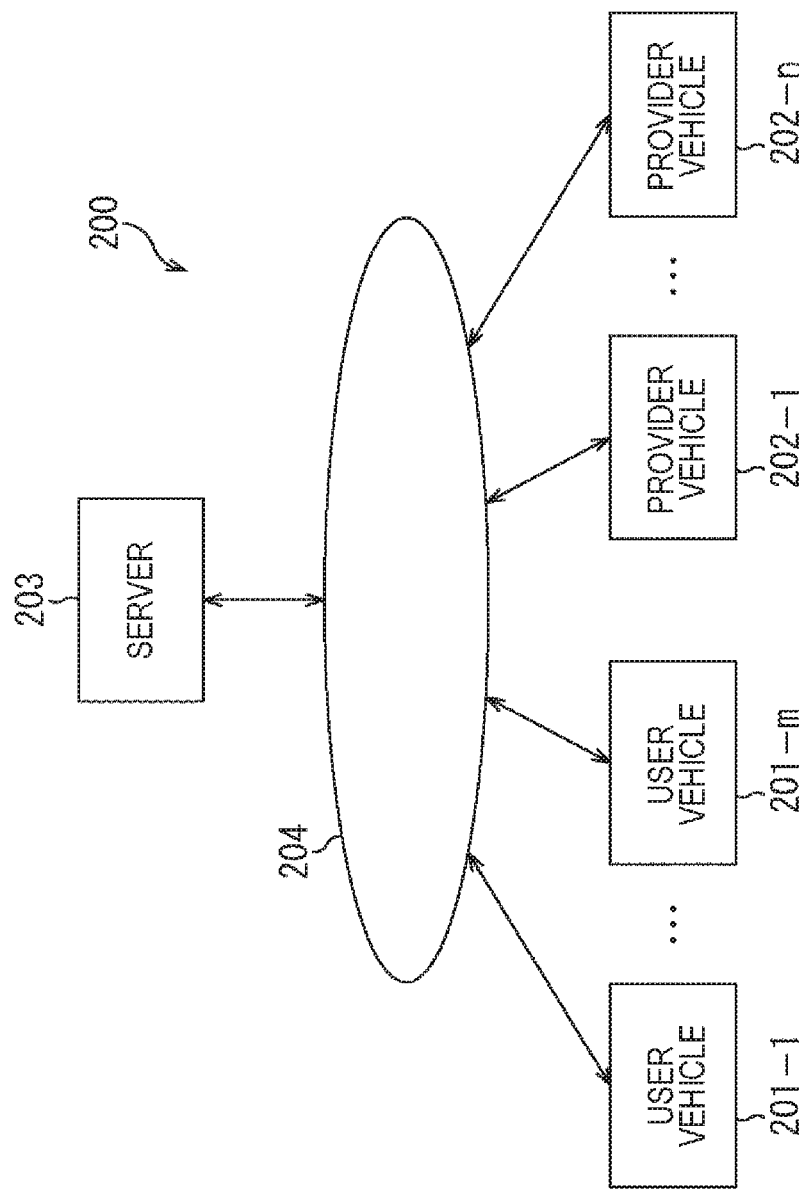
FIG. 2 is a block diagram showing an embodiment of a service provision/reception system to which the present technology is applied.

FIG. 2 is a block diagram showing an example configuration of a service provision/reception system 200 according to an embodiment of the present technology.

The service provision/reception system 200 is a system for realizing service provision/reception between vehicles that are moving.

Note that the services to be provided through the service provision/reception system 200 are not limited to any particular services, as long as the services can be provided and received between vehicles that are moving. For example, conceivable services to be provided include deliveries of money and goods such as cash, packages, merchandise, and foods, energy supplies, mobile stores or mobile facilities such as convenience stores, kiosks, karaoke services, AV theaters that show movies and the like, baths, showers, and toilets, and the like. Note that, in the description below, services for delivering packages, merchandise, foods, and the like will be mainly explained as examples.

The service provision/reception system 200 includes user vehicles 201-1 through 201-m, provider vehicles 202-1 through 202-n, and a server 203. The user vehicles 201-1 through 201-m, the provider vehicles 202-1 through 202-n, and the server 203 are connected to one another via a network 204, and can communicate with one another.

Note that the user vehicles 201-1 through 201-m can communicate directly with one another, and the provider vehicles 202-1 through 202-n can communicate directly with one another, without the network 204.

The user vehicles 201-1 through 201-m are each formed with the vehicle 10 in FIG. 1, and are vehicles that can use services being provided by the provider vehicles 202-1 through 202-n.

The provider vehicles 202-1 through 202-n are each formed with the vehicle 10 shown in FIG. 1, and are vehicles that can provide services to the user vehicles 201-1 through 201-m.

The server 203 distributes services and the like so that the services are smoothly provided. For example, the server 203 receives an order for a service from the user vehicles 201-1 through 201-m, selects an appropriate vehicle from among the provider vehicles 202-1 through 202-n, and requests the selected vehicle to provide the service.

Note that, in the description below, in a case where there is no need to distinguish the user vehicles 201-1 through 201-m from one another, the user vehicles 201-1 through 201-m will be referred to simply as the user vehicles 201. Also, in the description below, in a case where there is no need to distinguish the provider vehicles 202-1 through 202-n from one another, the provider vehicles 202-1 through 202-n will be referred to simply as the provider vehicles 202.

<Example Configuration of a User Vehicle>

Figure 3:
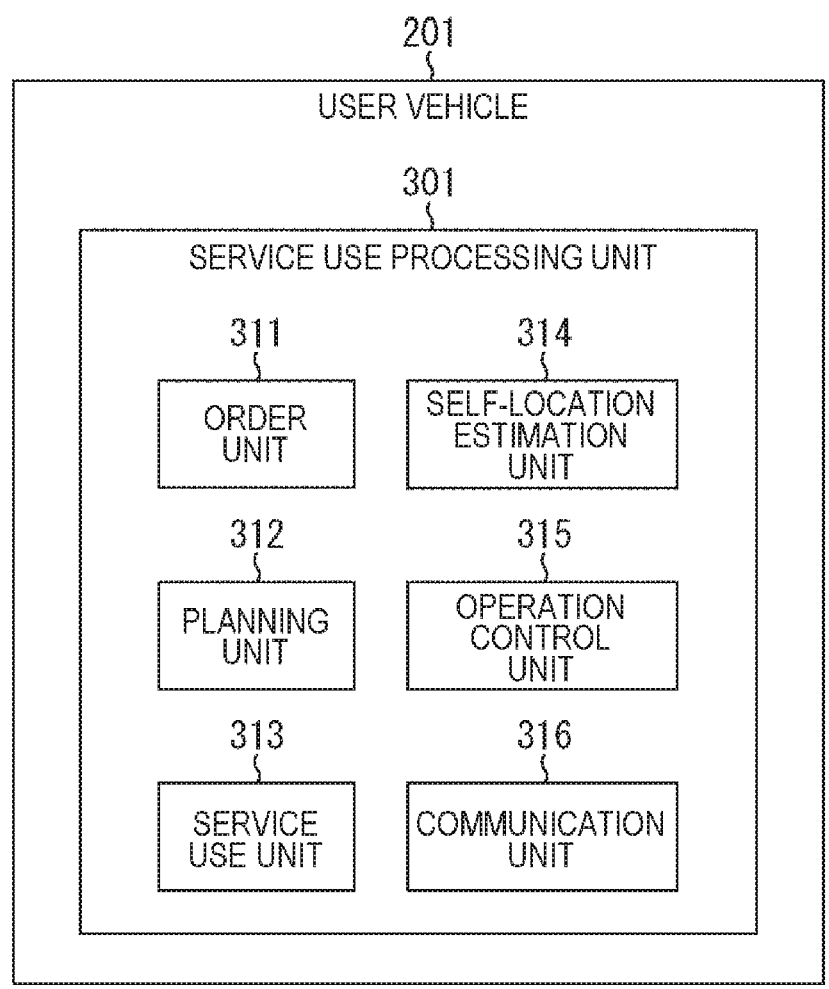
FIG. 3 is a block diagram showing an example configuration of the functions of a user vehicle.

FIG. 3 is a block diagram showing an example configuration of a user vehicle 201.

The user vehicle 201 includes a service use processing unit 301. The service use processing unit 301 includes an order unit 311, a planning unit 312, a service use unit 313, a self-location estimation unit 314, an operation control unit 315, and a communication unit 316.

The order unit 311 performs a service ordering process with the server 203 via the communication unit 316 and the network 204.

The planning unit 312 makes a travel plan of the user vehicle 201. For example, the planning unit 312 communicates with a provider vehicle 202 via the communication unit 316 and, if necessary, the network 204, to set a joining route that is the zone in which the user vehicle 201 joins the provider vehicle 202 and receives a service, and plan a route and a velocity in accordance with the joining route.

The service use unit 313 performs various kinds of processes for using services being provided by the provider vehicle 202.

The self-location estimation unit 314 performs a process of estimating the position, the posture, and the like of the user vehicle 201, on the basis of data or signals from the respective components of the vehicle control system 100, such as the external information detection unit 141 and the situation recognition unit 153 of the situation analysis unit 133.

The operation control unit 315 controls operation of the user vehicle 201.

The communication unit 316 communicates with the server 203 via the network 204. The communication unit 316 also communicates with a provider vehicle 202 via the network 204 as necessary. Note that any appropriate wireless communication method can be used as the communication method for the communication unit 316.

<Example Configuration of a Provider Vehicle>

Figure 4:
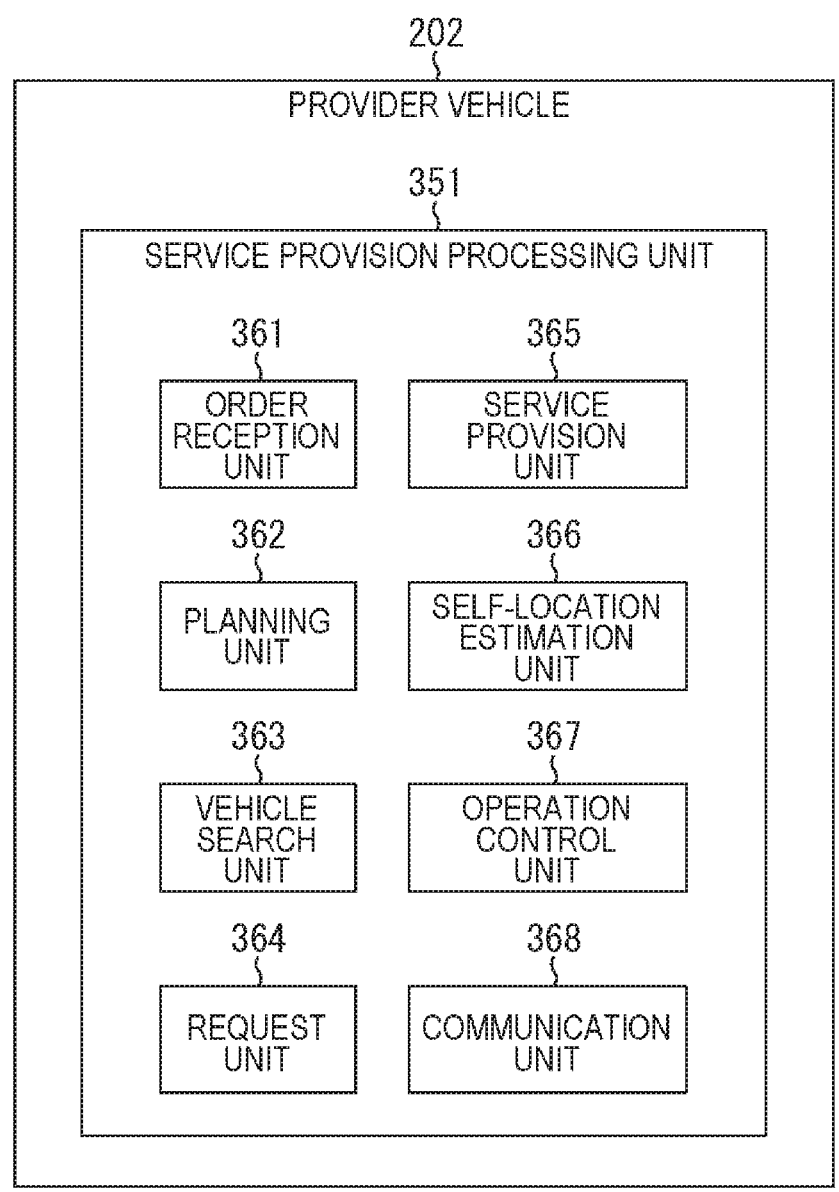
FIG. 4 is a block diagram showing an example configuration of the functions of a provider vehicle.

FIG. 4 is a block diagram showing an example configuration of a provider vehicle 202.

The provider vehicle 202 includes a service provision processing unit 351. The service provision processing unit 351 includes an order reception unit 361, a planning unit 362, a vehicle search unit 363, a request unit 364, a service provision unit 365, a self-location estimation unit 366, an operation control unit 367, and a communication unit 368.

The order reception unit 361 performs a service order reception process with the server 203 via the communication unit 368 and the network 204. The order reception unit 361 also performs a service order reception process with another provider vehicle 202 via the communication unit 368 and, if necessary, the network 204.

The planning unit 362 makes a travel plan of the provider vehicle 202. For example, the planning unit 362 communicates with a user vehicle 201 and another provider vehicle 202 via the communication unit 368 and, if necessary, the network 204, to set a joining route that is the zone in which the provider vehicle 202 joins the user vehicle 201 and provides or receives a service, and plan a route and a velocity in accordance with the joining route.

The vehicle search unit 363 communicates with other provider vehicles 202 via the communication unit 368 and, if necessary, the network 204, and searches for a provider vehicle 202 that can provide a service. Alternatively, the vehicle search unit 363 requests the server 203 to search for a vehicle that can provide the service via the communication unit 368 and the network 204.

The request unit 364 performs a process of requesting another provider vehicle 202 to provide a service, via the communication unit 368 and, if necessary, the network 204.

The service provision unit 365 performs various kinds of processes for providing a service to a user vehicle 201. For example, the service provision unit 365 controls service provision so that the user vehicle 201 and the provider vehicle 202 can receive and provide a service while running on the joining route. The service provision unit 365 also obtains from or delivers to another provider vehicle 202 things to be used for providing a service.

The self-location estimation unit 366 performs a process of estimating the position, the posture, and the like of the provider vehicle 202, on the basis of data or signals from the respective components of the vehicle control system 100, such as the external information detection unit 141 and the situation recognition unit 153 of the situation analysis unit 133.

The operation control unit 367 controls operation of the provider vehicle 202.

The communication unit 368 communicates with the server 203 via the network 204. The communication unit 368 also communicates with a user vehicle 201 and another provider vehicle 202 via the network 204 as necessary. Note that any appropriate wireless communication method can be used as the communication method for the communication unit 368.

<Example Configuration of the Server>

Figure 5:
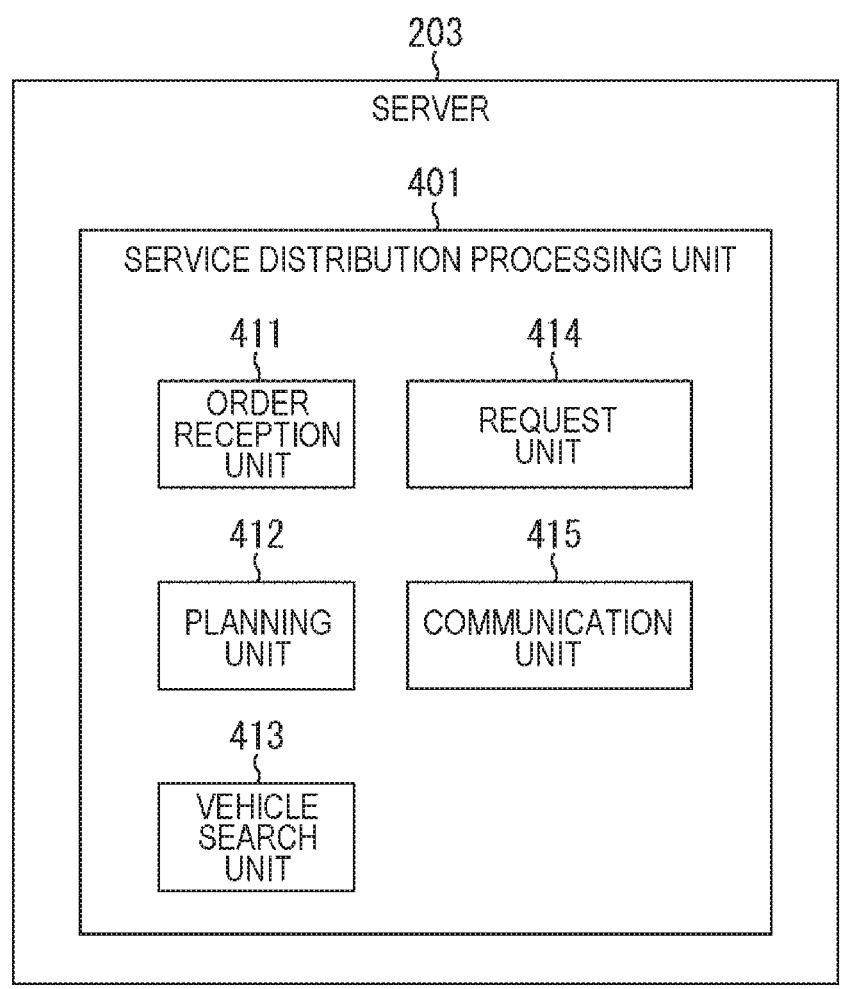
FIG. 5 is a block diagram showing an example configuration of the functions of a server.

FIG. 5 is a block diagram showing an example configuration of the server 203.

The server 203 includes a service distribution processing unit 401. The service distribution processing unit 401 includes an order reception unit 411, a planning unit 412, a vehicle search unit 413, a request unit 414, and a communication unit 415.

The order reception unit 411 communicates with a user vehicle 201 via the communication unit 415 and the network 204, and performs a service order reception process with the user vehicle 201.

The planning unit 412 makes travel plans of the respective user vehicles 201 and the respective provider vehicles 202. For example, the planning unit 412 communicates with a user vehicle 201 and a provider vehicle 202 via the communication unit 415 and the network 204, to set a joining route between the user vehicle 201 and the provider vehicle 202 that receive and provide a service, and plan routes and velocities of the user vehicle 201 and the provider vehicle 202 in accordance with the joining route.

The vehicle search unit 413 communicates with the provider vehicles 202 via the communication unit 415 and the network 204, and searches for a provider vehicle 202 that can provide a service.

The request unit 414 performs a process of distributing orders for services received from the respective user vehicles 201 to the respective provider vehicles 202, on the basis of the results of searches conducted by the vehicle search unit 413, the current locations and the service ordering states of the respective user vehicles 201, the current locations and the service order receiving states of the respective provider vehicles 202, and the congestion and accident states and the like of the respective roads. The request unit 414 also communicates with the provider vehicles 202 via the communication unit 415 and the network 204, to issue a request for service provision, a request for transfer of service provision, and the like.

The communication unit 415 communicates with the user vehicles 201 and the provider vehicles 202 via the network 204. Note that any appropriate wireless or wired communication method can be used as the communication method for the communication unit 415.

<Processes in the Service Provision/Reception System>

Next, processes in the service provision/reception system 200 are described.

<Service Use Process>

Figure 6:
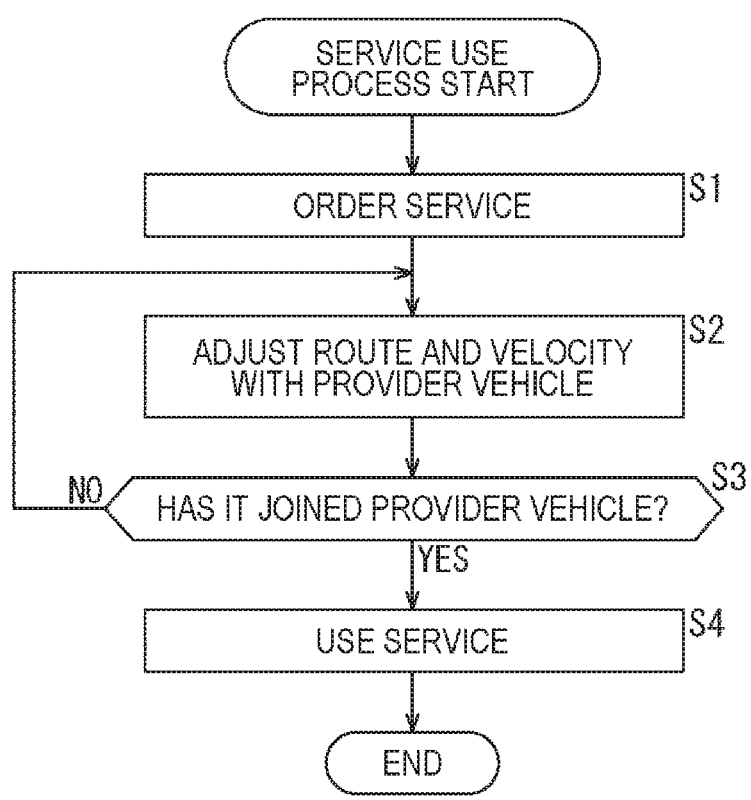
FIG. 6 is a flowchart for explaining a service use process.

Referring first to a flowchart shown in FIG. 6, a service use process to be performed by a user vehicle 201 is described.

This process is started when a user performs an operation for ordering a service, for example.

Note that it is not always necessary to use the facilities in a user vehicle 201 when ordering a service. For example, the user may order a service, using a communication device such as a smartphone or an in-vehicle infotainment (IVI). Further, a service is not necessarily ordered by a passenger of the user vehicle 201. That is, a service may be ordered from inside the user vehicle 201 or from outside the user vehicle 201.

In step S1, the order unit 311 orders a service. For example, the order unit 311 generates service order data indicating the contents of the order for the service. The service order data includes the contents of the service to be requested, the planned route for the user vehicle 201, and evaluation coefficients for the respective items in an evaluation table, for example. The service order data also includes a desired time and a desired place (which is the desired joining route) for using the service, as necessary.

The planned route includes a route on which the user vehicle 201 is to travel, and scheduled arrival times at principal points on the route.

The evaluation table is a table for evaluating each provider vehicle 202, and is used for selecting the provider vehicle 202 that is to provide the service.

The evaluation table in FIG. 7 includes four evaluation items: fee, route flexibility, joining time, and load amount.

The fee is the item for evaluating the fee for the provider vehicle 202 to provide the service. The lower the fee, the greater the evaluation value. The higher the fee, the smaller the evaluation value.

The route flexibility is the item for evaluating the flexibility of routes on which the provider vehicle 202 can travel. The higher the route flexibility, the greater the evaluation value. The lower the route flexibility, the smaller the evaluation value.

Figure 9:
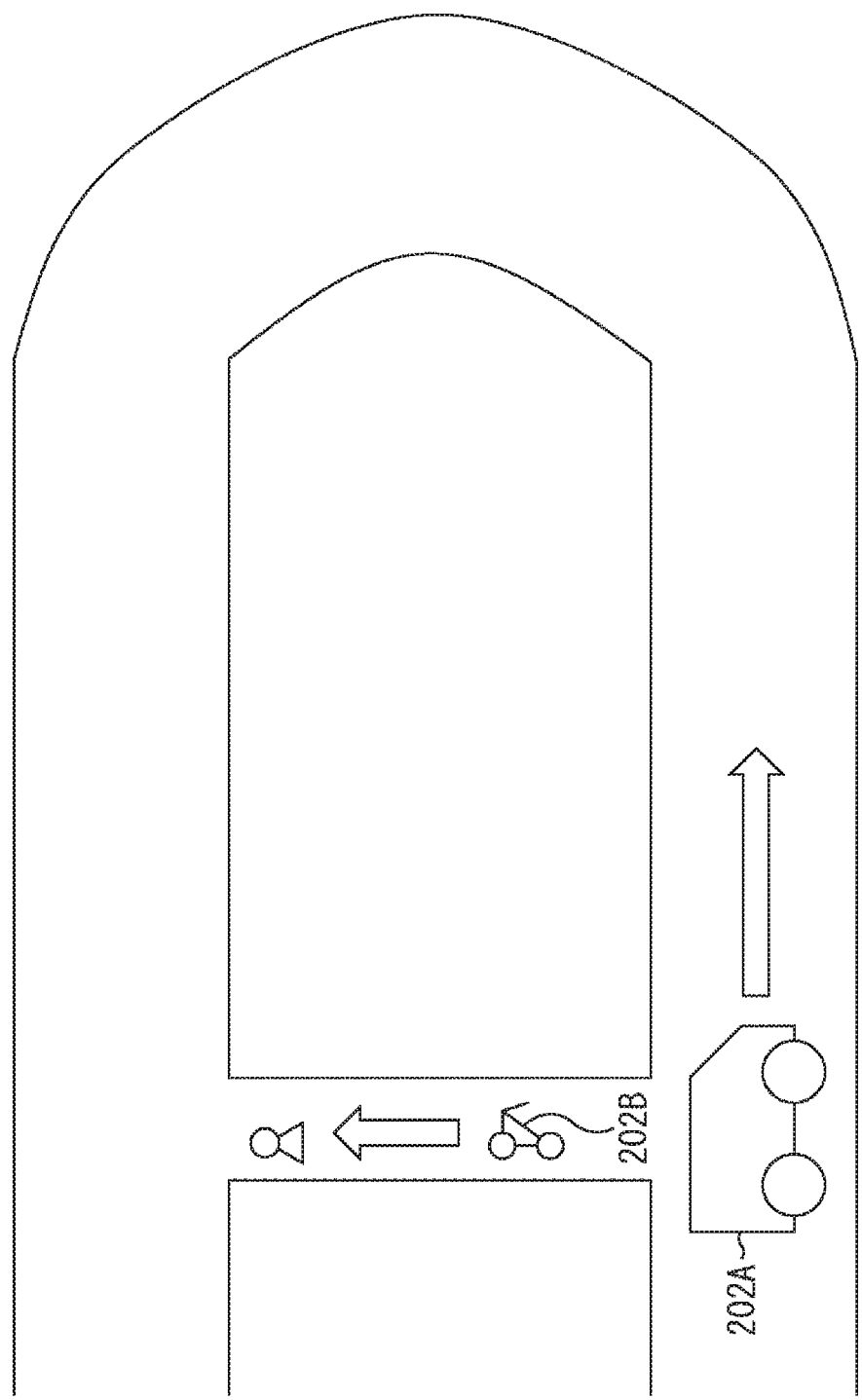
FIG. 9 is a diagram for explaining route flexibility.

For example, a provider vehicle 202 with a higher route flexibility has fewer restrictions on the routes on which the provider vehicle 202 can travel, and a provider vehicle 202 with a lower route flexibility has more restrictions on the routes on which the provider vehicle 202 can travel. For example, as shown in FIG. 9, in a case where a provider vehicle 202A that is a four-wheeled vehicle is compared with a provider vehicle 202B that is a two-wheeled vehicle, the provider vehicle 202B can travel on narrower alleys. Accordingly, the provider vehicle 202B has a greater route flexibility evaluation value than the provider vehicle 202A.

The joining time is the item for evaluating the time required for the provider vehicle 202 to join the user vehicle 201. The shorter the joining time, the greater the evaluation value. The longer the joining time, the smaller the evaluation value. Note that the joining time is a time that has been set on the assumption that the provider vehicle 202 moves to promptly join the user vehicle 201, for example.

For example, the closer the provider vehicle 202A is to the user vehicle 201, the greater the evaluation value. The farther the provider vehicle 202A is from the user vehicle 201, the smaller the evaluation value. Further, the higher the running velocity of the provider vehicle 202A, the greater the evaluation value, for example. The lower the running velocity of the provider vehicle 202A, the smaller the evaluation value, for example.

The load amount is the item for evaluating the load amount of the provider vehicle 202. The smaller the load amount of the provider vehicle 202, the greater the evaluation value. The larger the load amount of the provider vehicle 202, the smaller the evaluation value. For example, a provider vehicle 202 that is receiving fewer orders for services at the present time has a greater evaluation value, and a provider vehicle 202 that is receiving a larger number of orders for services at the present time has a smaller evaluation value. Note that a provider vehicle 202 having a larger load amount needs to provide services to a larger number of user vehicles 201, and it is difficult to adjust the schedule and the like. Therefore, there is a possibility that service provision will be delayed, for example.

FIG. 8 shows another example of the evaluation table. The evaluation table in FIG. 8 differs from the evaluation table in FIG. 7 in that the two evaluation items of service sufficiency and provision difficulty are added.

The service sufficiency is the item for evaluating the level of the service being provided by the provider vehicle 202. The higher the level of the service being provided by the provider vehicle 202, the greater the evaluation value. The lower the level of the service being provided by the provider vehicle 202, the smaller the evaluation value.

For example, in a case where the service being provided is food deliveries, a provider vehicle 202 that can deliver warm food has a great evaluation value. On the other hand, a provider vehicle 202 that cannot deliver warm food has a small evaluation value. Further, in a case where the service being provided is a karaoke room, for example, a provider vehicle 202 that has excellent sound facilities or provides a spacious room has a great evaluation value. On the other hand, a provider vehicle 202 that has poor sound facilities or provides a small room has a smaller evaluation value.

The provision difficulty is the item for evaluating the difficulty for the provider vehicle 202 to provide a service. The lower the difficulty for the provider vehicle 202 to provide a service, the greater the evaluation value. The higher the difficulty for the provider vehicle 202 to provide a service, the smaller the evaluation value.

For example, in a case where the service being provided is delivery of a package, and the size of the package is large, a provider vehicle 202 that is a large-sized vehicle has a great evaluation value, and a provider vehicle 202 that is a two-wheeled vehicle has a small evaluation value.

For example, the user sets a coefficient for each evaluation item in the evaluation table. For example, a large coefficient is set for an item on which the user puts priority, and a small coefficient is set for an item that is not very important.

In the example shown in FIG. 7, coefficients for the respective evaluation items of the fee, the route flexibility, the joining time, and the load amount are set to 0.5, 1, 2, and 3, respectively. In the example in FIG. 8, coefficients for the respective evaluation items of the fee, the route flexibility, the joining time, the load amount, the service sufficiency, and the provision difficulty are set to 0.5, 1, 2, 3, 1, and 2, respectively.

The order unit 311 transmits the service order data to the server 203 via the communication unit 316 and the network 204.

The server 203 that has received the service order data selects the provider vehicle 202 to be requested to provide the service, and requests the selected provider vehicle 202 to provide the service, as described later.

In step S2, the user vehicle 201 adjusts the route and the velocity with the provider vehicle 202. Specifically, the planning unit 312 plans the route and the velocity for joining the provider vehicle 202, while communicating with the provider vehicle 202 via the communication unit 316 and, if necessary, the network 204. The operation control unit 315 controls operation of the provider vehicle 202 so as to travel on the planned route at the planned velocity, and join the provider vehicle 202 on the joining route.

Referring now to FIGS. 10 through 18, specific examples of methods for adjusting a route between a user vehicle 201 and a provider vehicle 202 are described.

Figure 10:
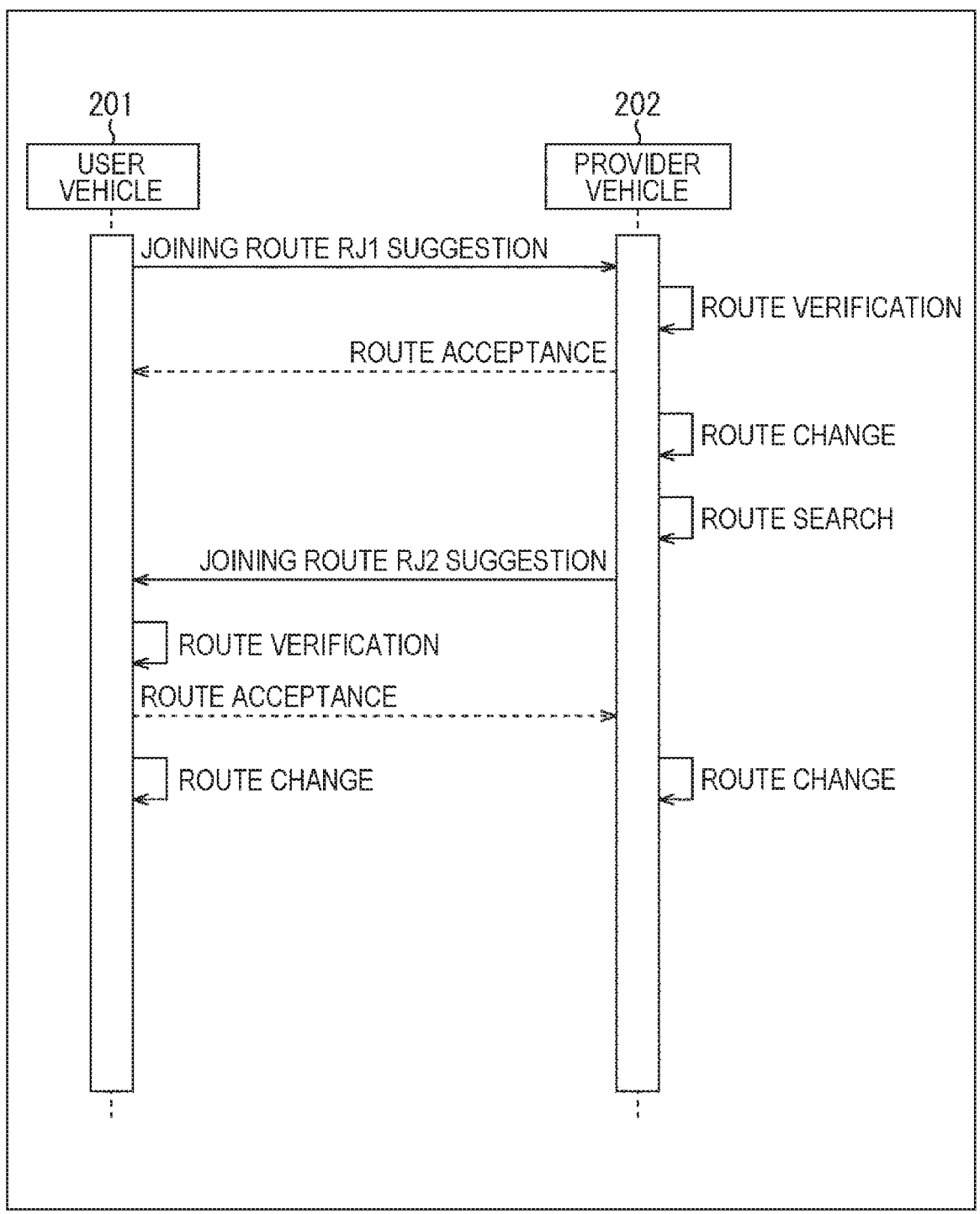
FIG. 10 is a sequence diagram for explaining an example of route adjustment between a user vehicle and a provider vehicle.

FIG. 10 is a sequence diagram showing an example process to be performed in a case where route adjustment is performed between a user vehicle 201 and a provider vehicle 202.

Figure 11:
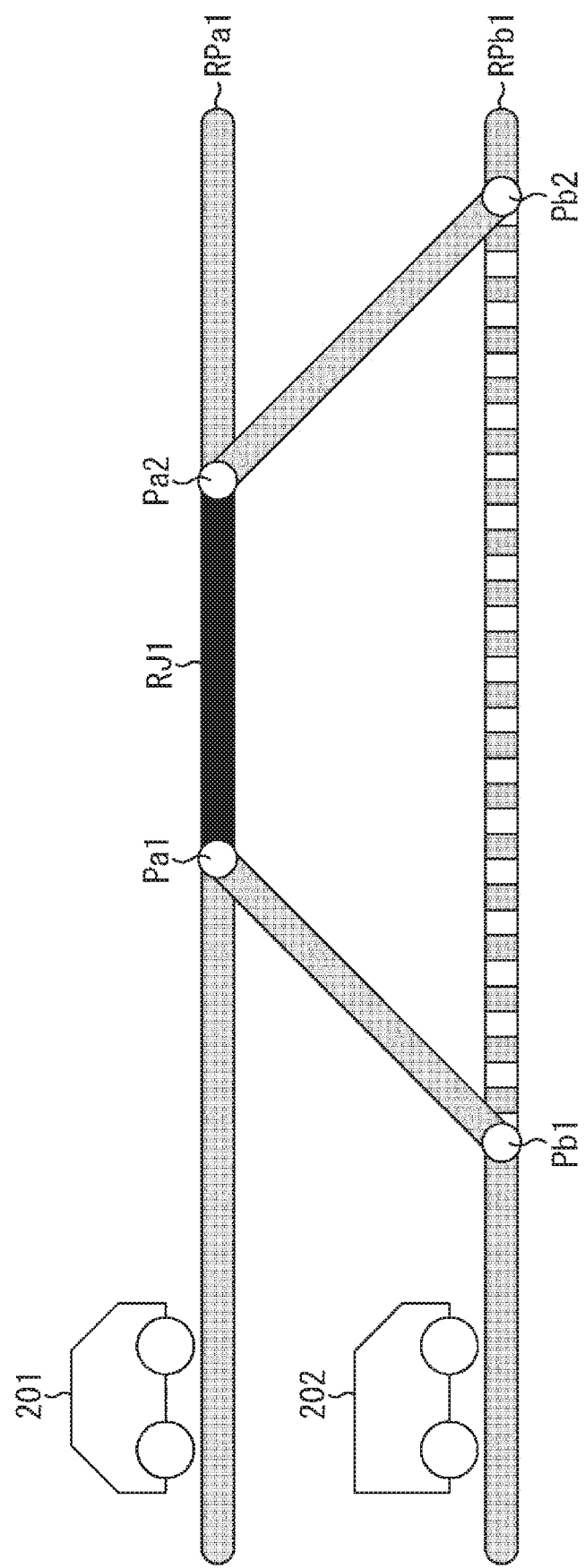
FIG. 11 is a diagram for explaining an example of route adjustment.

For example, in a case where the user vehicle 201 is running on a planned route RPa1, and the provider vehicle 202 is running on a planned route RPb1 as shown in FIG. 11, the user vehicle 201 first suggests to the provider vehicle 202 to accept a joining route RJ1 between a point Pa1 and a point Pa2 on the planned route RPa1. That is, in this case, a joining route on the planned route RPa1 is preferentially suggested.

The provider vehicle 202 verifies whether or not it is possible to join the user vehicle 201 on the joining route RJ1. In a case where the provider vehicle 202 determines that it is possible to join the user vehicle 201 on the joining route RJ1, the provider vehicle 202 notifies the user vehicle 201 that the joining route RJ1 is accepted.

The provider vehicle 202 then changes routes at a point Pb1 on the planned route RPb1, and enters the planned route RPa1 at the point Pa1. At this point of time, the user vehicle 201 and the provider vehicle 202 adjust the velocities so as to reach the point Pa1 at the same time. After that, the user vehicle 201 and the provider vehicle 202 receive and provide a service while running in parallel to the point Pa2. The provider vehicle 202 then leaves the planned route RPa1 at the point Pa2, and returns to the planned route RPb1 at a point Pb2.

Figure 12:
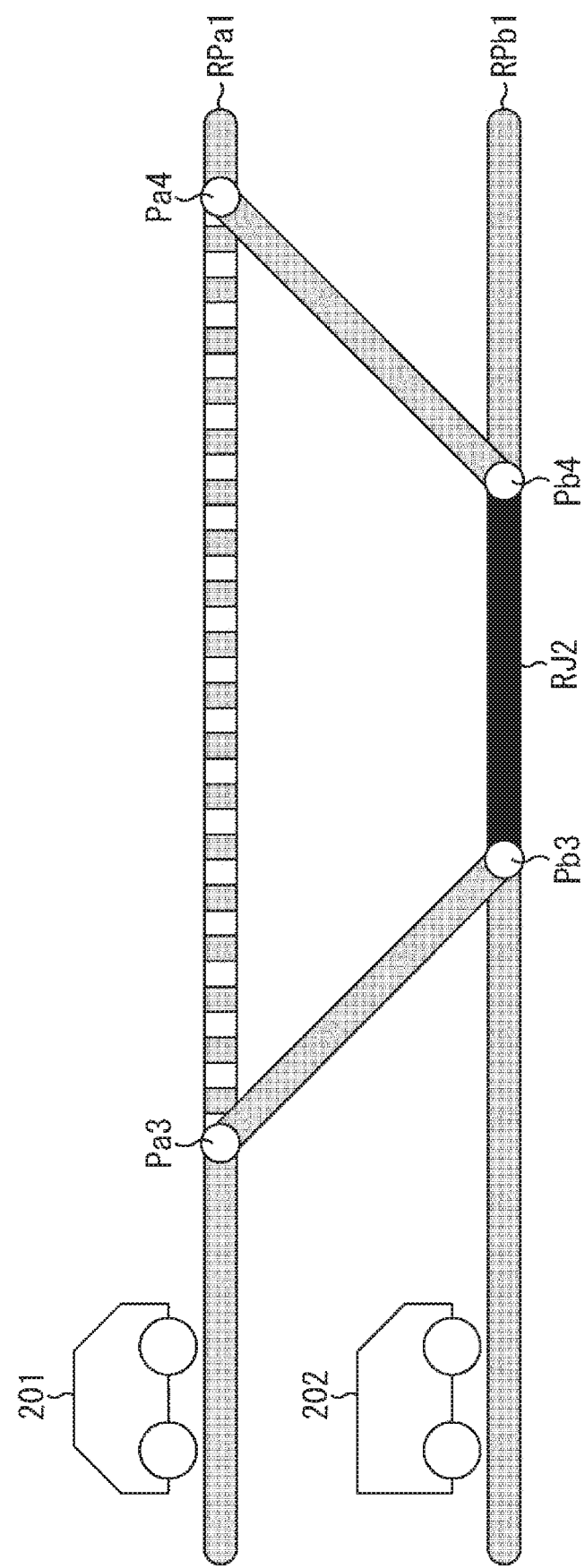
FIG. 12 is a diagram for explaining an example of route adjustment.

On the other hand, in a case where the provider vehicle 202 determines that it is not possible join the user vehicle 201 on the joining route RJ1, the provider vehicle 202 searches for a new joining route. For example, a new joining route is searched for on the planned route RPb1, or on a route that is neither the planned route RPa1 nor the planned route RPb1. The provider vehicle 202 then suggests to the user vehicle 201 to accept a joining route RJ2 between a point Pb3 and a point Pb4 on the planned route RPb1, as shown in FIG. 12, for example.

The user vehicle 201 verifies whether or not it is possible to join the provider vehicle 202 on the joining route RJ2. In a case where the user vehicle 201 determines that it is possible to join the provider vehicle 202 on the joining route RJ2, the user vehicle 201 notifies the provider vehicle 202 that the joining route RJ2 is accepted.

The user vehicle 201 then changes routes at a point Pa3 on the planned route RPa1, and enters the planned route RPb1 at the point Pb3. At this point of time, the user vehicle 201 and the provider vehicle 202 adjust the velocities so as to reach the point Pb3 at the same time. After that, the user vehicle 201 and the provider vehicle 202 receive and provide a service while running in parallel to the point Pb4. The user vehicle 201 then leaves the planned route RPb1 at the point Pb4, and returns to the planned route RPa1 at a point Pa4.

Note that, in a case where the user vehicle 201 determines that it is not possible to join the provider vehicle 202 on the joining route RJ2, the provider vehicle 202 may search for yet another joining route, for example. Alternatively, the provider vehicle 202 may search for another provider vehicle 202 that provides the service instead.

Note that a joining route suggested by the provider vehicle 202 is not necessarily on the planned route RPb1 of the provider vehicle 202.

Figure 13:
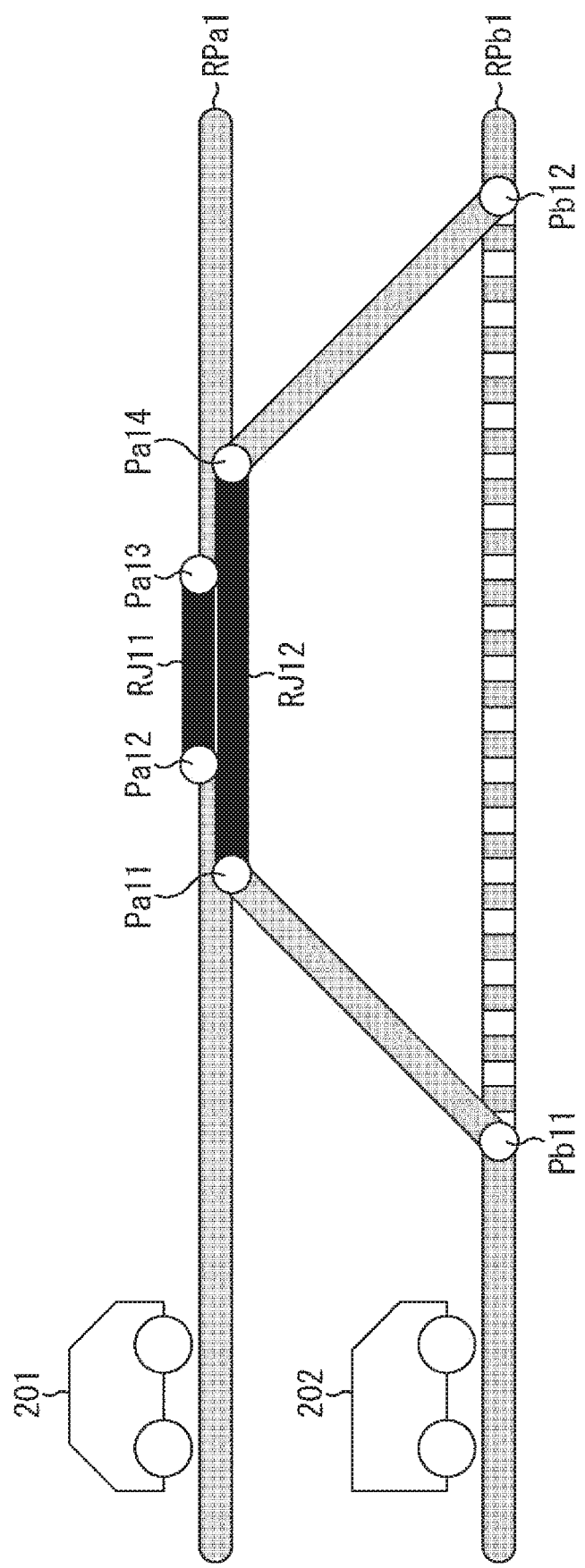
FIG. 13 is a diagram for explaining an example of route adjustment.

For example, as shown in FIG. 13, the provider vehicle 202 may suggest a joining route on the planned route RPa1 of the user vehicle 201.

Specifically, the user vehicle 201 first suggests to the provider vehicle 202 to accept a joining route RJ11 between a point Pa12 and a point Pa13 on the planned route RPa1.

On the other hand, the provider vehicle 202 determines that the service cannot be provided only on the joining route RJ11, and suggests to the provider vehicle 202 to accept a joining route RJ12 that is located between a point Pa11 and a point Pa14 on the planned route RPa1, and is longer than the joining route RJ11.

When the joining route RJ12 is accepted by the user vehicle 201, the provider vehicle 202 then changes routes. Specifically, the provider vehicle 202 changes routes at a point Pb11 on the planned route RPb1, and enters the planned route RPa1 at the point Pa11. At this point of time, the user vehicle 201 and the provider vehicle 202 adjust the velocities so as to reach the point Pa11 at the same time. After that, the user vehicle 201 and the provider vehicle 202 receive and provide a service while running in parallel to the point Pa14. The provider vehicle 202 then leaves the planned route RPa1 at the point Pa14, and returns to the planned route RPb1 at a point Pb12.

Figure 14:
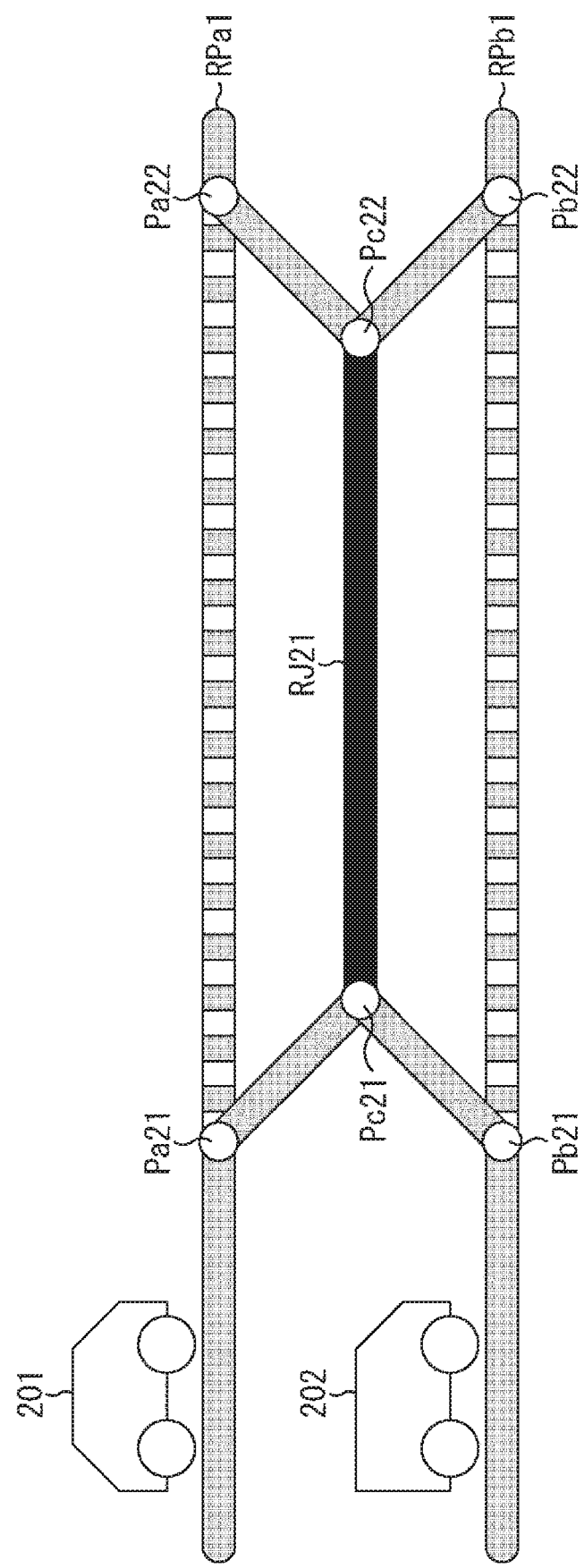
FIG. 14 is a diagram for explaining an example of route adjustment.

Further, as shown in FIG. 14, for example, the provider vehicle 202 may suggest a joining route on a route that is neither the planned route RPa1 of the user vehicle 201 nor the planned route RPb1 of the provider vehicle 202.

Specifically, the provider vehicle 202 suggests a joining route RJ21 that is neither on the planned route RPa1 nor on the planned route RPb1.

When the joining route RJ21 is accepted by the user vehicle 201, the provider vehicle 202 then changes routes. Specifically, the provider vehicle 202 changes routes at a point Pb21 on the planned route RPb1, and enters the joining route RJ21 at a point Pc21. The user vehicle 201 also changes routes at a point Pa21 on the planned route RPa1, and enters the joining route RJ21 at the point Pc21. At this point of time, the user vehicle 201 and the provider vehicle 202 adjust the velocities so as to reach the point Pc21 at the same time. After that, the user vehicle 201 and the provider vehicle 202 receive and provide a service while running in parallel to a point Pc22.

The user vehicle 201 then leaves the joining route RJ21 at the point Pc22, and returns to the planned route RPa1 at a point Pa22. The provider vehicle 202 also leaves the joining route RJ21 at the point Pc22, and returns to the planned route RPb1 at a point Pb22.

Note that a provider vehicle 202 provides a service to a plurality of user vehicles 201 in some cases. Next, referring to FIGS. 15 through 18, an example of a route adjustment method in a case where a provider vehicle 202 provides a service to two user vehicles 201 (hereinafter referred to as the user vehicle 201A and the user vehicle 201B) is described.

Figure 15:
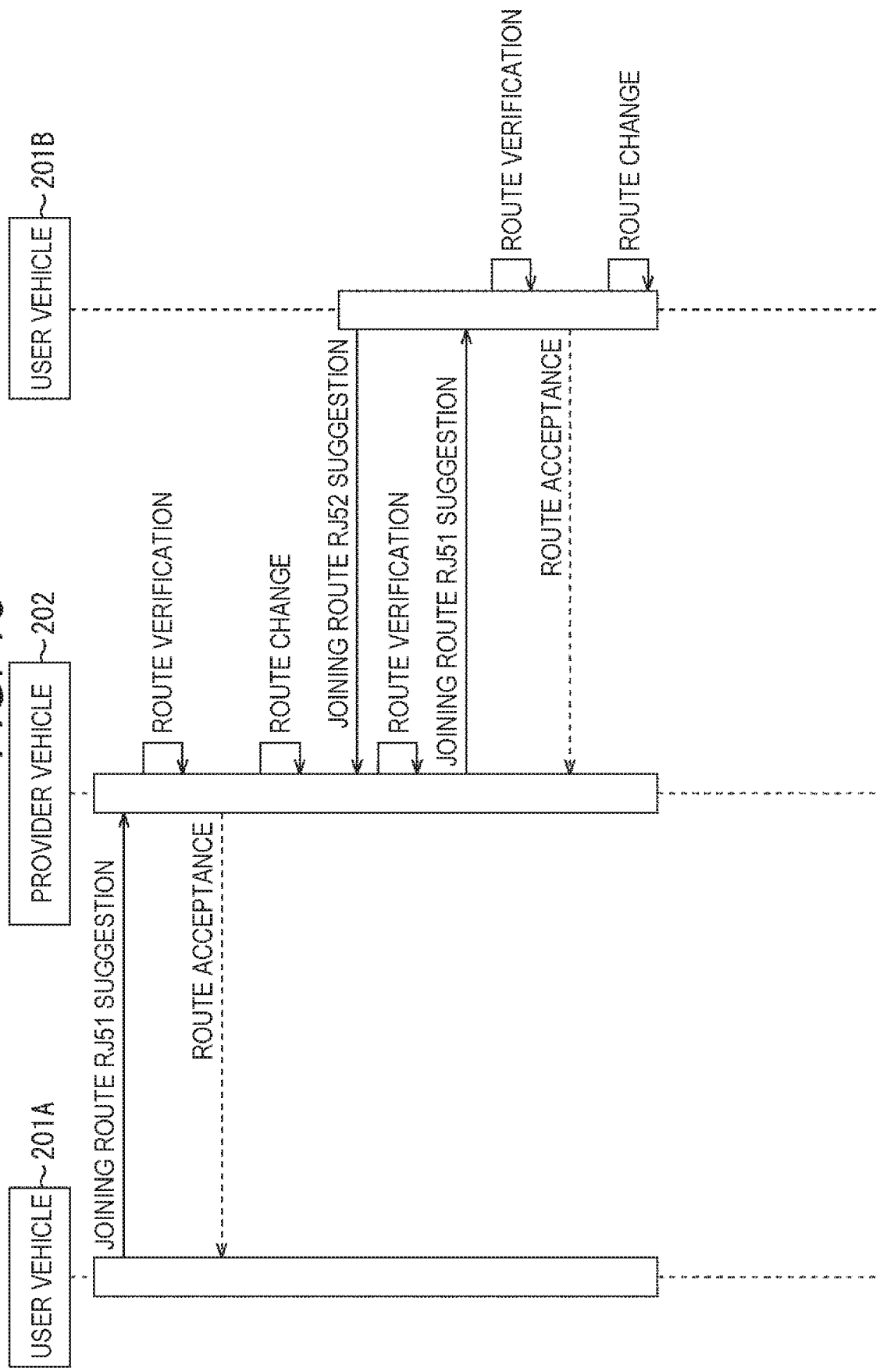
FIG. 15 is a sequence diagram for explaining an example of route adjustment between two user vehicles and a provider vehicle.

FIG. 15 is a sequence diagram showing an example process to be performed in a case where routes are adjusted among the user vehicle 201A, the user vehicle 201B, and the provider vehicle 202.

Figure 16:
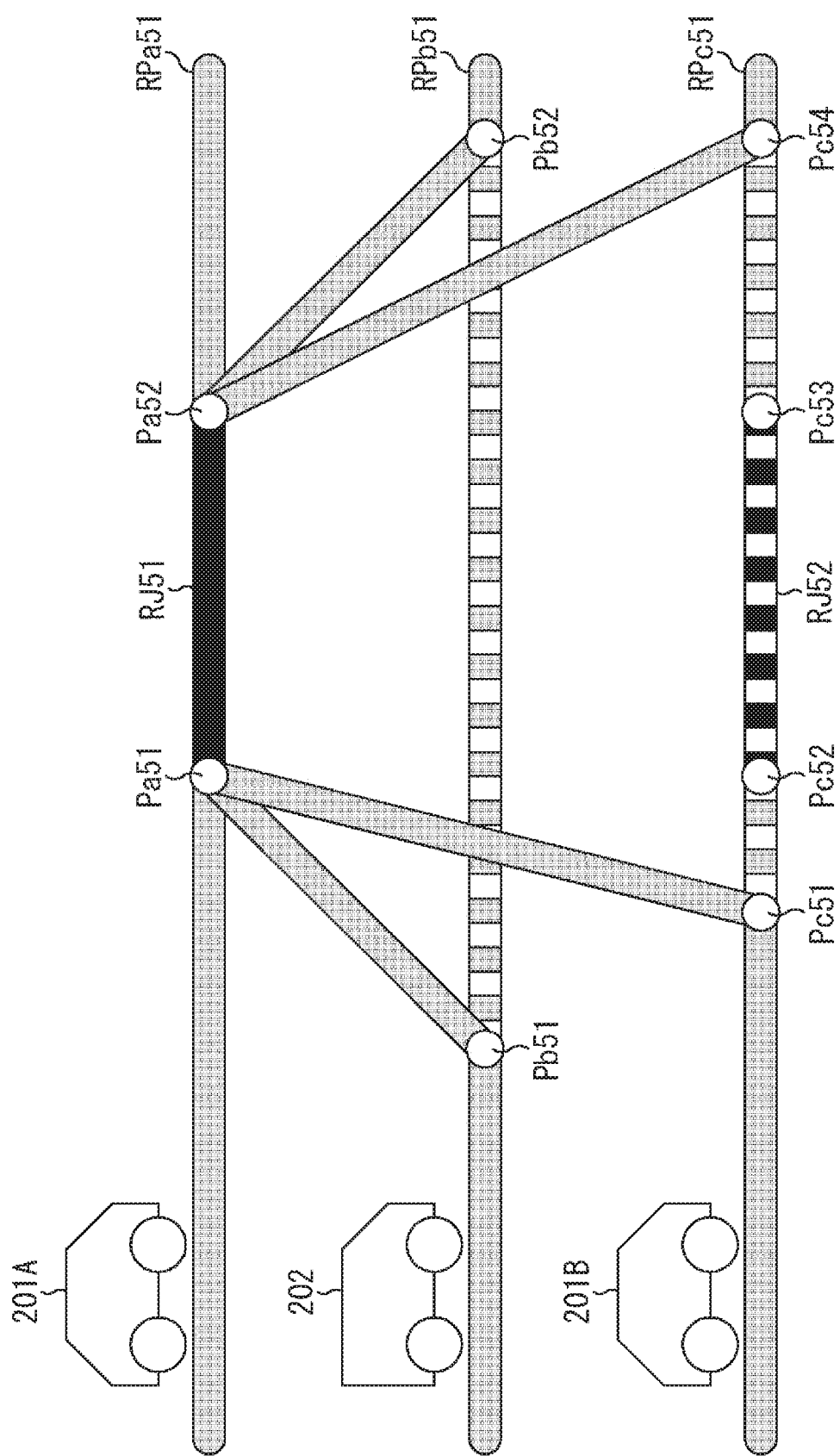
FIG. 16 is a diagram for explaining an example of route adjustment.

For example, as shown in FIG. 16, the user vehicle 201A is running on a planned route RPa51, the provider vehicle 202 is running on a planned route RPb51, and the provider vehicle 202 is running on a planned route RPc51. The user vehicle 201A then first suggests to the provider vehicle 202 to accept a joining route RJ51 between a point Pa51 and a point Pa52 on the planned route RPa51, as shown in FIG. 16.

The provider vehicle 202 verifies whether or not it is possible to join the user vehicle 201A on the joining route RJ51. In a case where the provider vehicle 202 determines that it is possible to join the user vehicle 201A on the joining route RJ51, the provider vehicle 202 notifies the user vehicle 201A that the joining route RJ51 is accepted. The provider vehicle 202 then changes routes at a point Pb51 on the planned route RPb51, and heads to the point Pa51, which is the start point of the joining route RJ51.

Next, as shown in FIG. 16, the user vehicle 201B suggests to the provider vehicle 202 to accept a joining route RJ52 between a point Pc52 and a point Pc53 on the planned route RPc51.

The provider vehicle 202 verifies whether or not it is possible to join the user vehicle 201A and the user vehicle 201B on the joining route RJ52. In a case where the provider vehicle 202 determines that it is not possible to join the user vehicle 201A and the user vehicle 201B on the joining route RJ52, the provider vehicle 202 suggests to the user vehicle 201B to accept the joining route RJ52 on which the provider vehicle 202 is to join the user vehicle 201A.

The provider vehicle 202 verifies whether or not it is possible to join the user vehicle 201A and the user vehicle 201B on the joining route RJ52. In a case where the provider vehicle 202 determines that it is not possible to join the user vehicle 201A and the user vehicle 201B on the joining route RJ52, the provider vehicle 202 suggests to the user vehicle 201B to accept the joining route RJ51 on which the provider vehicle 202 is to join the user vehicle 201A.

The user vehicle 201B verifies whether or not it is possible to join the provider vehicle 202 on the joining route RJ51. In a case where the user vehicle 201B determines that it is possible to join the provider vehicle 202 on the joining route RJ51, the user vehicle 201B notifies the provider vehicle 202 that the joining route RJ51 is accepted.

The user vehicle 201B then changes routes at the point Pc53 on the planned route RPc51, and enters the planned route RPa51 at the point Pa51. At this point of time, the user vehicle 201A, the user vehicle 201B, and the provider vehicle 202 adjust the velocities so as to reach the point Pa51 at the same time. After that, the user vehicle 201A, the user vehicle 201B, and the provider vehicle 202 receive and provide a service while running in parallel to the point Pa52.

The provider vehicle 202 then leaves the planned route RPa51 at the point Pa52, and returns to the planned route RPb51 at a point Pb52. The user vehicle 201A also leaves the planned route RPa51 at the point Pa52, and returns to the planned route RPc51 at a point Pc54.

Figure 17:
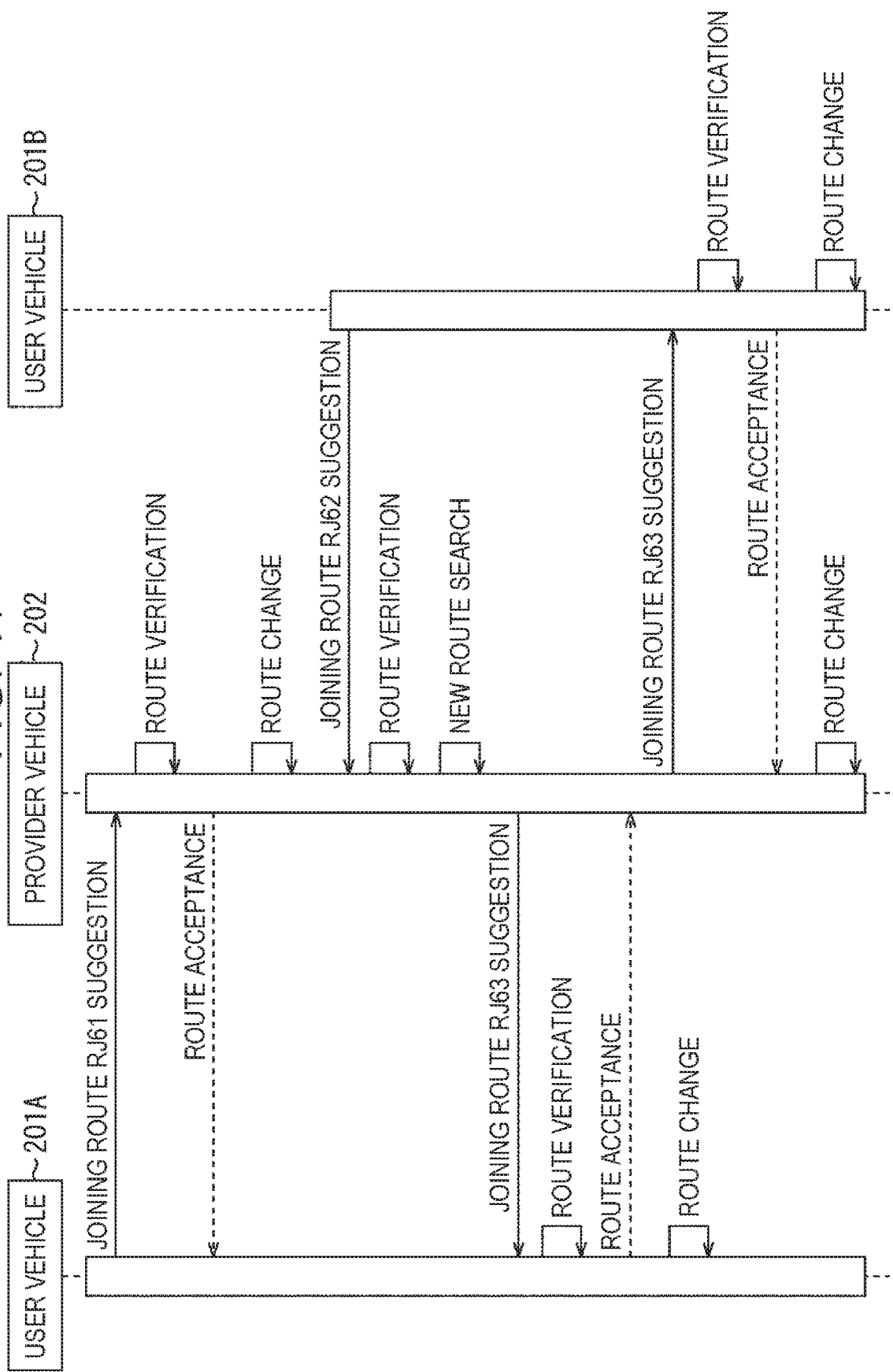
FIG. 17 is a sequence diagram for explaining an example of route adjustment between two user vehicles and a provider vehicle.

FIG. 17 is a sequence diagram showing an example process to be performed in a case where routes are adjusted among the user vehicle 201A, the user vehicle 201B, and the provider vehicle 202.

Figure 18:
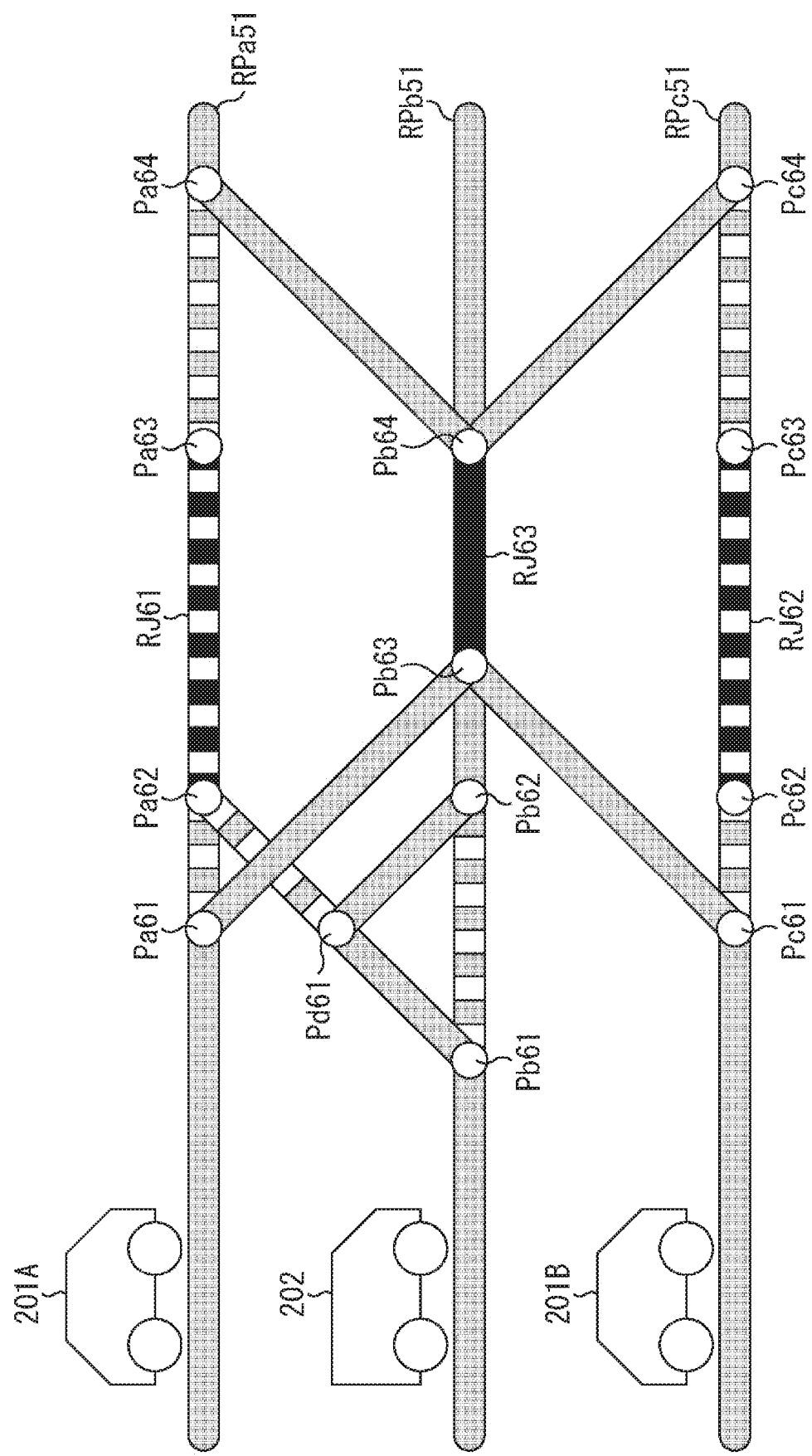
FIG. 18 is a diagram for explaining an example of route adjustment.

For example, as shown in FIG. 18, the user vehicle 201A is running on the planned route RPa51, the provider vehicle 202 is running on the planned route RPb51, and the provider vehicle 202 is running on the planned route RPc51, as in the example shown in FIG. 16. The user vehicle 201A then first suggests to the provider vehicle 202 to accept a joining route RJ61 between a point Pa62 and a point Pa63 on the planned route RPa51, as shown in FIG. 18.

The provider vehicle 202 verifies whether or not it is possible to join the user vehicle 201A on the joining route RJ61. In a case where the provider vehicle 202 determines that it is possible to join the user vehicle 201A on the joining route RJ61, the provider vehicle 202 notifies the user vehicle 201A that the joining route RJ61 is accepted. The provider vehicle 202 then changes routes at a point Pb61 on the planned route RPb51, and heads to the point Pa62, which is the start point of the joining route RJ61.

Next, as shown in FIG. 18, the user vehicle 201B suggests to the provider vehicle 202 to accept a joining route RJ62 between a point Pc62 and a point Pc63 on the planned route RPc51.

The provider vehicle 202 verifies whether or not it is possible to join the user vehicle 201A and the user vehicle 201B on the joining route RJ62. In a case where the provider vehicle 202 determines that it is not possible to join the user vehicle 201A and the user vehicle 201B on the joining route RJ62, the provider vehicle 202 further verifies whether or not it is possible to join the user vehicle 201A and the user vehicle 201B on the joining route RJ61. In a case where the provider vehicle 202 determines that it is not possible join the user vehicle 201A and the user vehicle 201B on the joining route RJ61, the provider vehicle 202 searches for a new route.

The provider vehicle 202 then suggests to the user vehicle 201A to accept a joining route RJ63 between a point Pb63 and a point Pb64 on the planned route RPb51, as shown in FIG. 18, for example. The user vehicle 201A verifies whether or not it is possible to join the provider vehicle 202 on the joining route RJ63. In a case where the user vehicle 201A determines that it is possible to join the provider vehicle 202 on the joining route RJ63, the user vehicle 201A notifies the provider vehicle 202 that the joining route RJ63 is accepted.

The provider vehicle 202 also suggests to the user vehicle 201B to accept the joining route RJ63, as shown in FIG. 18, for example. The user vehicle 201B verifies whether or not it is possible to join the provider vehicle 202 on the joining route RJ63. In a case where the user vehicle 201B determines that it is possible to join the provider vehicle 202 on the joining route RJ63, the user vehicle 201B notifies the provider vehicle 202 that the joining route RJ63 is accepted.

The user vehicle 201A then changes routes at a point Pa61 on the planned route RPa51, and enters the planned route RPb51 at the point Pb63. The user vehicle 201B also changes routes at a point Pc61 on the planned route RPc51, and enters the planned route RPb51 at the point Pb63. Further, the provider vehicle 202 turns back at a point Pd61, returns to the planned route RPb51 at a point Pb62, and then reaches the point Pb63. At this point of time, the user vehicle 201A, the user vehicle 201B, and the provider vehicle 202 adjust the velocities so as to reach the point Pb63 at the same time.

After that, the user vehicle 201A, the user vehicle 201B, and the provider vehicle 202 receive and provide a service while running in parallel to the point Pb64. The user vehicle 201A then leaves the planned route RPb51 at the point Pb64, and returns to the planned route RPa51 at a point Pa64. The user vehicle 201B also leaves the planned route RPb51 at the point Pb64, and returns to the planned route RPc51 at a point Pc64.

Note that, in a case where a joining route and a time for using a service are designated by a user vehicle 201, for example, the designated conditions are prioritized, and a provider vehicle 202 is selected so as to satisfy the designated conditions and then provide a service.

Referring back to FIG. 6, in step S3, the service use unit 313 determines whether or not the user vehicle 201 has joined the provider vehicle 202. If it is determined that the user vehicle 201 has not joined the provider vehicle 202, the process returns to step S2.

After that, the processes in steps S2 and S3 are repeatedly performed, until it is determined in step S3 that the user vehicle 201 has joined the provider vehicle 202. Thus, route and velocity adjustment is performed between the user vehicle 201 and the provider vehicle 202, until the user vehicle 201 joins the provider vehicle 202.

Note that there are cases where provision of services is taken over by another provider vehicle 202, before the user vehicle 201 joins the provider vehicle 202, as described later.

If it is determined in step S3 that the user vehicle 201 has joined the provider vehicle 202, on the other hand, the process moves on to step S4.

Note that any appropriate method such as license plate recognition or inter-vehicle communication may be used by the user vehicle 201 and the provider vehicle 202 to recognize each other.

In step S4, the service use unit 313 uses the service. In other words, the service use unit 313 performs various kinds of processes for using the service being provided by the provider vehicle 202.

Note that specific examples of methods for providing and using a service will be described later.

After that, the service use process comes to an end.

<Service Distribution Process>

Figure 19:
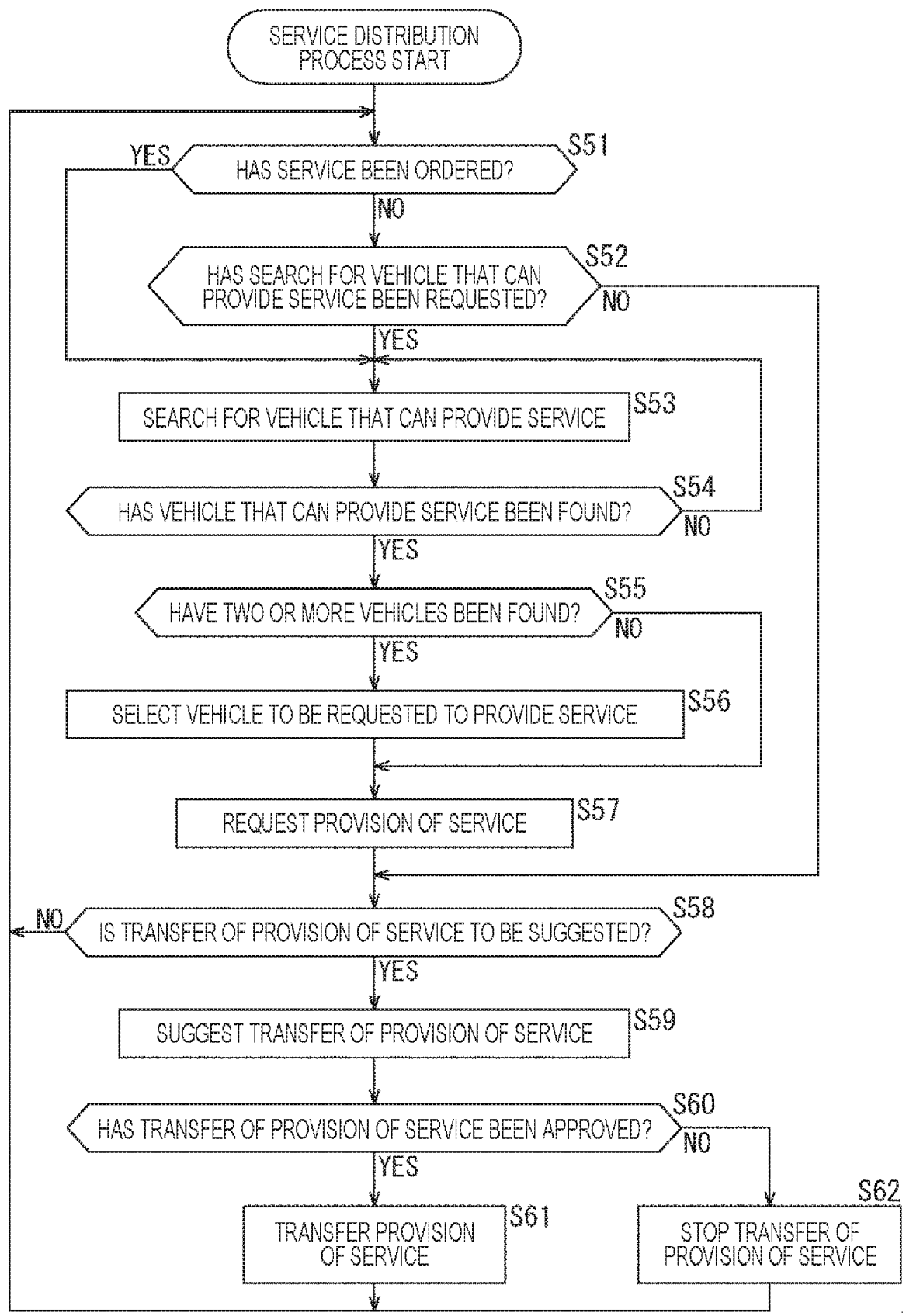
FIG. 19 is a flowchart for explaining a service distribution process.

Referring now to the flowchart in FIG. 19, a service distribution process to be performed by the server 203 is described.

This process is started when the power supply to the server 203 is turned on, and is ended when the power supply to the server 203 is turned off, for example.

In step S51, the order reception unit 411 determines whether or not a service has been ordered. If it is determined that any service has not been ordered, the process moves on to step S52.

In step S52, the order reception unit 411 determines whether or not a search for a vehicle that can provide a service has been requested. In a case where the order reception unit 411 receives vehicle search request data from a provider vehicle 202 via the network 204 and the communication unit 415, the order reception unit 411 determines that a search for a vehicle that can provide a service has been requested, and the process moves on to step S53.

Figure 23:
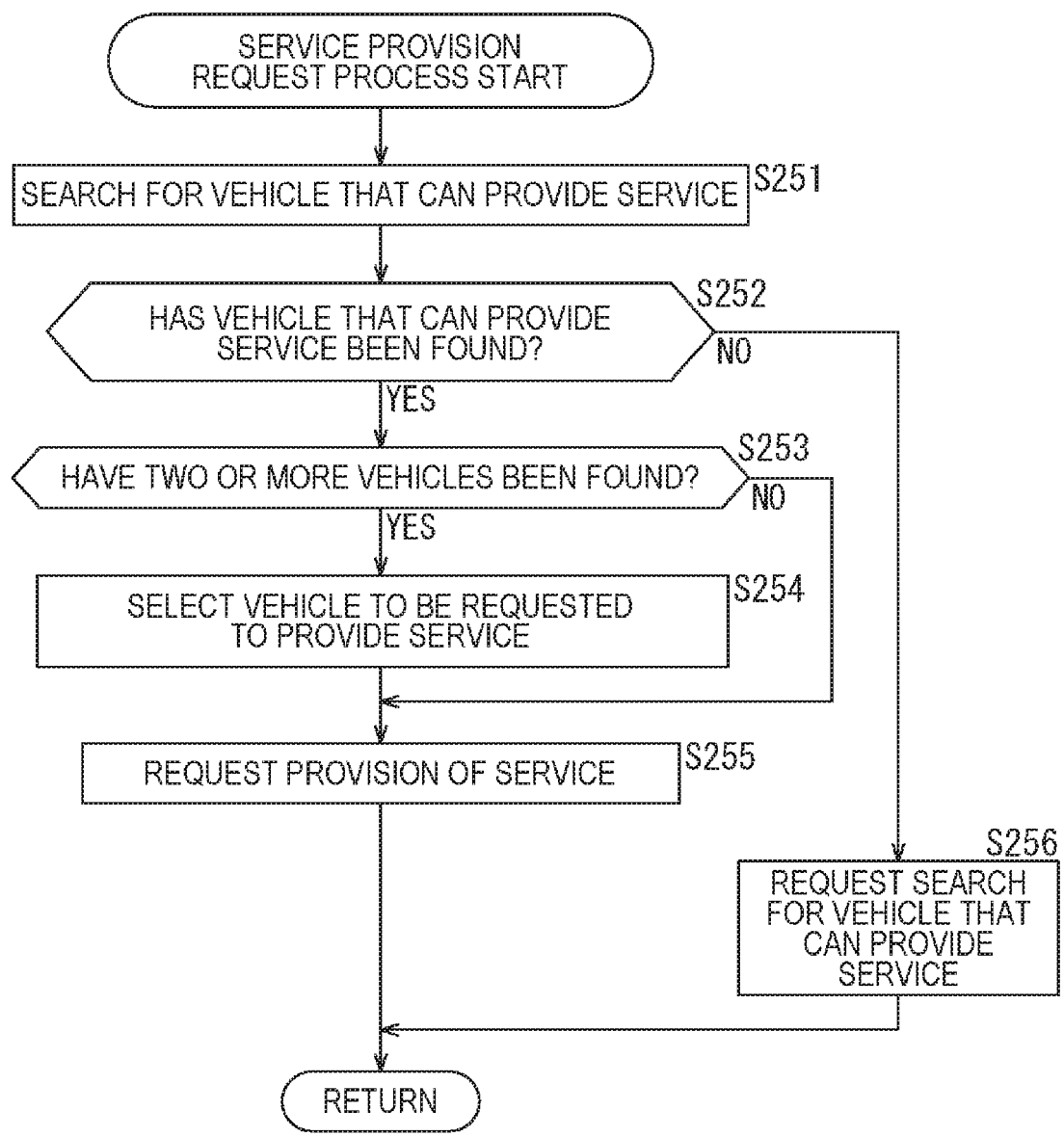
FIG. 23 is a flowchart for explaining a service provision request process in detail.

Note that the vehicle search request data is transmitted to the server 203 by a provider vehicle 202 in a case where the provider vehicle 202 can no longer provide services and cannot find a substitute provider vehicle 202, for example, as described later with reference to FIG. 23.

Further, the vehicle search request data includes the contents of and the conditions for the service to be provided, for example. For example, the vehicle search request data includes the contents of the service, the route and the specifications of the user vehicle 201 that uses the service, and the like. The vehicle search request data also includes a desired time, a desired place, and the like to use the service. The vehicle search request data further includes necessity/unnecessity of a takeover process, and, if a takeover process is required, information about the provider vehicle 202 to take over the service provision, for example. For example, in a case where the service to be provided is delivery of a package, and there is the need to take over the package to be delivered, the takeover process is necessary. In a case where the substitute provider vehicle 202 can provide the service without taking over anything from the original provider vehicle 202, on the other hand, the takeover process is unnecessary.

Meanwhile, in step S51, if the order reception unit 411 receives service order data from a user vehicle 201 via the network 204 and the communication unit 415, the order reception unit 411 determines that a service has been ordered. The process in step S52 is then skipped, and moves on to step S53.

In step S53, the vehicle search unit 413 searches for a vehicle that can provide the service. Specifically, the vehicle search unit 413 generates service provision inquiry data for searching for a vehicle that can provide the service. The service provision inquiry data includes data similar to the vehicle search request data described above, for example.

The vehicle search unit 413 transmits the service provision inquiry data to the provider vehicles 202 via the communication unit 415 and the network 204. At this point of time, the vehicle search unit 413 may transmit the service provision inquiry data to all the provider vehicles 202, or may transmit the service provision inquiry data to some of the provider vehicles 202. In the latter case, the service provision inquiry data is transmitted to the provider vehicles 202 capable of providing the target service, the provider vehicles 202 existing near the route of the user vehicle 201, or the like, for example. Further, the number of provider vehicles 202 to which the service provision inquiry data is transmitted may be one, or may be two or larger.

In step S54, the vehicle search unit 413 determines whether or not a vehicle that can provide the service has been found. In a case where the vehicle search unit 413 does not receive availability data from any of the provider vehicles 202 in response to the service provision inquiry data, the vehicle search unit 413 determines that any vehicle capable of providing the service has not been found, and the process returns to step S53.

After that, the processes in steps S53 and S54 are repeatedly performed, until it is determined in step S54 that a vehicle that can provide the service has been found.

In a case where the vehicle search unit 413 receives availability data from one or more provider vehicles 202 in step S54, on the other hand, the vehicle search unit 413 determines that a vehicle that can provide the service has been found, and the process moves on to step S55.

The availability data includes the fee, the contents of the service that can be provided, vehicle information (such as width, height, and length, for example), the current location of the provider vehicle 202, the time at which the provider vehicle 202 can join the route of the user vehicle 201, the scheduled service provision to other user vehicles 201, and the like, for example. Further, in a case where the service to be provided is delivery of articles, the availability data includes the empty space (such as width, height, and length, for example) of the provider vehicle 202, and the like.

In step S55, the vehicle search unit 413 determines whether or not a plurality of vehicles has been found. In a case where the vehicle search unit 413 has received availability data from a plurality of provider vehicles 202, the vehicle search unit 413 determines that a plurality of vehicles has been found, and the process moves on to step S56.

In step S56, the request unit 414 selects the vehicle to be requested to provide the service. Specifically, the request unit 414 grades the evaluation values given to the respective evaluation items in FIG. 7 or FIG. 8, on the basis of the information included in the availability data from the respective provider vehicles 202.

For example, in the example shown in FIG. 7, the evaluation value for the fee of a provider vehicle K1 is 1, the evaluation value for the route flexibility is 5, the evaluation value for the joining time is 1, and the evaluation value for the load amount is 1. The evaluation value for the fee of a provider vehicle K2 is 2, the evaluation value for the route flexibility is 2, the evaluation value for the joining time is 3, and the evaluation value for the load amount is 2. The evaluation value for the fee of a provider vehicle K3 is 5, the evaluation value for the route flexibility is 3, the evaluation value for the joining time is 3, and the evaluation value for the load amount is 3.

For example, in the example shown in FIG. 8, the evaluation value for the fee of the provider vehicle K1 is 1, the evaluation value for the route flexibility is 5, the evaluation value for the joining time is 1, the evaluation value for the load amount is 1, the evaluation value for the service sufficiency is 2, and the evaluation value for the provision difficulty is 3. The evaluation value for the fee of the provider vehicle K2 is 2, the evaluation value for the route flexibility is 2, the evaluation value for the joining time is 3, the evaluation value for the load amount is 2, the evaluation value for the service sufficiency is 2, and the evaluation value for the provision difficulty is 1. The evaluation value for the fee of the provider vehicle K3 is 5, the evaluation value for the route flexibility is 3, the evaluation value for the joining time is 3, the evaluation value for the load amount is 3, the evaluation value for the service sufficiency is 1, and the evaluation value for the provision difficulty is 2.

The request unit 414 then calculates the total evaluation values of the respective provider vehicles 202, using the evaluation values of the respective evaluation items and weights based on the coefficients that have been set by users. Specifically, the request unit 414 calculates the total evaluation values of the respective provider vehicles 202 by multiplying the evaluation values of the respective evaluation items by the weights based on the coefficients that have been set by users.

For example, in the example shown in FIG. 7, the total evaluation value of the provider vehicle K1 is 10.5, the total evaluation value of the provider vehicle K2 is 15, and the total evaluation value of the provider vehicle K3 is 20.5. Further, in the example shown in FIG. 8, the total evaluation value of the provider vehicle K1 is 18.5, the total evaluation value of the provider vehicle K2 is 19, and the total evaluation value of the provider vehicle K3 is 25.5.

The request unit 414 then selects the provider vehicle 202 having the highest total evaluation value as the vehicle to be requested to provide the service. For example, in the examples shown in FIGS. 7 and 8, the provider vehicle K3 is selected.

Note that the types of the evaluation items are not limited to this example, and may be increased or decreased. Also, it is not necessary to use coefficients in calculating total evaluation values. Further, the users may not set coefficients, but coefficients may be automatically set through machine learning or the like.

After that, the process moves on to step S57.

In a case where the vehicle search unit 413 receives availability data from one provider vehicle 202 in step S55, on the other hand, the vehicle search unit 413 determines that one vehicle has been found. The process in step S56 is then skipped, and the process moves on to step S57. In this case, the one provider vehicle 202 is selected as the vehicle to be requested to provide the service.

In step S57, the request unit 414 requests provision of the service. Specifically, the request unit 414 generates service provision request data for requesting provision of the service. The service provision request data basically includes data that is similar to the service provision inquiry data. The request unit 414 transmits the service provision request data to the provider vehicle 202 via the communication unit 415 and the network 204.

After that, the process moves on to step S58.

Meanwhile, if it is determined in step S52 that a search for a vehicle that can provide the service has not been requested, the processes in steps S53 through S57 are skipped, and the process moves on to step S58.

In step S58, the request unit 414 determines whether or not to suggest transfer of provision of the service. For example, the request unit 414 periodically monitors the current location and the service order state of each user vehicle 201, the current location and the service order reception state of each provider vehicle 202, the traffic congestion and the accident state of each road, and the like. In a case where there is a service that can be more appropriately provided if the provider vehicle 202 is changed among the currently ordered services, for example, the request unit 414 then determines to suggest transfer of provision of the service, and the process moves on to step S59. This is a case where a provider vehicle 202 that can provide the service with higher user satisfaction, can provide the service more promptly, or has a higher total evaluation value or the like has been found, for example.

In step S59, the request unit 414 suggests transfer of provision of the service. For example, the request unit 414 generates service transfer suggestion data for suggesting transfer of the service, and transmits, via the communication unit 415 and the network 204, the service transfer suggestion data to the provider vehicle 202 being requested to provide the service that is to be transferred (this provider vehicle 202 will be hereinafter referred to as the transfer source vehicle). The request unit 414 also generates service provision inquiry data for suggesting provision of the service to be transferred. The request unit 414 transmits, via the communication unit 415 and the network 204, the service provision inquiry data to the provider vehicle 202 to which provision of the service to be transferred is to be suggested (this provider vehicle 202 will be hereinafter referred to as the transfer destination vehicle).

In step S60, the request unit 414 determines whether or not transfer of provision of the service has been approved.

Specifically, in a case where transfer of the service is approved, the transfer source vehicle transmits transfer approval data to the server 203. In a case where transfer of the service is not approved, the transfer source vehicle transmits transfer refusal data to the server 203. Meanwhile, in a case where the service can be provided, the transfer destination vehicle transmits the availability data to the server 203. In a case where the service cannot be provided, the transfer destination vehicle transmits unavailability data to the server 203.

In a case where the request unit 414 receives the transfer approval data from the transfer source vehicle and receives the availability data from the transfer destination vehicle via the network 204 and the communication unit 415, the request unit 414 then determines that transfer of the service has been approved, and the process then moves on to step S61.

In step S61, the request unit 414 transfers provision of the service. Specifically, the request unit 414 generates service transfer request data for requesting transfer of provision of the service, and transmits the service transfer request data to the transfer source vehicle via the communication unit 415 and the network 204. The request unit 414 also generates service provision request data for requesting provision of the service to be transferred, and transmits the service provision request data to the transfer destination vehicle via the communication unit 415 and the network 204.

After that, the process returns to step S51, and the processes in step S51 and the later steps are performed.

In a case where the request unit 414 receives the transfer refusal data from the transfer source vehicle or receives the unavailability data from the transfer destination vehicle via the network 204 and the communication unit 415 in step S60, the request unit 414 determines that transfer of the service has been refused, and the process moves on to step S62.

In step S62, the request unit 414 stops the transfer of provision of the service. Specifically, the request unit 414 generates service transfer stop data for notifying that the transfer of provision of the service has been stopped, and transmits the service transfer stop data to the transfer source vehicle via the communication unit 415 and the network 204.

After that, the process returns to step S51, and the processes in step S51 and the later steps are performed.

<Service Response Process>

Figure 20:
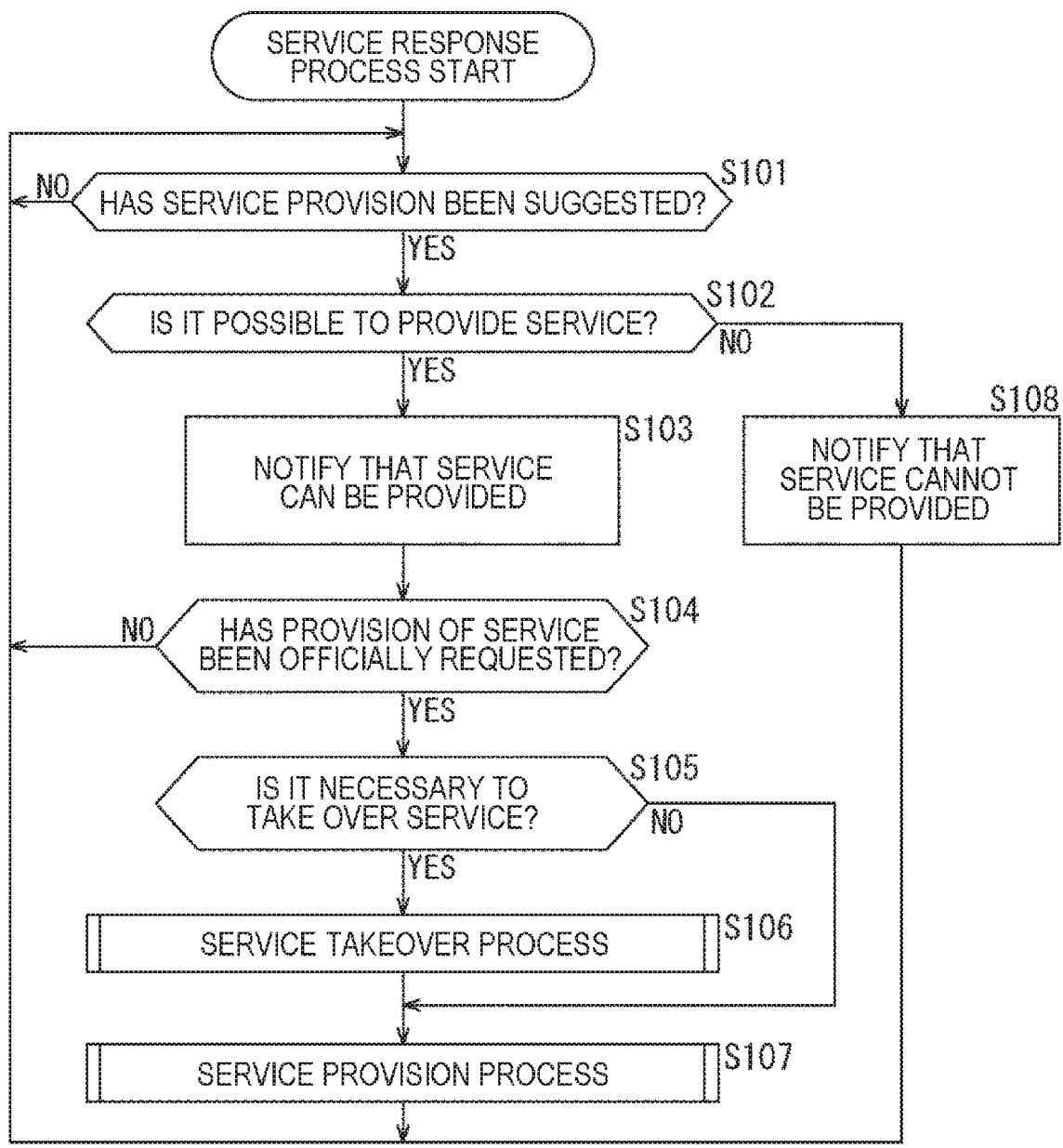
FIG. 20 is a flowchart for explaining a service response process.

Referring now to the flowchart in FIG. 20, a service response process to be performed by a provider vehicle 202 is described.

This process is started when the provider vehicle 202 is activated and an operation for starting driving is performed, such as when the ignition switch, the power switch, the start switch, or the like of the provider vehicle 202 is turned on, for example. This process is also ended when an operation for ending the driving of the provider vehicle 202 is performed, such as when the ignition switch, the power switch, the start switch, or the like of the provider vehicle 202 is turned off, for example, for example.

In step S101, the order reception unit 361 determines whether or not service provision has been suggested. This determination process is repeatedly performed at a predetermined timing, until it is determined that service provision has been suggested.

Meanwhile, in a case where the order reception unit 361 has received service provision inquiry data from the server 203 via the network 204 and the communication unit 368 in step S101, the order reception unit 361 determines that service provision has been suggested, and the process moves on to step S102. Alternatively, in a case where the order reception unit 361 has received service provision inquiry data from another provider vehicle 202 via the communication unit 368 and, if necessary, the network 204, the order reception unit 361 determines that service provision has been suggested, and the process moves on to step S102.

In step S102, the order reception unit 361 determines whether or not the service can be provided. If the service indicated by the service provision inquiry data can be provided under the specified conditions, the order reception unit 361 determines that the service can be provided, and the process moves on to step S103.

In step S103, the order reception unit 361 notifies that the service can be provided. Specifically, the order reception unit 361 generates availability data. In a case where the order reception unit 361 has received service provision inquiry data from the server 203, the order reception unit 361 then transmits the availability data to the server 203 via the communication unit 368 and the network 204. In a case where the order reception unit 361 has received service provision inquiry data from another provider vehicle 202, on the other hand, the order reception unit 361 transmits the availability data to the provider vehicle 202 via the communication unit 368 and, if necessary, the network 204.

In step S104, the order reception unit 361 determines whether or not provision of the service has been officially requested. If it is determined that provision of the service has not been officially requested, the process returns to step S101, and the processes in step S101 and later are performed.

Meanwhile, in a case where the order reception unit 361 has received service provision request data from the server 203 via the network 204 and the communication unit 368 in step S104, the order reception unit 361 determines that service provision has been officially requested, and the process moves on to step S105. Alternatively, in a case where the order reception unit 361 has received service provision request data from another provider vehicle 202 via the communication unit 368 and, if necessary, the network 204, the order reception unit 361 determines that service provision has been officially requested, and the process moves on to step S105.

In step S105, the service provision unit 365 determines whether or not it is necessary to take over the service, on the basis of the service provision request data. If it is determined that a takeover of the service is necessary, the process moves on to step S106.

In step S106, the provider vehicle 202 performs a service takeover process, and the process then moves on to step S107. Referring now to the flowchart in FIG. 21, the service takeover process is described in detail.

In step S151, the request unit 364 requests a takeover of the service. Specifically, the request unit 364 communicates with the provider vehicle 202 indicated as the vehicle from which the service is to be handed over in the service provision request data (this provider vehicle 202 will be hereinafter referred to as the handover vehicle), via the communication unit 368, and, if necessary, the network 204. The request unit 364 then requests the handover vehicle to hand over the service.

In step S152, the provider vehicle 202 adjusts the route and the velocity with the handover vehicle. Specifically, the planning unit 362 plans the route and the velocity for joining the handover vehicle, while communicating with the handover vehicle via the communication unit 368 and, if necessary, the network 204. The operation control unit 367 controls operation of the provider vehicle 202 so as to travel on the planned route at the planned velocity, and join the handover vehicle.

In step S153, the service provision unit 365 determines whether or not the provider vehicle 202 has joined the handover vehicle. If it is determined that the provider vehicle 202 has not joined the handover vehicle, the process returns to step S152.

After that, the processes in steps S152 and S153 are repeatedly performed, until it is determined in step S153 that the provider vehicle 202 has joined the handover vehicle. Thus, route and velocity adjustment is performed between the provider vehicle 202 and the handover vehicle, until the provider vehicle 202 joins the handover vehicle.

If it is determined in step S153 that the provider vehicle 202 has joined the handover vehicle, on the other hand, the process moves on to step S154.

In step S155, the service provision unit 365 conducts a takeover of the service. Specifically, the service provision unit 365 acquires, from the handover vehicle, what is to be used for providing the service (such as the articles to be provided to the user, or the equipment to be used for the service, for example). Thus, provision of the service is handed over from the handover vehicle to the provider vehicle 202 (the successor vehicle).

After that, the service takeover process comes to an end.

Referring back to FIG. 20, if it is determined in step S105 that a takeover of the service is not necessary, on the other hand, the process in step S106 is skipped, and the process moves on to step S107.

In step S107, the provider vehicle 202 performs a service provision process. The process then returns to step S101, and the processes in step S101 and the later steps are performed. Referring now to the flowchart in FIG. 22, the service provision process is described in detail.

In step S201, the provider vehicle 202 adjusts the route and the velocity with the user vehicle 201. Specifically, the planning unit 362 plans the route and the velocity for joining the user vehicle 201, while communicating with the user vehicle 201 via the communication unit 368 and, if necessary, the network 204. The operation control unit 367 controls operation of the provider vehicle 202 so as to travel on the planned route at the planned velocity, and join the user vehicle 201 on the joining route.

Note that this process is performed in correspondence with the process performed by the user vehicle 201 in step S2 in FIG. 6.

In step S202, the request unit 364 determines whether or not to request another vehicle to provide the service. If the request unit 364 determines not to request another vehicle to provide the service, the process moves on to step S203.

In step S203, the service provision unit 365 determines whether or not transfer of provision of the service has been suggested. Specifically, in a case where the service provision unit 365 has received the service transfer suggestion data transmitted from the server 203 in the process in step S59 in FIG. 19 via the network and the communication unit 368, the service provision unit 365 determines that transfer of provision of the service has been suggested, and the process moves on to step S204.

In step S204, the service provision unit 365 determines whether or not to transfer provision of the service. If the service provision unit 365 determines not to transfer provision of the service, the service provision unit 365 generates transfer refusal data for refusing transfer of provision of the service, and transmits the transfer refusal data to the server 203 via the communication unit 368 and the network 204. After that, the process moves on to step S205.

If the service provision unit 365 determines to transfer provision of the service, on the other hand, the service provision unit 365 generates transfer approval data for approving transfer of provision of the service, and transmits the transfer approval data to the server 203 via the communication unit 368 and the network 204. However, in a case where the service provision unit 365 has received service transfer stop data from the server 203 via the network 204 and the communication unit 368, the service provision unit 365 determines not to transfer provision of the service, and the process moves on to step S205.

In step S205, the service provision unit 365 determines whether or not the provider vehicle 202 has joined the user vehicle 201. If it is determined that the provider vehicle 202 has not joined the user vehicle 201, the process returns to step S201.

After that, the processes in steps S201 through S205 are repeatedly performed, until it is determined in step S202 to request another vehicle to provide the service, it is determined in step S204 to transfer provision of the service to another vehicle, or it is determined in step S205 that the provider vehicle 202 has joined the user vehicle 201.

If it is determined in step S205 that the provider vehicle 202 has joined the user vehicle 201, on the other hand, the process moves on to step S206.

In step S206, the service provision unit 365 provides the service.

Note that the method for proving the service differs depending on the contents of the service, the specifications of the user vehicle 201, the specifications of the provider vehicle 202, and the like.

Further, provision of the service may be performed in either the user vehicle 201 or the provider vehicle 202, or may be performed in both the user vehicle 201 and the provider vehicle 202.

Further, the person who provides the service, the person who uses the service, equipment, or the like may move between the user vehicle 201 and the provider vehicle 202. In this case, the user vehicle 201 and the provider vehicle 202 preferably keep running in parallel in a vertical or horizontal direction so a person, equipment, and the like can move safely. Also, the user vehicle 201 and the provider vehicle 202 may lower the velocity or change routes, to keep running in parallel.

Further, the service provision unit 365 preferably prepares before joining the user vehicle 201, to provide a sufficient service within the provision time. In a case where food is to be delivered, for example, the service provision unit 365 preferably warms the food in advance. In a case where a karaoke service is to be provided, for example, the service provision unit 365 preferably registers the tunes requested by the user in advance. In a case where a toilet is to be provided, for example, the service provision unit 365 preferably warms the toilet seat and the like.

After that, the service provision process comes to an end.

If it is determined in step S202 to request another vehicle to provide the service, on the other hand, the process moves on to step S207. This situation occurs in a case where it is no longer possible to provide the service under the specified conditions, and the like, due to a failure, traffic congestion, overload, or the like, for example.

In step S207, the provider vehicle 202 performs a service provision request process, and the process then moves on to step S208. Referring now to the flowchart in FIG. 23, the service provision request process is described in detail.

In step S251, the vehicle search unit 363 searches for a vehicle that can provide the service. Specifically, the vehicle search unit 363 performs a process similar to that performed by the vehicle search unit 413 of the server 203 in step S53 in FIG. 19, to generate service provision inquiry data for searching for a vehicle that can provide the service.

The vehicle search unit 363 transmits the service provision inquiry data to the other provider vehicles 202 existing within a predetermined distance from the provider vehicle 202, for example, via the communication unit 368 and, if necessary, the network 204. At this point of time, the vehicle search unit 363 may transmit the service provision inquiry data to all the provider vehicles 202 within the range, or may transmit the service provision inquiry data to some of the provider vehicles 202. In the latter case, the service provision inquiry data is transmitted to the provider vehicles 202 and the like capable of providing the target service, for example. Further, the number of provider vehicles 202 to which the service provision inquiry data is transmitted may be one, or may be two or larger.

In step S252, the vehicle search unit 363 determines whether or not a vehicle that can provide the service has been found. In a case where the vehicle search unit 363 has received availability data from one or more provider vehicles 202, the vehicle search unit 363 determines that a vehicle that can provide the service has been found, and the process moves on to step S253.

In step S253, the vehicle search unit 363 determines whether or not a plurality of vehicles has been found. In a case where the vehicle search unit 363 has received availability data from a plurality of provider vehicles 202, the vehicle search unit 363 determines that a plurality of vehicles has been found, and the process moves on to step S254.

In step S254, the request unit 364 selects the vehicle to be requested to provide the service. For example, the request unit 364 performs a process similar to the process performed by the request unit 414 of the server 203 in step S56 in FIG. 19, to select the provider vehicle 202 to be requested to provide the service.

After that, the process moves on to step S255.

In a case where the vehicle search unit 363 receives availability data from one provider vehicle 202 in step S253, on the other hand, the vehicle search unit 363 determines that one vehicle has been found. The process in step S254 is then skipped, and the process moves on to step S255. In this case, the one provider vehicle 202 is selected as the vehicle to be requested to provide the service.

In step S255, the request unit 364 requests provision of the service. Specifically, the request unit 364 generates service provision request data for requesting provision of the service. The request unit 364 transmits, via the communication unit 368 and, if necessary, the network 204, the service provision request data to the provider vehicle 202 to be requested to provide the service.

Figure 24:
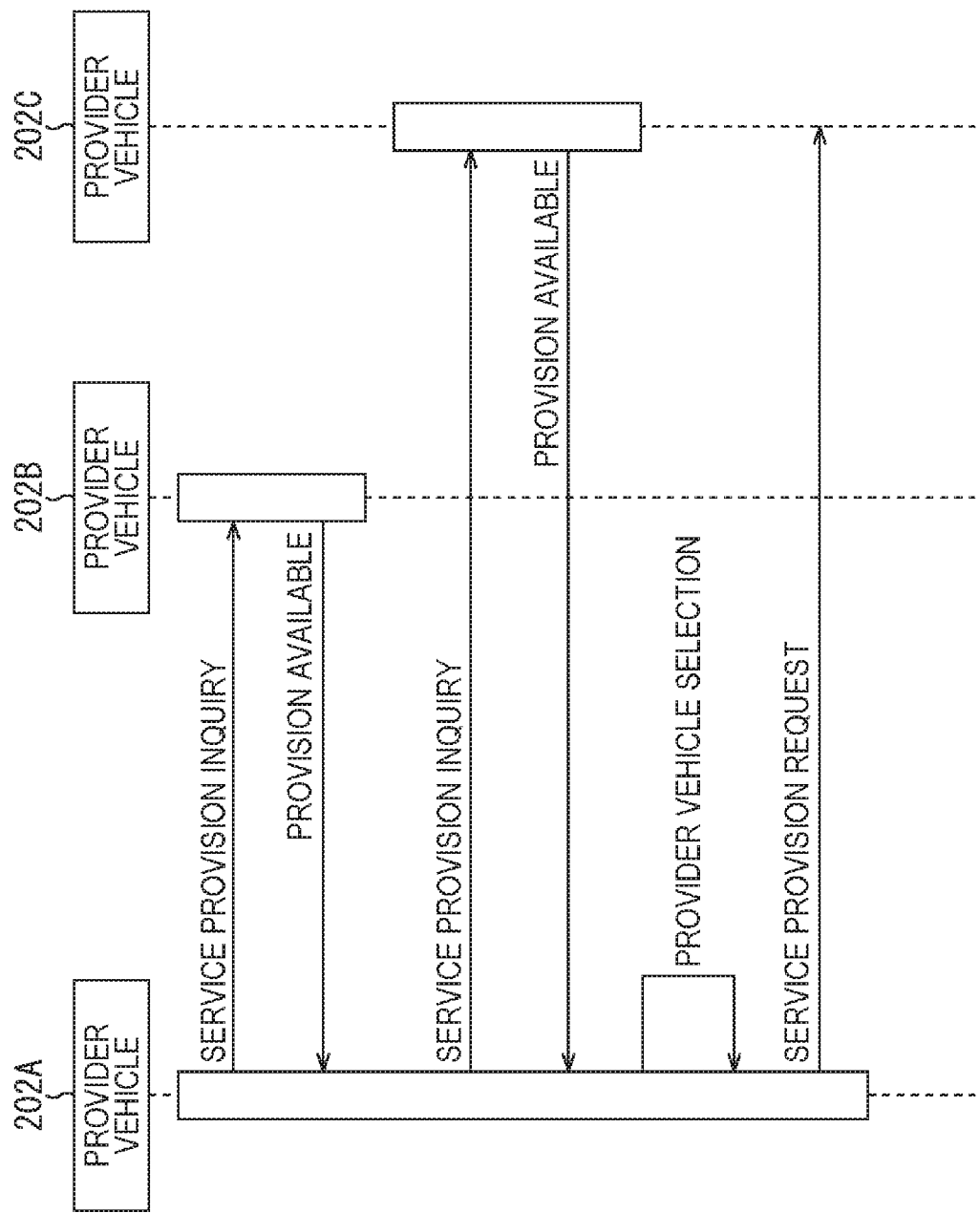
FIG. 24 is a sequence diagram for explaining an example of a method for requesting provision of a service from a provider vehicle.

FIG. 24 is a sequence diagram showing an example process to be performed in a case where the vehicle to be requested to provide the service is selected from a plurality of provider vehicles 202.

Specifically, service provision inquiry data is first transmitted from a provider vehicle 202A to a provider vehicle 202B and a provider vehicle 202C. In a case where the provider vehicle 202B and the provider vehicle 202C can provide the service, both the provider vehicle 202B and the provider vehicle 202C then transmit availability data to the provider vehicle 202A.

The provider vehicle 202A then selects the vehicle that provides the service between the provider vehicle 202B and the provider vehicle 202C by the method described above. In a case where the provider vehicle 202A has selected the provider vehicle 202C, the provider vehicle 202A transmits service provision request data to the provider vehicle 202C.

After that, the service provision request process comes to an end.

In a case where the vehicle search unit 363 does not receive availability data from any of the provider vehicles 202 in step S252, on the other hand, the vehicle search unit 363 determines that any vehicle that can provide the service has not been found, and the process moves on to step S256.

In step S256, the vehicle search unit 363 requests a search for a vehicle that can provide the service. Specifically, the vehicle search unit 363 generates the vehicle search request data described above, and transmits the vehicle search request data to the server 203 via the communication unit 368 and the network 204.

In a case where the server 203 has received service provision request data in step S52 in FIG. 19 described above, the server 203 searches for a provider vehicle 202 that can provide the service, and requests another provider vehicle 202 to provide the service.

Figure 25:
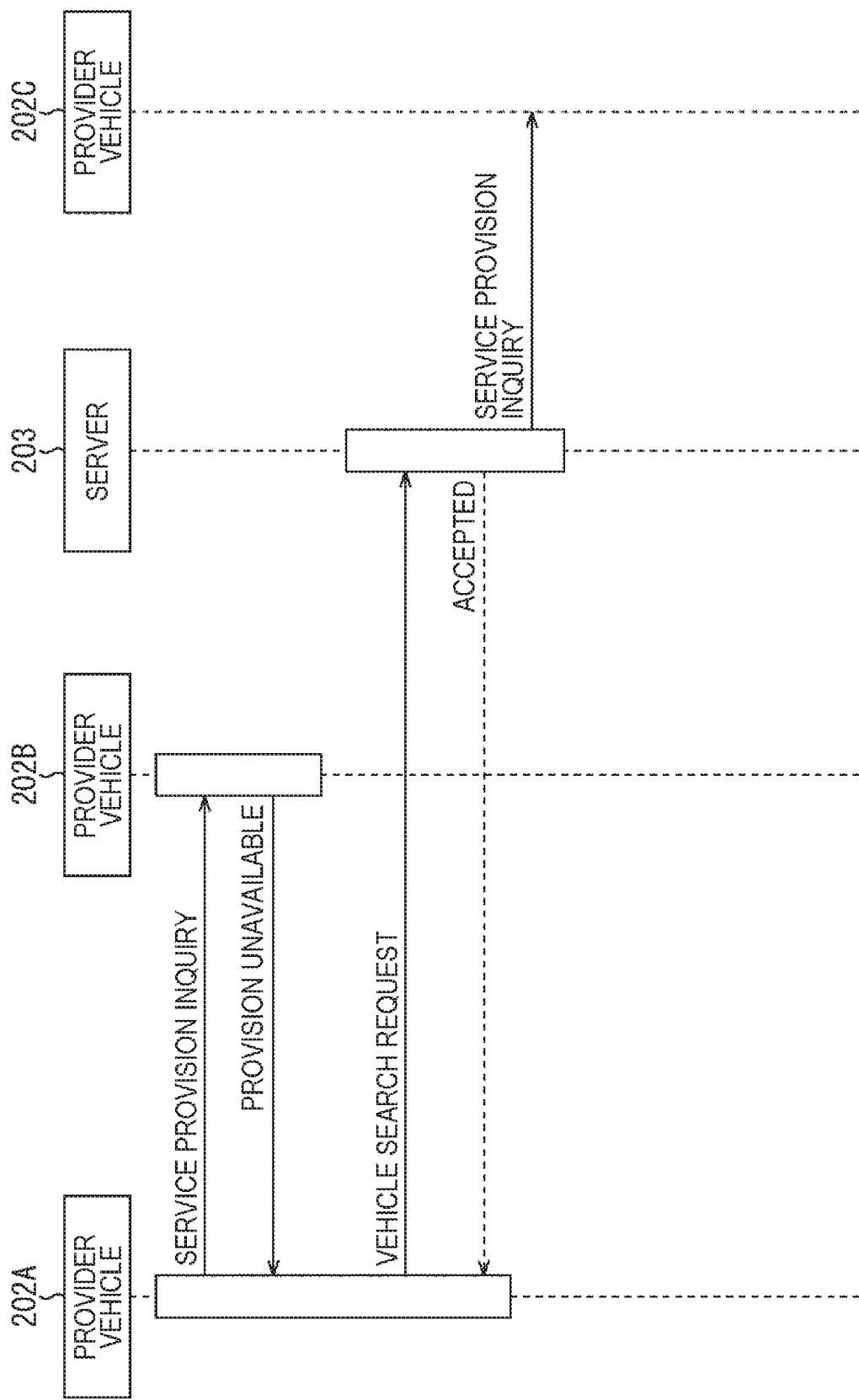
FIG. 25 is a sequence diagram for explaining an example of a method for requesting provision of a service from a provider vehicle.

FIG. 25 is a sequence diagram showing an example process to be performed in a case where the server 203 is requested to search for a vehicle that can provide the service.

Specifically, service provision inquiry data is first transmitted from the provider vehicle 202A to the provider vehicle 202B. In a case where the provider vehicle 202B cannot provide the service, the provider vehicle 202B then transmits unavailability data to the provider vehicle 202A.

The provider vehicle 202A then transmits vehicle search request data to the server 203. If the vehicle search request data is normal, the server 203 accepts the request. The server 203 then transmits service provision inquiry data to the provider vehicle 202C or the like.

Figure 26:
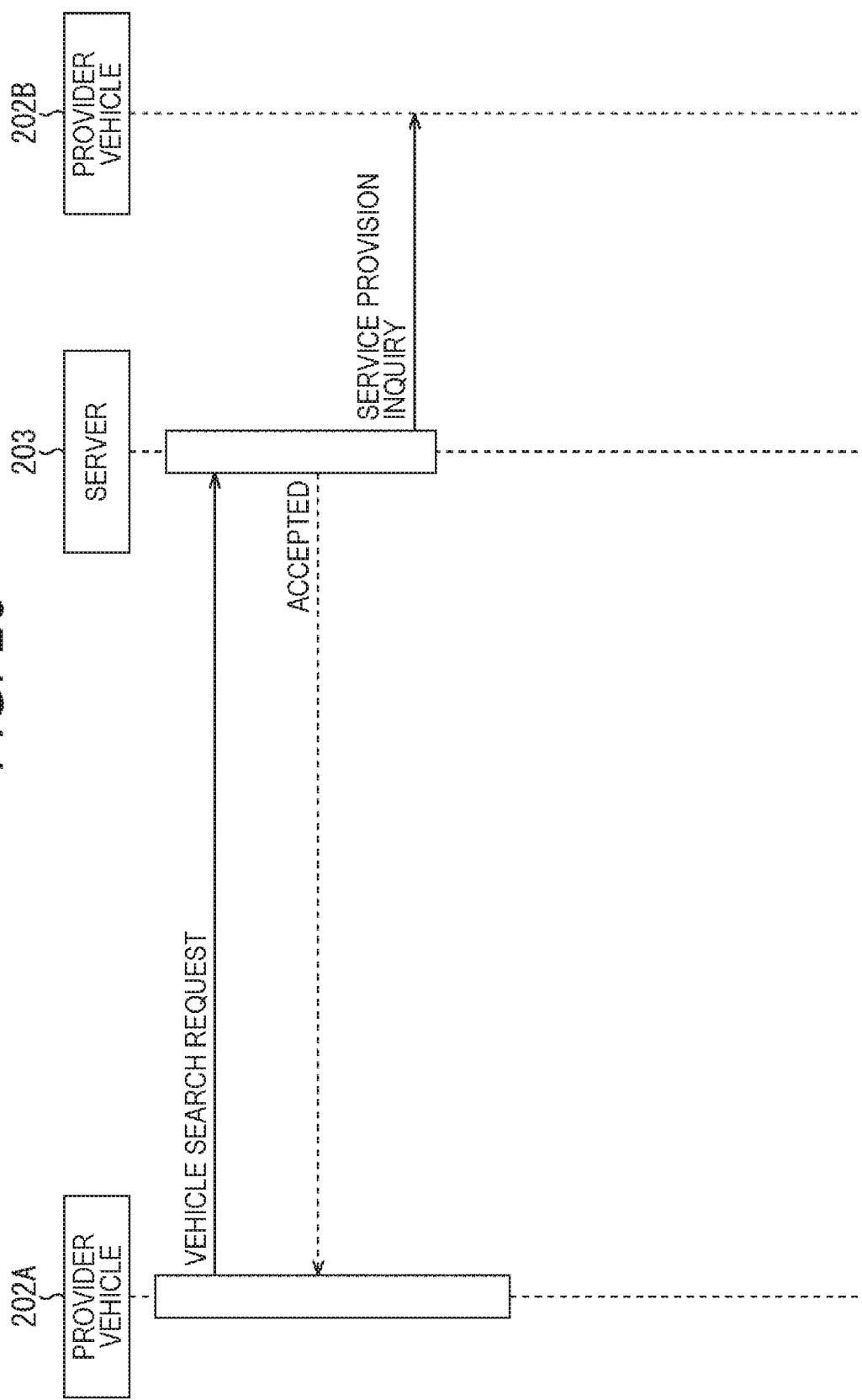
FIG. 26 is a sequence diagram for explaining an example of a method for requesting provision of a service from a provider vehicle.
Figure 27:
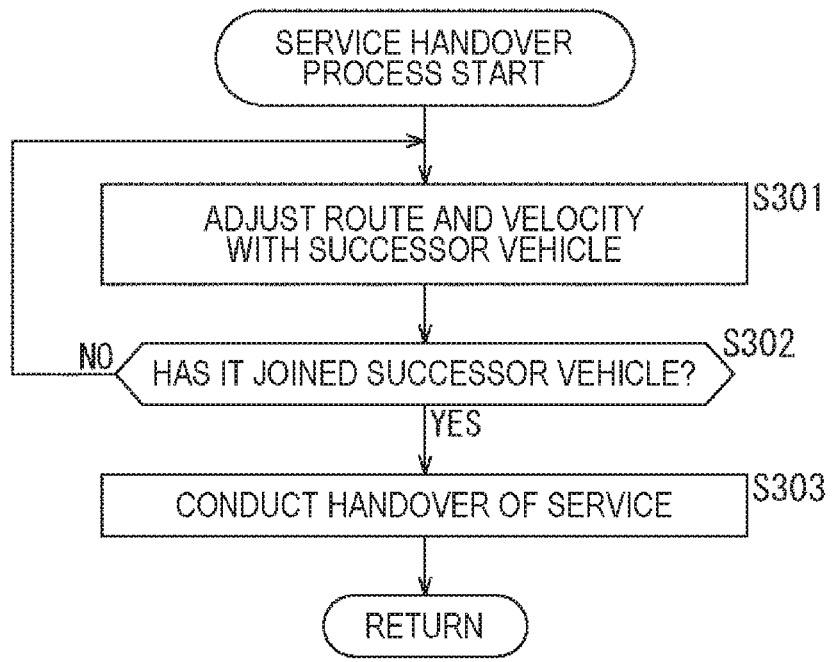
FIG. 27 is a flowchart for explaining a service handover process in detail.

Note that, in a case where there are no provider vehicles 202 that can provide the service in the surroundings as shown in FIG. 26, the provider vehicle 202A may not search for a provider vehicle 202, but may transmit the vehicle search request data immediately to the server 203.

After that, the service provision request process comes to an end.

Referring back to FIG. 22, in a case where the service provision unit 365 receives service transfer request data from the server 203 via the network 204 and the communication unit 368 in step S204, on the other hand, the service provision unit 365 determines to transfer provision of the service, and the process moves on to step S208.

In step S208, the service provision unit 365 determines whether or not transfer of the service is necessary. Specifically, in a case where the service provision unit 365 is requested for a takeover of the service by the provider vehicle 202 requested to provide the service (this provider vehicle 202 will be hereinafter referred to as the successor vehicle) in step S151 in FIG. 21 described above, the service provision unit 365 determines that transfer of the service is necessary, and the process moves on to step S209.

In step S209, the provider vehicle 202 performs a service handover process, and the service provision process then comes to an end. Referring now to the flowchart in FIG. 27, the service handover process is described in detail.

In step S301, the provider vehicle 202 adjusts the route and the velocity with the successor vehicle. Specifically, the planning unit 362 plans the route and the velocity for joining the successor vehicle, while communicating with the successor vehicle via the communication unit 368 and, if necessary, the network 204. The operation control unit 367 controls operation of the provider vehicle 202 so as to travel on the planned route at the planned velocity, and join the successor vehicle.

Figure 21:
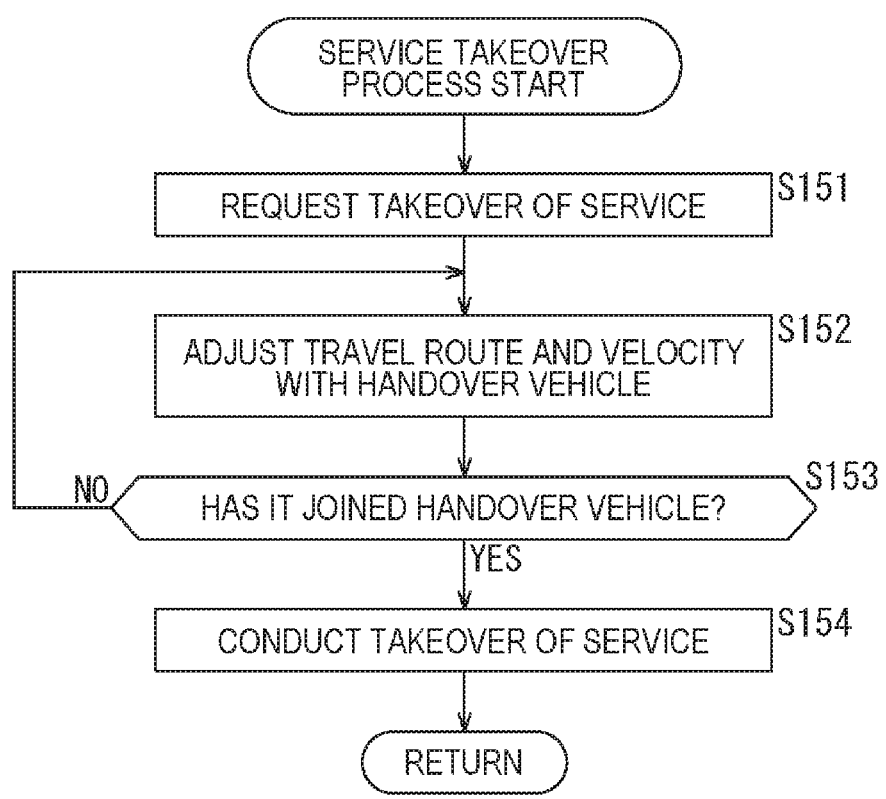
FIG. 21 is a flowchart for explaining a service takeover process in detail.
Figure 22:
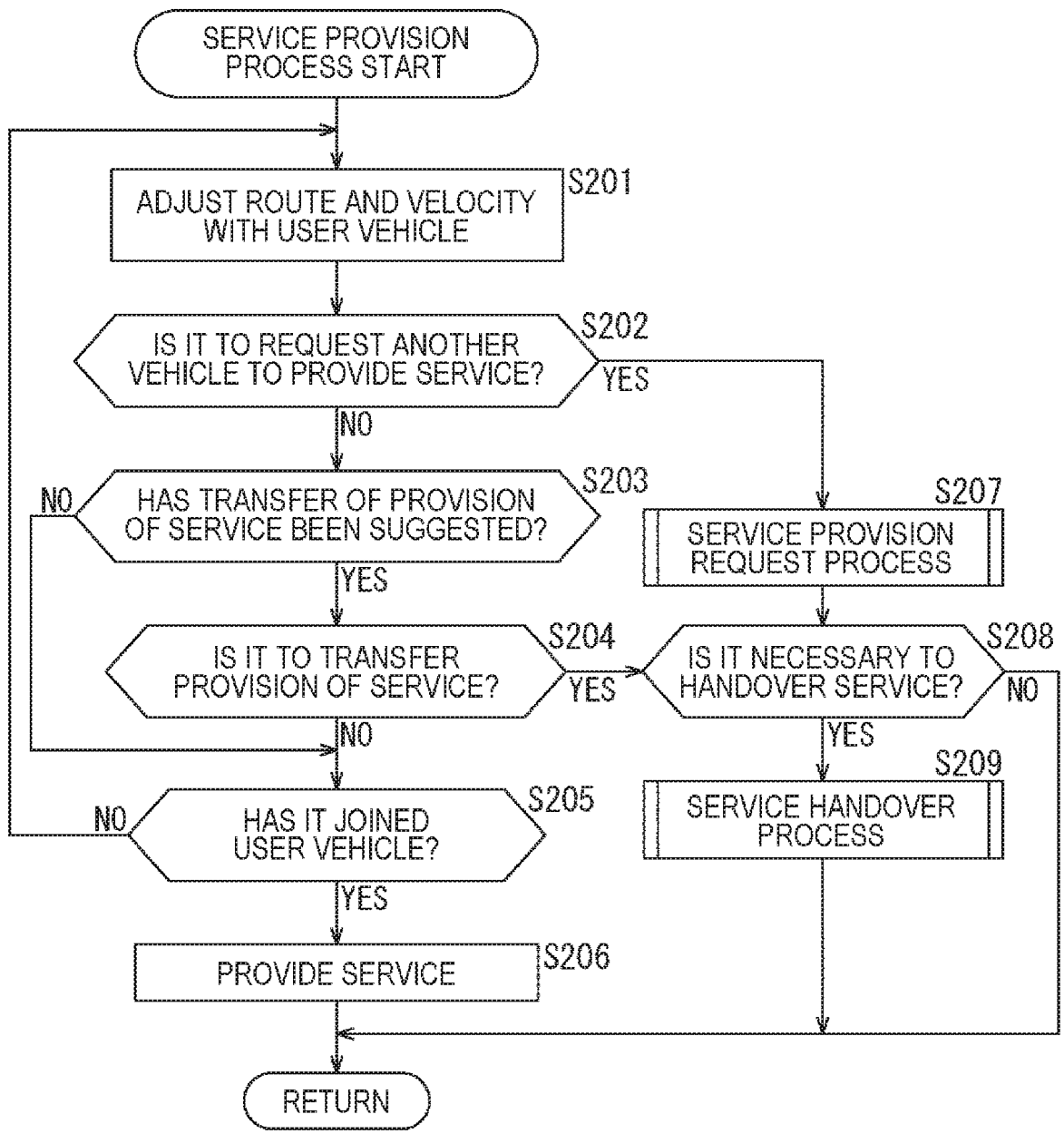
FIG. 22 is a flowchart for explaining a service provision process in detail.

Note that this process is performed in correspondence with the process performed by the successor vehicle in step S152 in FIG. 21.

In step S302, the service provision unit 365 determines whether or not the provider vehicle 202 has joined the successor vehicle. If it is determined that the provider vehicle 202 has not joined the successor vehicle, the process returns to step S301.

After that, the processes in steps S301 and S302 are repeatedly performed, until it is determined in step S302 that the provider vehicle 202 has joined the successor vehicle. Thus, route and velocity adjustment is performed between the provider vehicle 202 and the successor vehicle, until the provider vehicle 202 joins the successor vehicle.

If it is determined in step S302 that the provider vehicle 202 has joined the successor vehicle, on the other hand, the process moves on to step S303.

In step S303, the service provision unit 365 conducts a handover of the service. Specifically, the service provision unit 365 provides the successor vehicle with what is to be used for providing the service (such as the articles to be provided to the user, or the equipment to be used for the service, for example). Thus, provision of the service is handed over from the provider vehicle 202 (the handover vehicle) to the successor vehicle.

Note that this process in step S303 is performed in correspondence with the process performed by the successor vehicle in step S154 in FIG. 21.

After that, the service handover process comes to an end.

Referring back to FIG. 22, if it is determined in step S208 that a handover of the service is not necessary, on the other hand, the process in step S209 is skipped, and the service provision process comes to an end.

Referring back to FIG. 20, if it is determined in step S102 that the service cannot be provided, the process moves on to step S108.

In step S108, the order reception unit 361 notifies that the service cannot be provided. Specifically, the order reception unit 361 generates unavailability data indicating that the service cannot be provided. In a case where the order reception unit 361 has received service provision inquiry data from the server 203, the order reception unit 361 then transmits the unavailability data to the server 203 via the communication unit 368 and the network 204. In a case where the order reception unit 361 has received service provision inquiry data from another provider vehicle 202, on the other hand, the order reception unit 361 transmits the unavailability data to the provider vehicle 202 via the communication unit 368 and, if necessary, the network 204.

After that, the process returns to step S101, and the processes in step S101 and the later steps are performed.

As described above, the user vehicle 201 and the provider vehicle 202 can join on the joining route while running, and receive and provide a service. Thus, the user can use the service provided by the provider vehicle 202 while remaining in the user vehicle 201 without stopping the user vehicle 201.

Further, as the server 203 selects an appropriate provider vehicle 202 and requests a service, user satisfaction increases.

Furthermore, in a case where the provider vehicle 202 cannot join the user vehicle 201 or becomes unable to provide the service, the provider vehicle 202 requests, directly or via the server 203, another provider vehicle 202 to provide the service. Thus, the service can be provided without fail.

<Specific Examples of Methods for Sharing Service Provision>

Next, specific examples of methods for sharing a service among provider vehicles 202 in a case where the service to be provided is delivery of a package in the series of processes described above are described, with reference to FIGS. 28 through 35.

Figure 28:
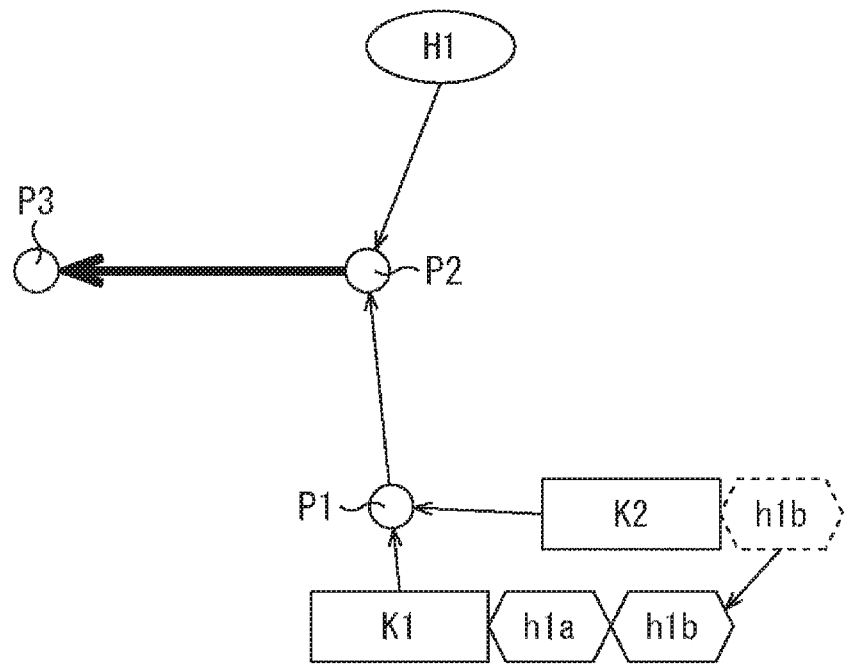
FIG. 28 is a diagram for explaining a specific example of a method for sharing a service of a provider vehicle.

FIG. 28 shows an example case where a provider vehicle K2 receives an order for delivery of a package h1b to a user vehicle H1 while a provider vehicle K1 is delivering a package h1a to the user vehicle H1.

For example, the provider vehicle K1 plans to join the user vehicle H1 at a point P2, and hand over the package h1a between the point P2 and a point P3. Meanwhile, the time of arrival of the provider vehicle K2 at the point P2 is later than the time of arrival of the provider vehicle K1.

Figures 29, 30:
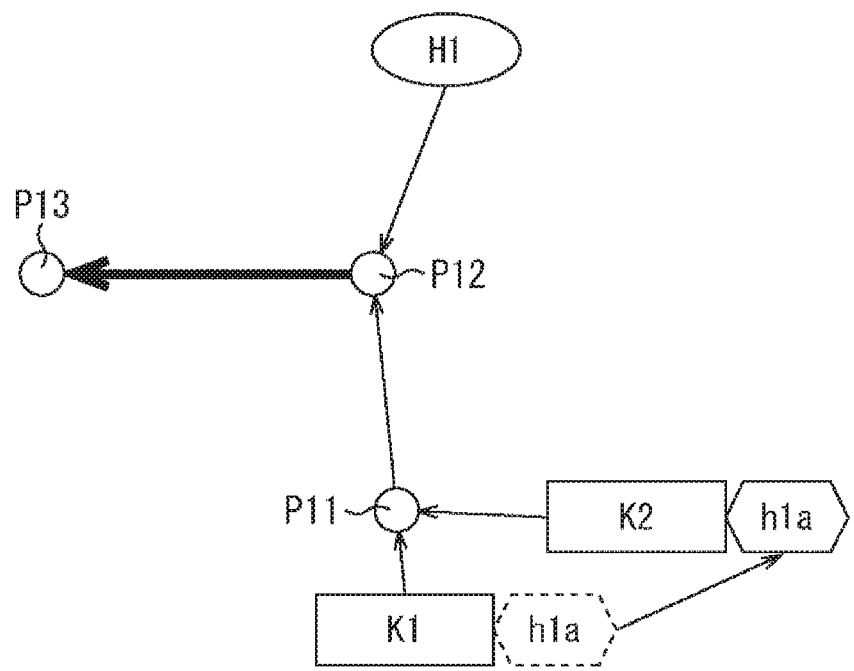
FIG. 29 is a table for explaining a specific example of a method for sharing a service of a provider vehicle.
FIG. 30 is a diagram for explaining a specific example of a method for sharing a service of a provider vehicle.

In this case, (the planning unit 412 of) the server 203 determines that the provider vehicle K1 is more suitable for delivering the package h1b to the user vehicle H1 than the provider vehicle K2, as shown in FIG. 29, for example.

Note that the table in FIG. 29 shows the degrees of suitability for or priority on delivery of packages from the provider vehicles K1 through K4 to the user vehicles H1 through H4. P in the table indicates "primary", and S indicates "secondary".

Accordingly, the server 203 instructs the provider vehicle K1 and the provider vehicle K2 to transfer the package h1b from the provider vehicle K2 to the provider vehicle K1.

The provider vehicle K1 and the provider vehicle K2 join at a point P1, and the provider vehicle K2 hands over the package h1b to the provider vehicle K1. The provider vehicle K1 then joins the user vehicle H1 at the point P2, and hands over the package h1a and the package h1b to the user vehicle H1 between the point P2 and the point P3.

In this manner, delivery of packages can be performed more quickly and efficiently.

FIG. 30 shows an example case where the provider vehicle K2 that can join the user vehicle H1 earlier than the provider vehicle K1 is found while the provider vehicle K1 is delivering the package h1a to the user vehicle H1.

For example, the provider vehicle K1 plans to join the user vehicle H1 at a point P12, and hands over the package h1a between the point P12 and a point P13. Meanwhile, the time of arrival of the provider vehicle K2 at the point P2 is earlier than the time of arrival of the provider vehicle K1.

Figure 31:
FIG. 31 is a table for explaining a specific example of a method for sharing a service of a provider vehicle.

In this case, the server 203 determines that the provider vehicle K2 is more suitable for delivering the package h1a to the user vehicle H1 than the provider vehicle K1, as shown in FIG. 31, for example. Accordingly, the server 203 instructs the provider vehicle K1 and the provider vehicle K2 to transfer the package h1a from the provider vehicle K1 to the provider vehicle K2.

The provider vehicle K1 and the provider vehicle K2 join at a point P11, and the provider vehicle K1 hands over the package h1a to the provider vehicle K2. The provider vehicle K2 then joins the user vehicle H1 at the point P12, and hands over the package h1a to the user vehicle H1 between the point P12 and the point P13.

In this manner, delivery of a package can be performed more quickly.

Figure 32:
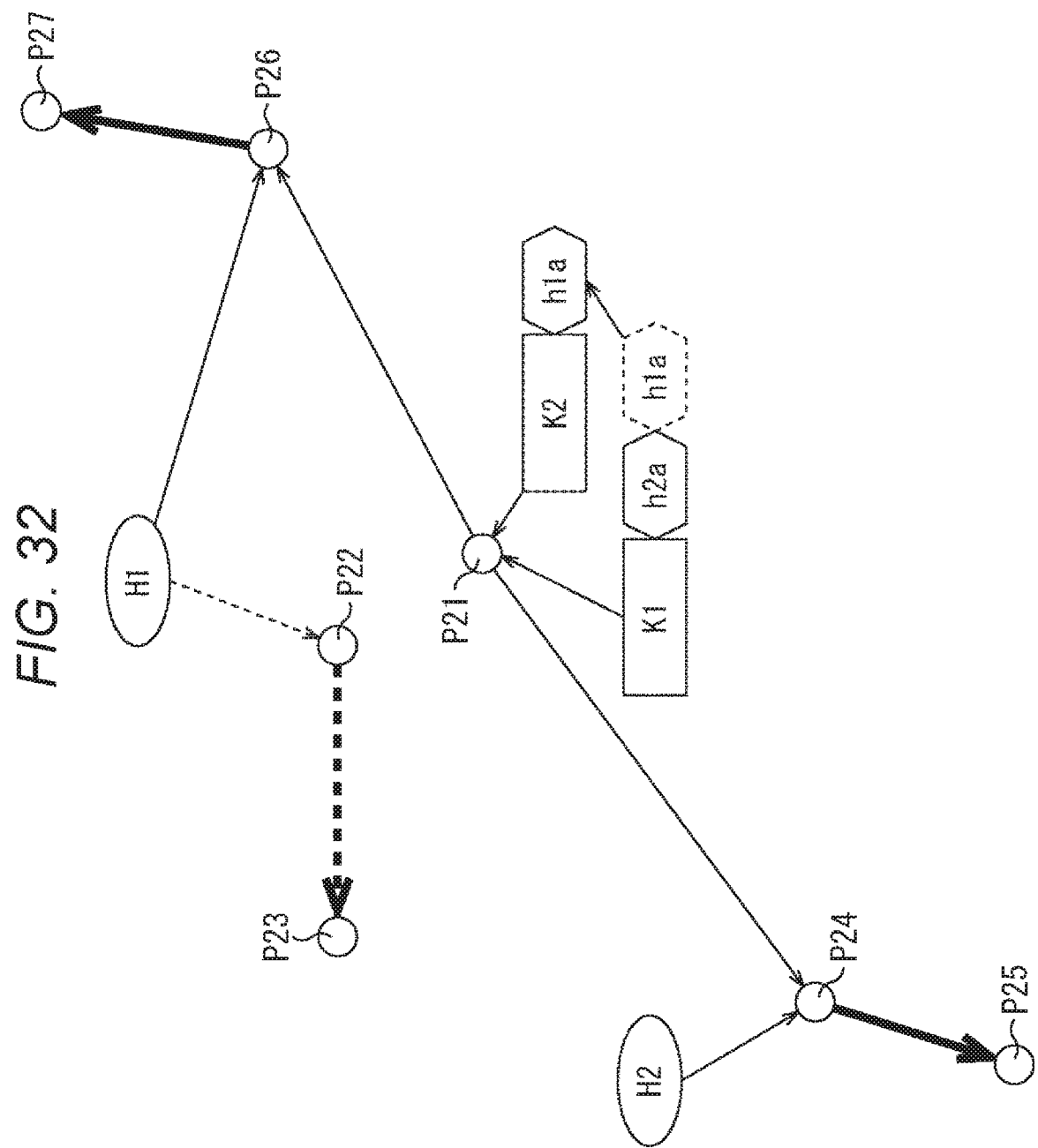
FIG. 32 is a diagram for explaining a specific example of a method for sharing a service of a provider vehicle.

FIG. 32 shows an example in which the user vehicle H1 changes routes in a case where the provider vehicle K1 delivers the package h1a to the user vehicle H1, and delivers a package h2a to a user vehicle H2.

For example, the provider vehicle K1 plans to join the user vehicle H1 at a point P22, and hand over the package h1a between the point P22 and a point P23. The provider vehicle K1 also plans to join the user vehicle H2 at a point P24, and hands over the package h2a between the point P24 and a point P25.

Figure 33:
FIG. 33 is a table for explaining a specific example of a method for sharing a service of a provider vehicle.

In this case, when the user vehicle H1 changes its route from the route indicated by a dotted line to the route indicated by a solid line, for example, the server 203 determines that the provider vehicle K2 is more suitable for delivering the package h1a to the user vehicle H1 than the provider vehicle K1, as shown in FIG. 33. Accordingly, the server 203 instructs the provider vehicle K1 and the provider vehicle K2 to transfer the package h1a from the provider vehicle K1 to the provider vehicle K2.

The provider vehicle K1 and the provider vehicle K2 join at a point P21, and the provider vehicle K1 hands over the package h1a to the provider vehicle K2. The provider vehicle K1 then heads straight to the point P24 without going to the point P22, joins the user vehicle H2 at the point P24, and hands over the package h2a to the user vehicle H2 between the point P24 and the point P25. Meanwhile, the provider vehicle K2 heads to a point P26, joins the user vehicle H1 at the point P26, and hands over the package h1a to the user vehicle H1 between the point P26 and a point P27.

In this manner, even if the user vehicle 201 changes routes, it is possible to appropriately cope with the change, and deliver a package.

Figure 34:
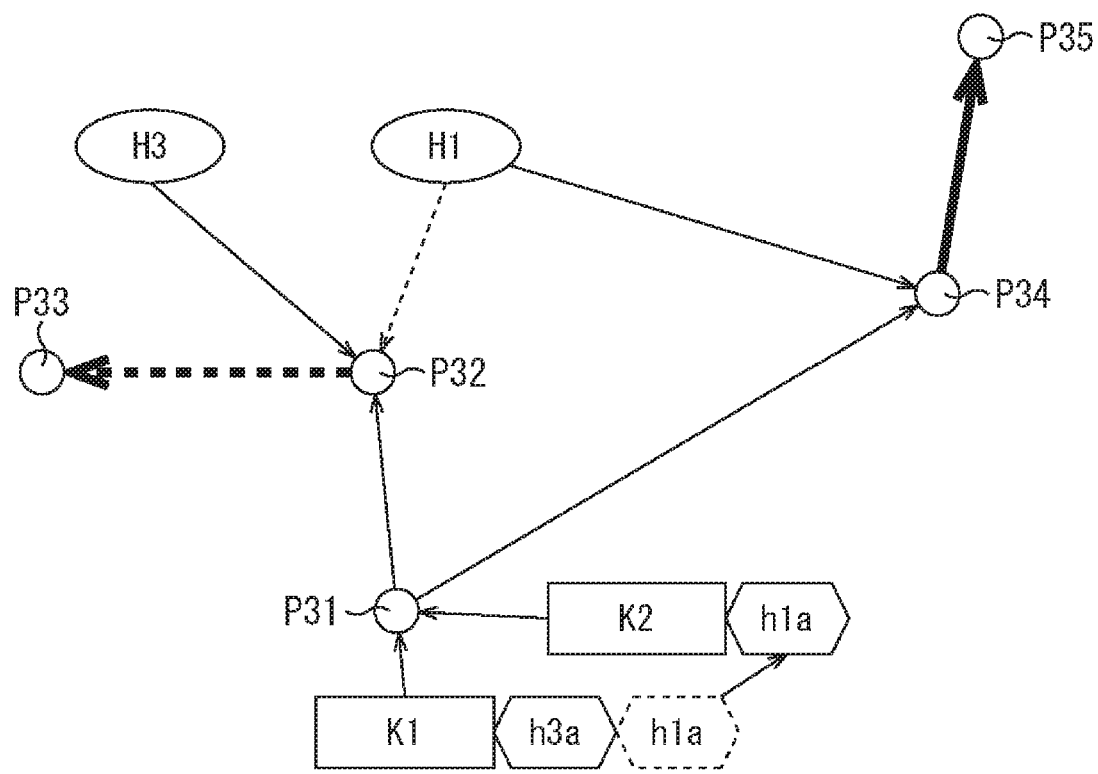
FIG. 34 is a diagram for explaining a specific example of a method for sharing a service of a provider vehicle.

FIG. 34 shows an example in which the user vehicle H1 changes routes in a case where the provider vehicle K1 delivers the package h1a to the user vehicle H1, and delivers a package h3a to a user vehicle H3.

For example, the user vehicle H1 and the user vehicle H3 are scheduled to join at a point P32. The provider vehicle K1 then plans to join the user vehicle H1 and the user vehicle H3 at the point P32, and hand over the package h1a and the package h3a between the point P32 and a point P33.

Figure 35:
FIG. 35 is a table for explaining a specific example of a method for sharing a service of a provider vehicle.

In this case, when the user vehicle H1 changes its route from the route indicated by a dotted line to the route indicated by a solid line, and gives up joining the user vehicle H3, for example, the server 203 determines that the provider vehicle K2 is more suitable for delivering the package h1a to the user vehicle H1 than the provider vehicle K1, as shown in FIG. 35. Accordingly, the server 203 instructs the provider vehicle K1 and the provider vehicle K2 to transfer the package h1a from the provider vehicle K1 to the provider vehicle K2.

The provider vehicle K1 and the provider vehicle K2 join at a point P31, and the provider vehicle K1 hands over the package h1a to the provider vehicle K2. The provider vehicle K1 then joins the user vehicle H3 at the point P32, and hands over the package h3a to the user vehicle H3 between the point P32 and the point P33. Meanwhile, the provider vehicle K2 joins the user vehicle H1 at a point P34, and hands over the package h1a to the user vehicle H1 between the point P34 and a point P35.

In this manner, even if the user vehicle 201 changes routes, it is possible to appropriately cope with the change, and deliver a package.

<Specific Examples of Processes in the Service Provision/Reception System>

Next, specific examples of processes in the service provision/reception system 200 are described.

Specifically, the processes to be performed in a case where an energy supply/reception service for supplying/receiving energy is performed between a user vehicle 201 and a provider vehicle 202 are described. Note that a combination of a user vehicle 201 and a provider vehicle 202 has been determined in advance, and the following is a description of the processes to be performed from the time when the user vehicle 201 and the provider vehicle 202 join, till the time when the energy supply/reception service is performed.

<Energy Supply/Reception Service Use Process>

Figure 36:
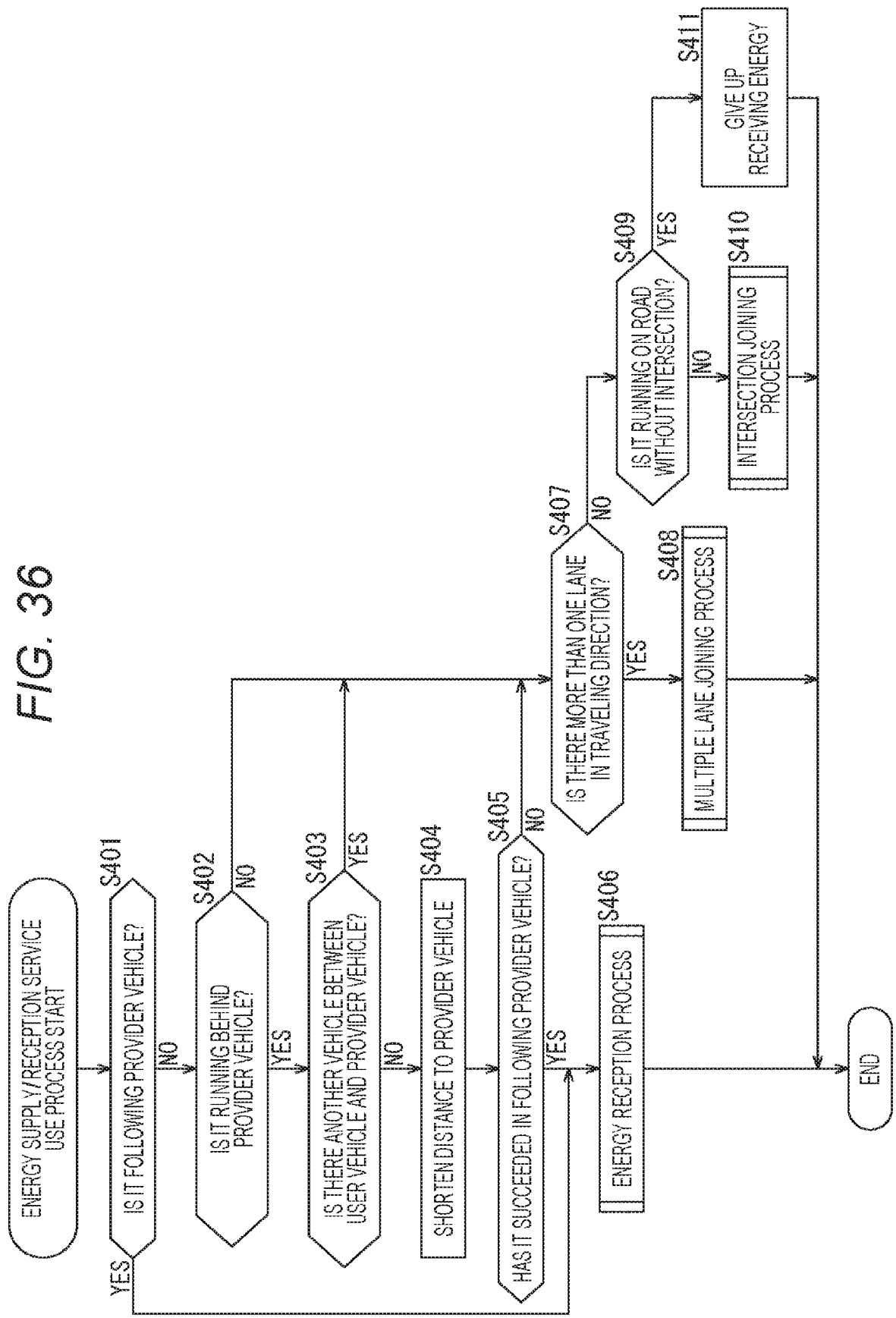
FIG. 36 is a flowchart for explaining an energy supply/ reception service use process.

Referring first to a flowchart shown in FIG. 36, an energy supply/reception service use process to be performed by a user vehicle 201 is described.

In step S401, the service use unit 313 determines whether or not the user vehicle 201 is following the provider vehicle 202.

Note that a state in which the user vehicle 201 is following the provider vehicle 202 is a state in which the user vehicle 201 is running immediately behind the provider vehicle 202 in the same lane as the provider vehicle 202, and the distance between the provider vehicle 202 and the user vehicle 201 is within such a range that an energy supply/reception service can be performed (this range will be hereinafter referred to as the service providable range), for example.

For example, the service use unit 313 communicates with the provider vehicle 202 via the communication unit 316 and, if necessary, the network 204, uses the results of estimation of the user vehicle 201 by the self-location estimation unit 314, or uses external information acquired by the data acquisition unit 102, to detect relative positions of the user vehicle 201 and the provider vehicle 202. If the service use unit 313 determines that the user vehicle 201 is not following the provider vehicle 202 on the basis of the detection results, the process then moves on to step S402.

In step S402, the service use unit 313 determines whether or not the user vehicle 201 is running behind the provider vehicle 202.

A state in which the user vehicle 201 is running behind the provider vehicle 202 is a state in which the user vehicle 201 is running behind the provider vehicle 202 in the same lane as the provider vehicle 202. Another vehicle may be running between the provider vehicle 202 and the user vehicle 201.

If it is determined that the user vehicle 201 is running behind the provider vehicle 202, the process moves on to step S403.

In step S403, the service use unit 313 determines whether or not another vehicle exists between the user vehicle 201 and the provider vehicle 202. If it is determined that any other vehicle does not exist between the user vehicle 201 and the provider vehicle 202, the process moves on to step S404.

In step S404, the user vehicle 201 shortens the distance to the provider vehicle 202. Specifically, the operation control unit 315 communicates with the provider vehicle 202 via the communication unit 316 and, if necessary, the network 204, and cooperates with the provider vehicle 202, to control the velocity and the like of the user vehicle 201 so that the distance between the two vehicles falls within the service providable range.

In step S405, the service use unit 313 determines whether or not the user vehicle 201 has succeeded in following the provider vehicle 202. If it is determined that the user vehicle 201 has succeeded in following the provider vehicle 202, the process moves on to step S406.

In step S406, the user vehicle 201 performs an energy reception process, and the energy supply/reception service use process comes to an end.

Figure 37:
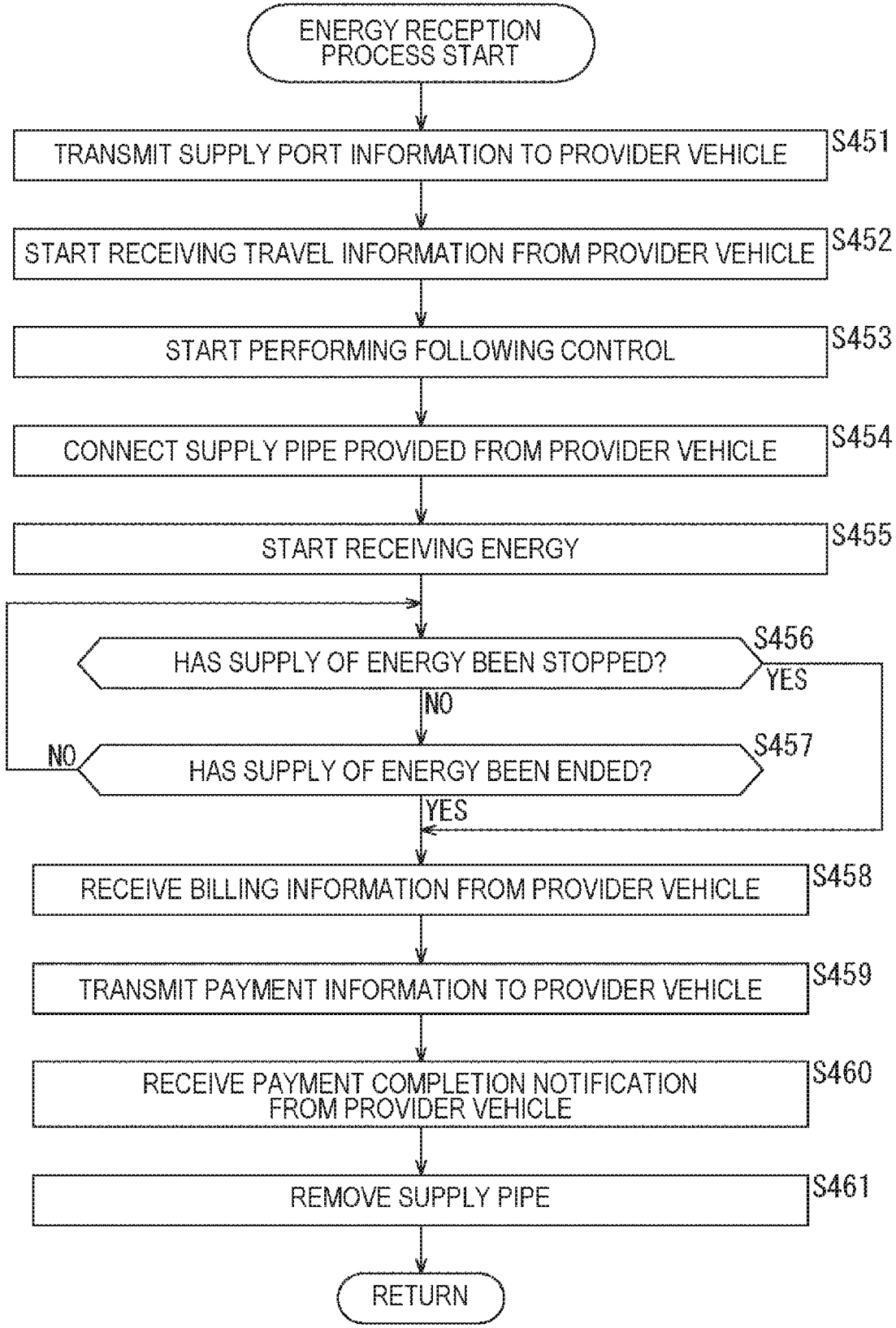
FIG. 37 is a flowchart for explaining an energy reception process in detail.
Figure 38:
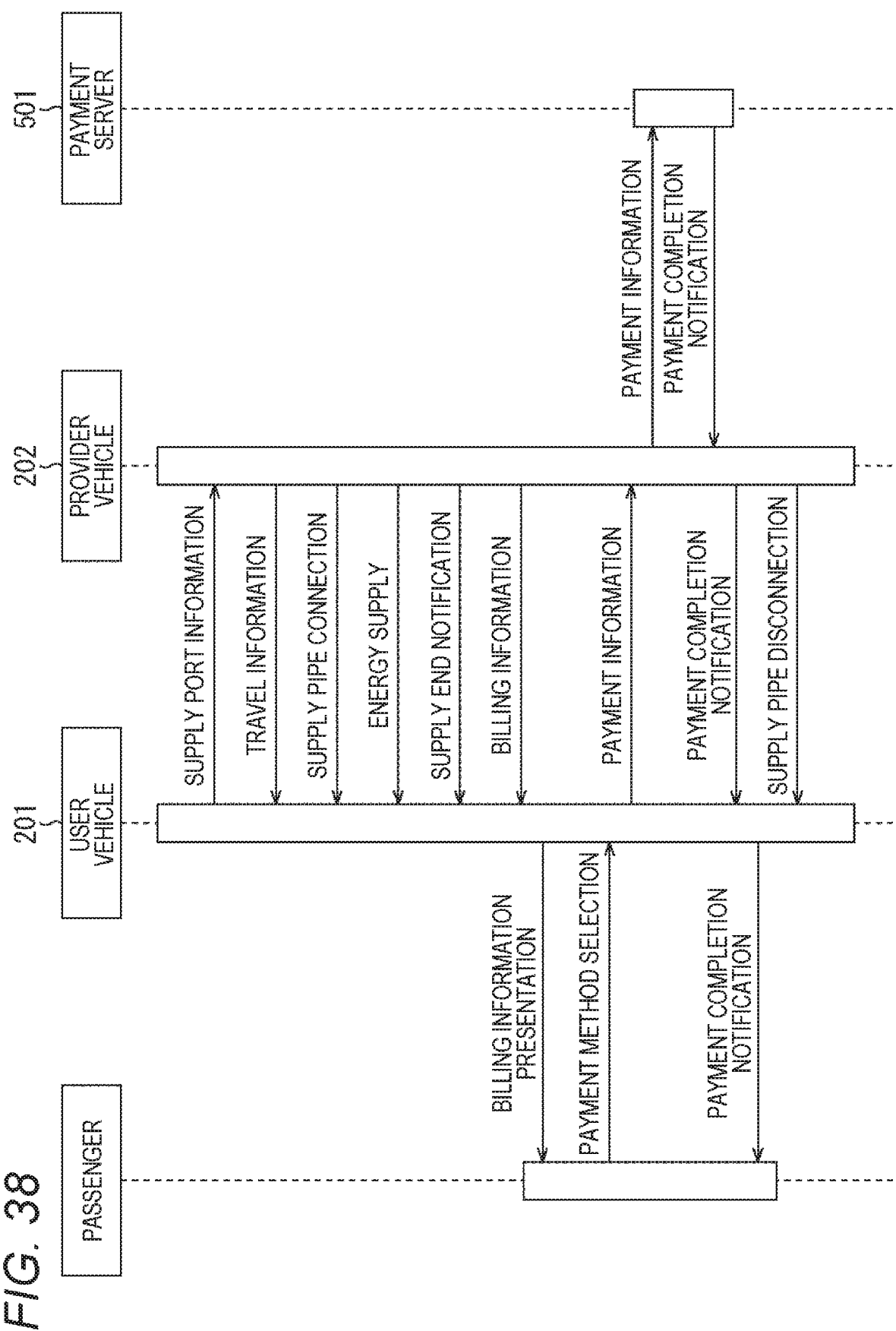
FIG. 38 is a sequence diagram for explaining an energy reception process and an energy supply process in detail.

Referring now to the flowchart in FIG. 37 and the sequence diagram in FIG. 38, the energy reception process is described in detail.

In step S451, the service use unit 313 transmits supply port information to the provider vehicle 202 via the communication unit 316 and, if necessary, the network 204.

A supply port is a connection port to which the supply pipe to be used for energy supply/reception is connected. The supply port information includes information about the position, the shape, and the like of the supply port of the user vehicle 201.

The provider vehicle 202 receives the supply port information in step S651 in FIG. 52 described later, and starts transmitting travel information in step S652.

The travel information is motion information relating to motion (such as a running state, for example) of the provider vehicle 202, and is mainly used by the user vehicle 201 to recognize and predict movement of the provider vehicle 202. The travel information includes the velocity, the steering angle, the position in the lane, a predicted position in a vertical direction (height direction) of the provider vehicle 202, acceleration information, brake information, lane change information, and the like, for example.

In step S452, the communication unit 316 starts receiving the travel information from the provider vehicle 202 via the network 204 as necessary.

In step S453, the user vehicle 201 starts performing following control. The following control is to control the user vehicle 201 to follow the provider vehicle 202 so that supply of energy can be stably received from the provider vehicle 202.

For example, the user vehicle 201 starts performing acceleration/deceleration control.

For example, the planning unit 312 plans acceleration of the user vehicle 201, on the basis of acceleration information supplied from the provider vehicle 202. For example, the acceleration information includes the acceleration time of the provider vehicle 202, the acceleration formula indicating a change in velocity during the acceleration, and the velocity after the acceleration. On the basis of the acceleration information, the planning unit 312 plans the acceleration time of the user vehicle 201, the change in velocity during the acceleration, and the velocity after the acceleration. Under the control of the operation control unit 315, the user vehicle 201 accelerates according to the plan made by the planning unit 312.

The planning unit 312 also plans deceleration of the user vehicle 201, on the basis of brake information supplied from the provider vehicle 202, for example. For example, the brake information includes the braking time of the provider vehicle 202, the deceleration formula indicating a change in velocity during the braking, and the velocity after the deceleration. On the basis of the brake information, the planning unit 312 plans the braking time of the user vehicle 201, the change in velocity during the braking, and the velocity after the deceleration. Under the control of the operation control unit 315, the user vehicle 201 performs braking according to the plan made by the planning unit 312.

Further, the user vehicle 201 starts performing roll control, for example. Roll control is the control to be performed to cause the user vehicle 201 to follow horizontal (lateral) sway of the provider vehicle 202 so that the user vehicle 201 can follow the same track as the provider vehicle 202. The horizontal sway of the provider vehicle 202 occurs due to a natural wind, a wind generated by a large-sized vehicle (such as a truck or a bus, for example) running in an adjacent lane, or the like, for example.

Figure 39:
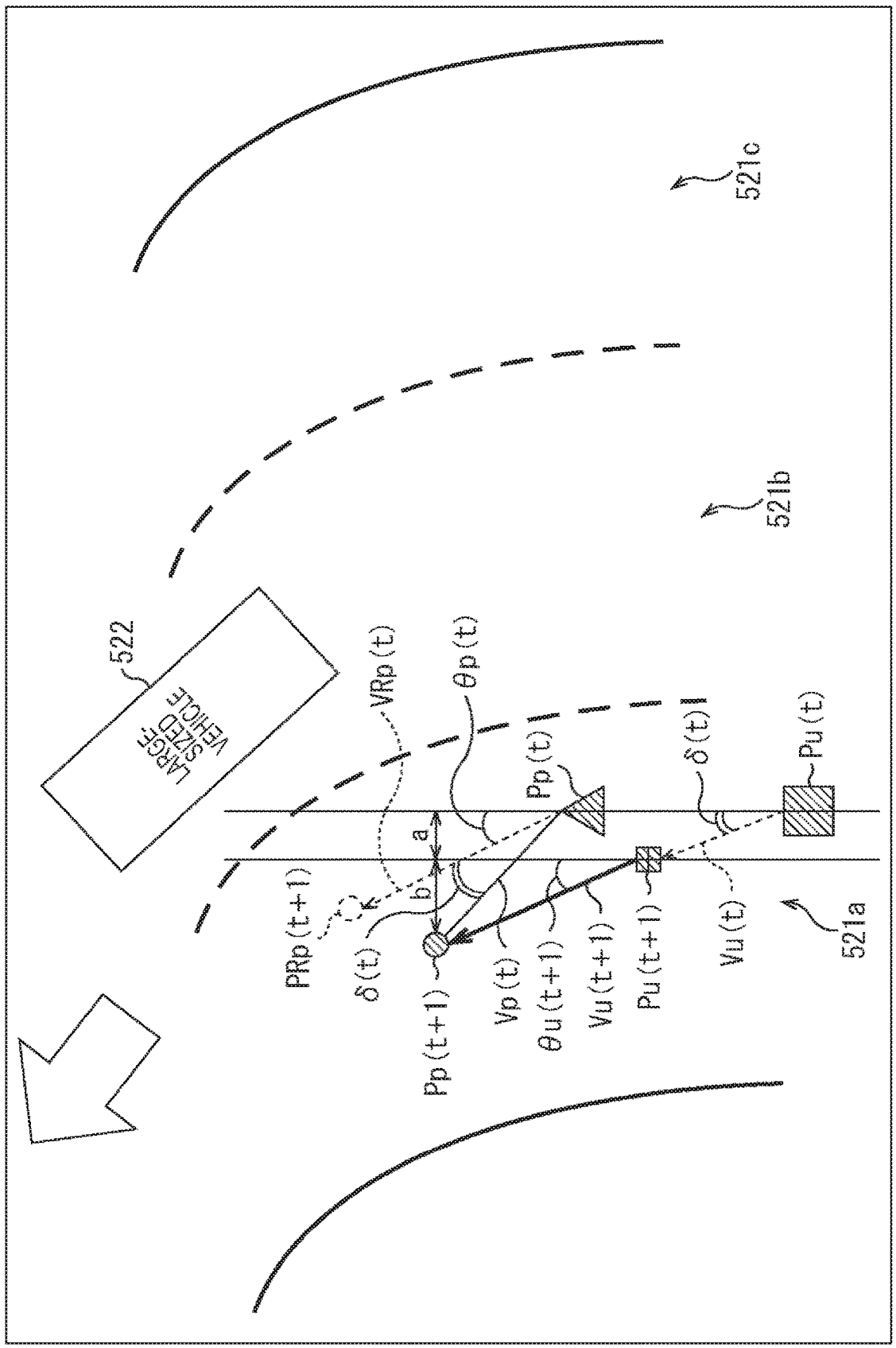
FIG. 39 is a diagram for explaining a specific example of roll control.

Referring now to FIG. 39, a specific example of the roll control is described.

In this example, the user vehicle 201 and the provider vehicle 202 are running in a lane 521a among lanes 521a through 521c that curve leftward. Meanwhile, at time t, the provider vehicle 202 is at a position Pp(t), and the user vehicle 201 is at a position Pu(t). Further, at time t, the provider vehicle 202 sets a velocity vp(t) and a steering angle θp(t), and transmits travel information including the position Pp(t), the velocity vp(t), and the steering angle θp(t) to the user vehicle 201. Also, at time t, the self-location estimation unit 314 of the user vehicle 201 estimates the position Pu(t) of the user vehicle 201.

In this case, at time t+1, the planning unit 312 of the user vehicle 201 plans the velocity and the steering angle (moving direction) of the user vehicle 201 so that the user vehicle 201 reaches the position Pp(t), for example. Under the control of the operation control unit 315, the user vehicle 201 moves according to the plan made by the planning unit 312.

On the basis of the velocity vp(t) and the steering angle θp(t) of the provider vehicle 202, the planning unit 312 also predicts the position PRp(t+1) of the provider vehicle 202 at time t+1. In this case, after reaching the position Pp(t) at time t+1, the user vehicle 201 is set to the same velocity and the same steering angle as the velocity vp(t) and the steering angle θp(t) of the provider vehicle 202 at time t, so that the user vehicle 201 can reach the predicted position PRp(t+1) at time t+2.

At this point of time, it is assumed that the steering angles of the provider vehicle 202 and the user vehicle 201 have changed to the left by an angle δ(t), due to the influence of the wind generated by a large-sized vehicle 522 running in the adjacent lane 521b, for example. In this case, at time t+1, the provider vehicle 202 reaches a position Pp(t+1), and the user vehicle 201 reaches a position Pu(t+1). Also, at time t+1, the provider vehicle 202 sets a velocity vp(t+1) and a steering angle θp(t+1), and transmits travel information including the position Pp(t+1), the velocity vp(t+1), and the steering angle θp(t+1) to the user vehicle 201. Further, at time t+1, the self-location estimation unit 314 of the user vehicle 201 estimates the position Pu(t+1) of the user vehicle 201.

In this case, even if the user vehicle 201 is set to the same velocity and the same steering angle as the velocity vp(t) and the steering angle θp(t) of the provider vehicle 202 of time t at the time t+1, the user vehicle 201 cannot reach the position Pp(t+1) of the provider vehicle 202 of time t+1 at time t+2. Therefore, the user vehicle 201 controls the velocity vu(t+1) and the steering angle θu(t+1) at time t+1 through the roll control.

For example, the planning unit 312 calculates the magnitude |Vu(t+1)| of the vector Vu(t+1) connecting the position Pu(t+1) of the user vehicle 201 at time t+1 and the position Pp(t+1) of the provider vehicle 202 at time t+1, and the steering angle θu(t+1), on the basis of expressions (1) through (4) shown below.

$$Vp(t) \cdot VRp(t) = |Vp(t)| \times |VRp(t)| \times \cos \delta(t) \quad (1)$$

$$\sin \delta(t) = a \div |Vu(t)| \quad (2)$$

$$\sin\{\theta p(t) + \delta(t)\} = (a+b) \div |Vp(t)| \quad (3)$$

$$\sin \theta u(t+1) = b \div |Vu(t+1)| \quad (4)$$

The vector Vp(t) is the vector connecting the position Pp(t) of the provider vehicle 202 at time t and the position Pp(t+1) of the provider vehicle 202 at time t+1, and is calculated on the basis of the travel information supplied from the provider vehicle 202. The vector VRp(t) is the vector connecting the position Pp(t) of the provider vehicle 202 at time t and the predicted position PRp(t+1) at time t+1, and is calculated on the basis of the travel information supplied from the provider vehicle 202. Note that the provider vehicle 202 may calculate the vector Vp(t) and the vector VRp(t), and provide the calculation results to the user vehicle 201, for example. The vector Vu(t) is the vector connecting the position Pu(t) of the user vehicle 201 at time t and the position Pu(t+1) of the user vehicle 201 at time t+1, and is calculated on the basis of the result of estimation performed by the self-location estimation unit 314.

The distance a is the amount of movement in a direction perpendicular to the direction from the position Pu(t) of the user vehicle 201 at time t toward the position Pp(t) of the provider vehicle 202 at time t, among the amounts of movement of the user vehicle 201 between time t and time t+1. The distance a+b is the amount of movement in a direction perpendicular to the direction from the position Pu(t) toward the position Pp(t), among the amounts of movement of the provider vehicle 202 between time t and time t+1.

The planning unit 312 then divides the magnitude |Vu(t+1)| of the vector Vu(t+1) by the time between time t+2 and time t+1, to calculate the velocity vu(t+1). The operation control unit 315 sets the velocity and the steering angle of the user vehicle 201 at time t+1 at the velocity vu(t+1) and the steering angle θu(t+1).

The user vehicle 201 also starts performing pitch control, for example. The pitch control is the control to be performed so that the position of the supply port of the user vehicle 201 in the height direction follows fluctuation of the position of the provider vehicle 202 in the height direction (vertical direction) due to a slope, unevenness of a road surface, or the like. For example, the operation control unit 315 starts the pitch control on the user vehicle 201, on the basis of the results of prediction performed by the self-location estimation unit 314 to predict the position of the user vehicle 201 in the height direction, and the result of prediction of the position of the provider vehicle 202 in the height direction indicated by the travel information.

Figure 40:
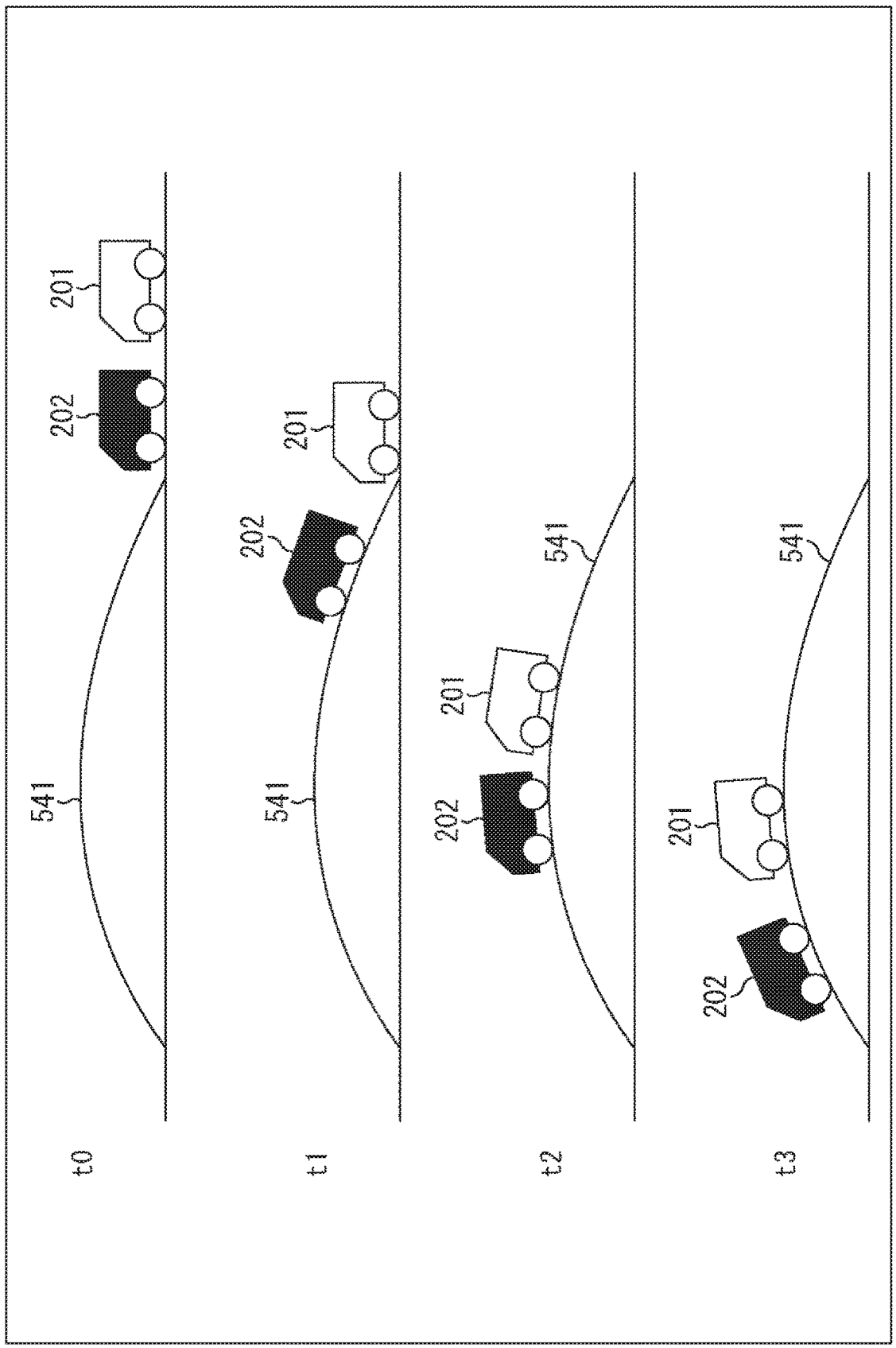
FIG. 40 is a diagram for explaining a specific example of pitch control.

Referring now to FIGS. 40 and 41, a specific example of the pitch control is described.

FIG. 40 schematically shows an example of changes in the positions of the user vehicle 201 and the provider vehicle 202 in the height direction during the period from time t0 to time t3. Note that the user vehicle 201 is following the provider vehicle 202. At time t0, both vehicles are running on the same road surface before a slope 541. After that, both vehicles run on the slope 541, with the user vehicle 201 following the provider vehicle 202.

FIG. 41 shows the amounts of change (unit: mm) in the positions of the provider vehicle 202 and the user vehicle 201 in the height direction, the height difference (unit: mm) between the two vehicles, and the control amount (unit: mm) of the pitch control on the user vehicle 201, at time t0 through time t3. Note that the amounts of change in the positions in the height direction are such that the upward direction is the positive direction while the downward direction is the negative direction. The height difference between the two vehicles is a positive value in a case where the provider vehicle 202 is higher than the user vehicle 201, and is a negative value in a case where the provider vehicle 202 is lower than the user vehicle 201.

Note that the control amounts of the pitch control on the user vehicle 201 are adjusted with the height of the supply port and the height of the user vehicle 201 through the suspension. In the description below, the height of the supply port can be changed within a range of ±200 mm, with a predetermined standard position being the reference. Further, in a case where it is not possible to follow fluctuations of the position of the provider vehicle 202 in the height direction simply by adjusting the height of the supply port, the position of the supply port in the height direction is adjusted with the height of the user vehicle 201.

For example, at time t0, the provider vehicle 202 predicts that the provider vehicle 202 will be at a position 300 mm higher than that of time t0 at time t1, and notifies the user vehicle 201 of the prediction result. Meanwhile, at time t0, the self-location estimation unit 314 of the user vehicle 201 predicts that the user vehicle 201 will be at the same height as that of time t0 at time t1.

Note that the position of a vehicle in the height direction is predicted on the basis of the result of detection that has been performed to detect the condition of the road surface in the traveling direction of the vehicle on the basis of an image of the forward of the vehicle, the results of detection performed by sensors such as an acceleration sensor, a gyroscope sensor, and an atmospheric pressure sensor, and the like, for example.

Accordingly, the operation control unit 315 predicts that the height difference from the provider vehicle 202 will be +300 mm at time t1, and sets the control amount of the pitching control. For example, the operation control unit 315 sets the position of the supply port in the height direction at time t1 at +200 mm. The operation control unit 315 also sets the height of the user vehicle 201 at time t1 at +100 mm, because the height difference from the provider vehicle 202 cannot be eliminated only with the position of the supply port in the height direction.

The operation control unit 315 then changes the height of the supply port from the standard position to +200 mm, and changes the vehicle height from the standard position to +100 mm during the period from time t0 till time t1.

Next, at time t1, the provider vehicle 202 predicts that the provider vehicle 202 will be at a position 100 mm higher than that of time t1 at time t2, and notifies the user vehicle 201 of the prediction result. Meanwhile, at time t1, the self-location estimation unit 314 of the user vehicle 201 predicts that the user vehicle 201 will be at a position 200 mm higher than that of time t1 at time t2.

Accordingly, the operation control unit 315 predicts that the height difference from the provider vehicle 202 will be +200 mm at time t2, and sets the control amount of the pitching control. For example, the operation control unit 315 sets the position of the supply port in the height direction at time t2 at +200 mm. The operation control unit 315 also sets the height of the user vehicle 201 at time t2 at the standard position.

The operation control unit 315 then maintains the height of the supply port at a height of +200 mm, and changes the vehicle height from +100 mm to the standard position during the period from time t1 till time t2.

Next, at time t2, the provider vehicle 202 predicts that the provider vehicle 202 will be at a position 200 mm lower than that of time t2 at time t3, and notifies the user vehicle 201 of the prediction result. Meanwhile, at time t2, the self-location estimation unit 314 of the user vehicle 201 predicts that the user vehicle 201 will be at a position 100 mm higher than that of time t2 at time t3.

Accordingly, the operation control unit 315 predicts that the height difference from the provider vehicle 202 will be −100 mm at time t3, and sets the control amount of the pitching control. For example, the operation control unit 315 sets the position of the supply port in the height direction at time t3 at −100 mm. The operation control unit 315 also sets the height of the user vehicle 201 at time t3 at the standard position.

The operation control unit 315 then changes the height of the supply port from +200 mm to −100 mm, and maintains the vehicle height at the standard position during the period from time t2 till time t3.

In this manner, the position of the supply port in the height direction can be promptly made to follow fluctuations of the position of the provider vehicle 202 in the height direction. This facilitates connection of the supply pipe to the supply port of the user vehicle 201, and prevents the supply pipe from coming off the supply port of the user vehicle 201 after the connection.

Further, the user vehicle 201 starts performing lane change control, for example.

For example, the planning unit 312 plans a lane change for the user vehicle 201, on the basis of lane change information supplied from the provider vehicle 202. For example, the lane change information includes a destination lane, a lane change start time ts, a lane change completion time te, a position change formula expressing a change in the position of the provider vehicle 202 in a horizontal direction during the lane change, an acceleration/deceleration formula expressing a change in the velocity of the provider vehicle 202 during the lane change, and the velocity after the lane change.

Figure 42:
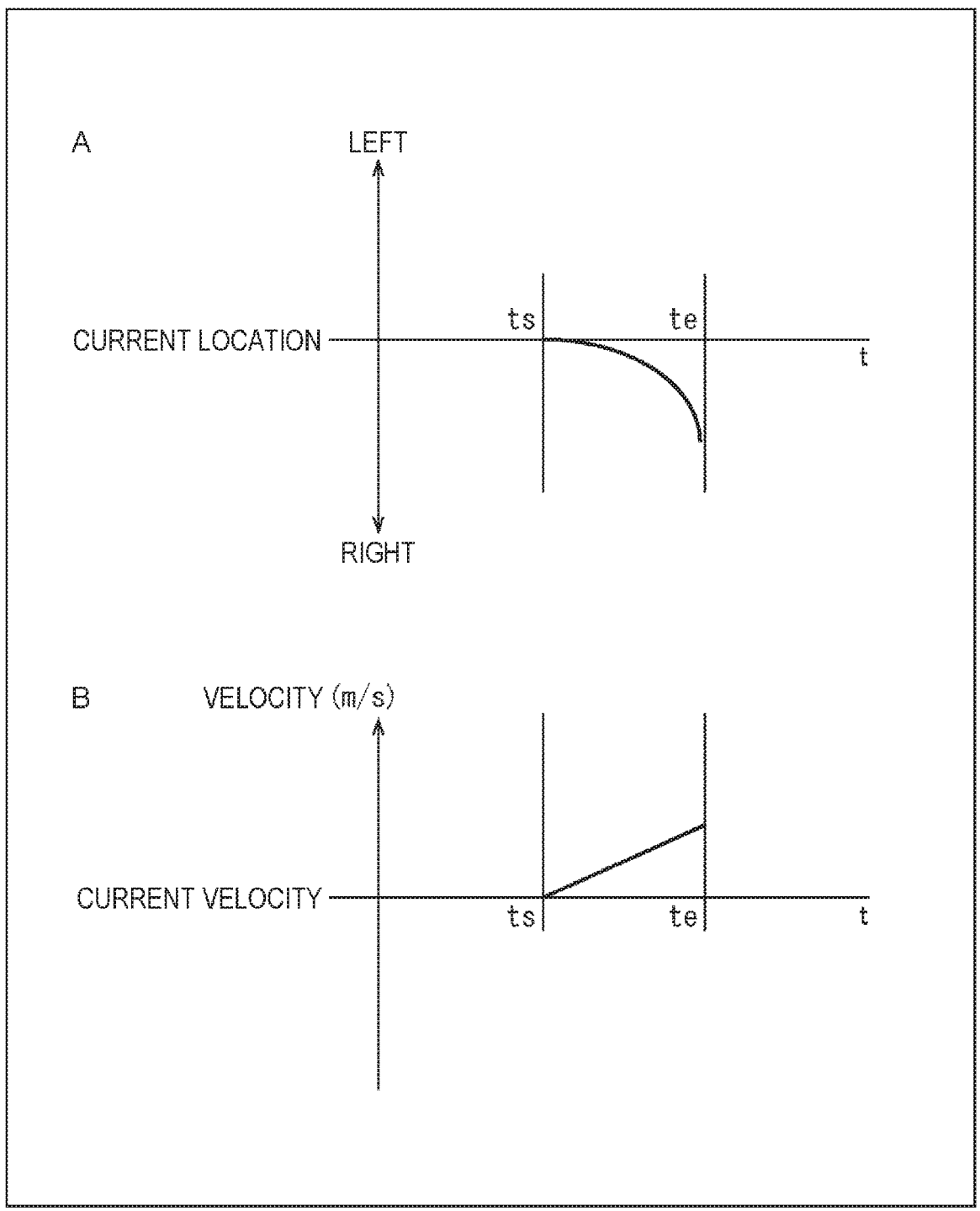
FIGS. 42A and 42B are diagrams for explaining a specific example of lane change control.

FIG. 42A is a graph showing an example of the position change formula. The abscissa axis indicates time t, and the ordinate axis indicates the relative position of the provider vehicle 202 in a horizontal direction with respect to the position (current location) of the provider vehicle 202 prior to the lane change. The position change formula is then represented by the line from the lane change start time is to the lane change completion time te.

FIG. 42B is a graph showing an example of the acceleration/deceleration formula. The abscissa axis indicates time t, and the ordinate axis indicates the relative velocity of the provider vehicle 202 with respect to the velocity (current velocity) prior to the lane change. The acceleration/deceleration formula is then represented by the line from the lane change start time is to the lane change completion time te.

Figure 43:
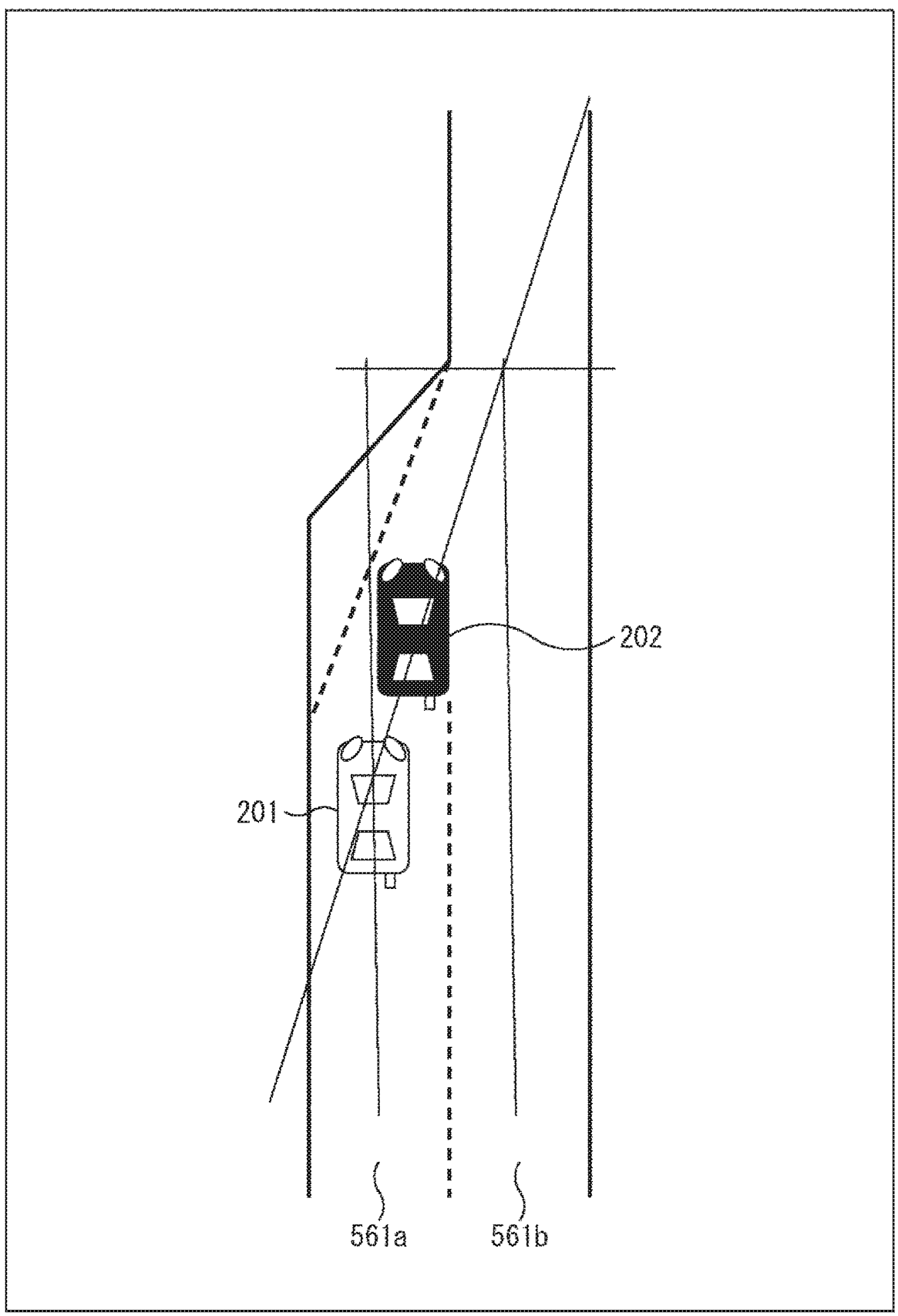
FIG. 43 is a diagram for explaining a specific example of lane change control.

Under the control of the operation control unit 315, the user vehicle 201 then changes lanes according to the plan made by the planning unit 312. As a result, the user vehicle 201 changes lanes from a lane 561a to a lane 561b, following the provider vehicle 202 changing lanes from the lane 561a to the lane 561b, as shown in FIG. 43, for example. During this time, the distance between the provider vehicle 202 and the user vehicle 201 is kept substantially constant.

Referring back to FIG. 37, in step S454, the user vehicle 201 connects the supply pipe provided by the provider vehicle 202. Specifically, the operation control unit 315 communicates with the provider vehicle 202 via the communication unit 316 and, if necessary, the network 204, and cooperates with the provider vehicle 202, to connect the supply pipe provided by the provider vehicle 202 to the supply port.

Figure 44:
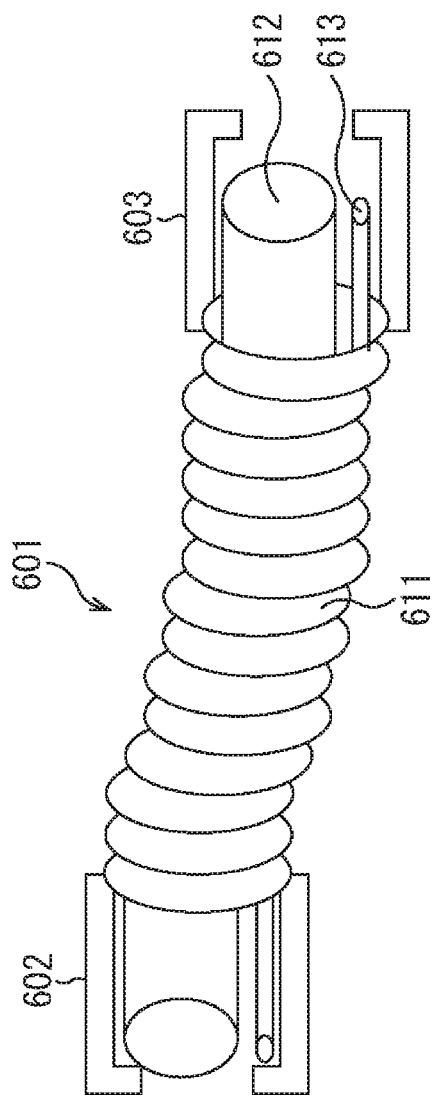
FIG. 44 is a schematic diagram showing a first example of a supply pipe.
Figure 45:
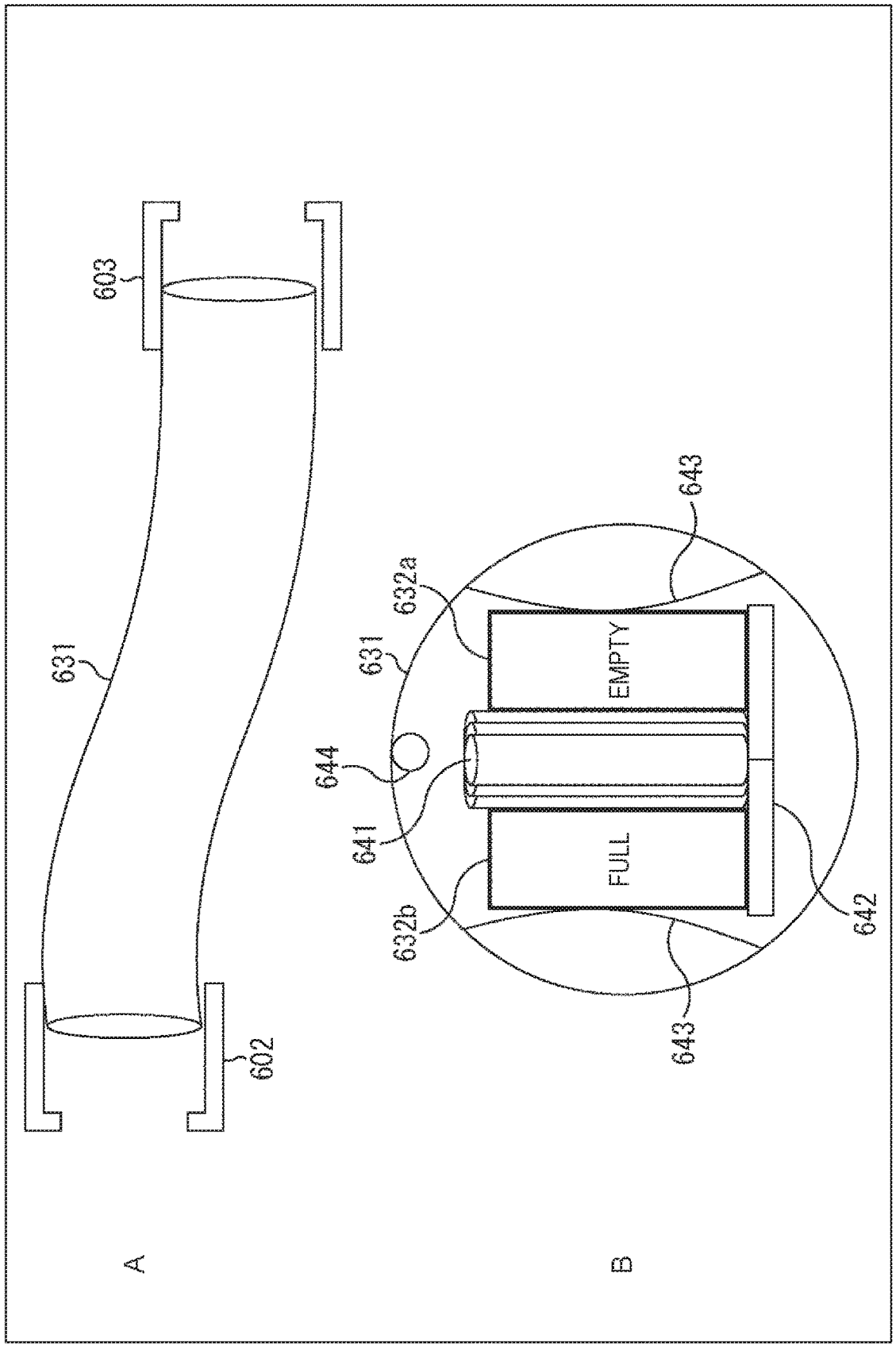
FIGS. 45A and 45B are schematic diagrams showing a second example of a supply pipe.

FIGS. 44, 45A and 45B show examples of the supply pipe.

FIG. 44 shows an example of a supply pipe 601 for supplying energy such as liquid (gasoline, light oil, liquefied natural gas (LNG), or the like, for example), gas (hydrogen, for example), solid fuel, or electricity.

The supply pipe 601 is connected between the supply port 602 of the provider vehicle 202 and the supply port 603 of the user vehicle 201, for example. The supply pipe 601 includes an outer pipe 611, an energy supply pipe 612, and a communication line 613.

The outer pipe 611 is a tube having durability and flexibility, and protects the energy supply pipe 612 and the communication line 613 extending inside.

The energy supply pipe 612 includes a material having resistance to the energy to be supplied, and is a flexible pipe. The energy to be supplied is supplied from the provider vehicle 202 to the user vehicle 201 through the energy supply pipe 612.

The communication line 613 is a cable for information transmission between the provider vehicle 202 and the user vehicle 201.

FIGS. 45A and 45B show an example of a supply pipe 631 for supplying a package containing energy. FIG. 45A schematically shows the configuration of the exterior of the supply pipe 631. FIG. 45B schematically shows a cross-section of the supply pipe 631

The supply pipe 631 is connected between the supply port 602 of the provider vehicle 202 and the supply port 603 of the user vehicle 201, for example.

Inside the supply pipe 631, a drive unit 641, a stage 642, a protector 643, and a communication line 644 are provided. A package 632a containing no energy, and a package 632b containing energy are then moved on the stage 642 by the drive unit 641, being protected by the protector 643. With this arrangement, the package 632a is returned from the user vehicle 201 to the provider vehicle 202, and the package 632b is supplied from the provider vehicle 202 to the user vehicle 201.

The communication line 644 is a cable for information transmission between the provider vehicle 202 and the user vehicle 201.

Note that a battery or the like can be supplied through the supply pipe 631.

Meanwhile, the supply port is preferably located at a position where the supply pipe can be easily connected, such as a position near the hood or the bumper of the user vehicle 201 or the bottom of the vehicle body. Further, an identification mark such as a QR code (registered trademark) may be provided in the vicinity of the supply port so that the supply port can be easily recognized through image recognition or the like, for example.

Referring back to FIG. 37, in step S455, the user vehicle 201 starts receiving energy. Specifically, the service use unit 313 communicates with the provider vehicle 202 via the communication unit 316 and the supply pipe, and cooperates with the provider vehicle 202, to start receiving energy supplied from the provider vehicle 202.

In step S456, the service use unit 313 determines whether or not the supply of energy has been stopped. If it is determined that the supply of energy has not been stopped, the process moves on to step S457.

In step S457, the service use unit 313 determines whether or not the supply of energy has ended. If it is determined that the supply of energy has not ended, the process returns to step S457.

After that, the processes in step S456 and S457 are repeatedly performed, until it is determined in step S456 that the supply of energy has been stopped, or until it is determined in step S457 that the supply of energy has ended.

If it is determined in step S656 in FIG. 52 described later that the supply of energy has ended, the provider vehicle 202 in step S657 transmits a supply end notification for notifying that the supply of energy has ended.

Meanwhile, if the service use unit 313 receives the supply end notification via the communication unit 316 and the supply pipe, the service use unit 313 determines in step S457 that the supply of energy has ended, and the process moves on to step S458.

Further, if it is determined in step S655 in FIG. 52 described later that the supply of energy is to be stopped, the provider vehicle 202 in step S658 transmits a supply stop notification for notifying that the supply of energy has been stopped. This is a case where it becomes difficult for the user vehicle 201 to follow the provider vehicle 202, or the like, for example.

Meanwhile, if the service use unit 313 receives the supply stop notification via the communication unit 316 and the supply pipe, the service use unit 313 determines in step S456 that the supply of energy has been stopped, and the process moves on to step S458.

In step S458, the service use unit 313 receives, via the communication unit 316 and the supply pipe, billing information transmitted from the provider vehicle 202 in the process in step S659 in FIG. 52 described later.

The billing information includes the contents of the provided service, the service use fee, the available payment method, and the like, for example. Note that, in a case where the supply of energy has been stopped halfway through, the fee for usage till the stop of the supply is requested, for example.

The service use unit 313 presents the billing information to the passenger of the user vehicle 201 via the output unit 106, for example.

In step S459, the user vehicle 201 transmits payment information to the provider vehicle 202.

Specifically, the passenger of the user vehicle 201 inputs a payment method and the like via the input unit 101, in response to the presented billing information.

The service use unit 313 generates the payment information including the contents of the service, the service usage fee, and the selected payment method. The service use unit 313 transmits the payment information to the provider vehicle 202 via the communication unit 316 and the supply pipe.

The provider vehicle 202 receives the payment information in step S660 in FIG. 52 described later, and, in step S663 after performing a payment process with a payment server 501, transmits a payment completion notification for notifying that the payment has been completed.

In step S460, the service use unit 313 receives the payment completion notification from the provider vehicle 202 via the communication unit 316 and the supply pipe. The service use unit 313 notifies the passenger of the user vehicle 201 of the completion of the payment, via the output unit 106, for example.

In step S461, the user vehicle 201 removes the supply pipe. Specifically, the operation control unit 315 communicates with the provider vehicle 202 via the communication unit 316 and the supply pipe, and cooperates with the provider vehicle 202, to remove the supply pipe from the supply port.

After that, the energy reception process comes to an end.

Referring back to FIG. 36, if it is determined in step S402 that the user vehicle 201 is not running behind the provider vehicle 202, if it is determined in step S403 that another vehicle exists between the user vehicle 201 and the provider vehicle 202, or if it is determined in S405 that the user vehicle 201 has failed to follow the provider vehicle 202, the process moves on to step S407.

In step S407, the self-location estimation unit 314 determines whether or not there is a plurality of lanes in the traveling direction. If it is determined that there is a plurality of lanes in the traveling direction, or if there are two or more lanes in the traveling direction of the user vehicle 201 on the road on which the user vehicle 201 is running, the process moves on to step S408.

In step S408, the user vehicle 201 performs a multiple lane joining process, and the energy supply/reception service use process comes to an end.

Figure 46:
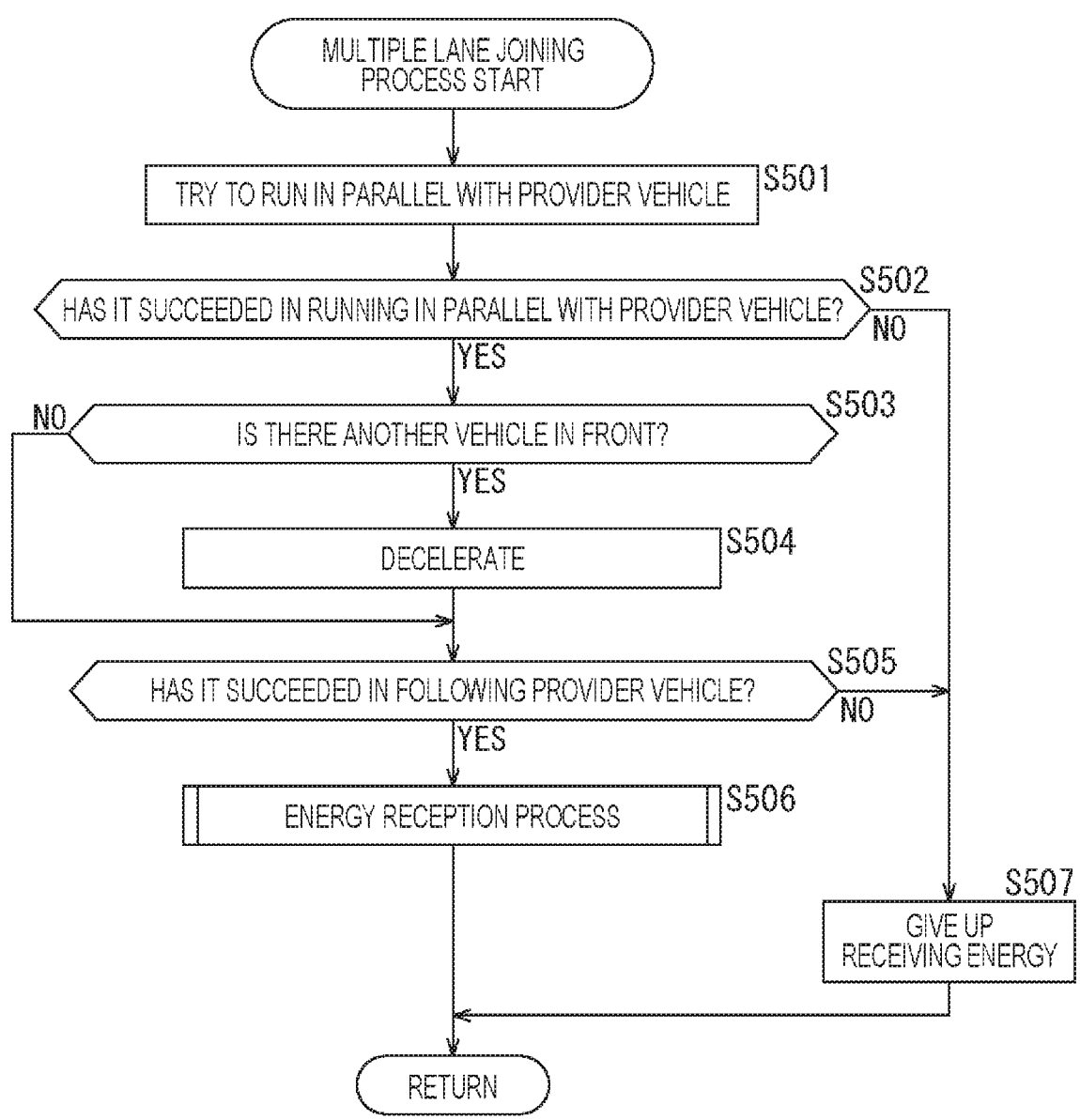
FIG. 46 is a flowchart for explaining a multiple lane joining process in detail.

Referring now to the flowchart in FIG. 46, the multiple lane joining process is described in detail.

In step S501, the user vehicle 201 attempts to run in parallel with the provider vehicle 202. The parallel running of the user vehicle 201 and the provider vehicle 202 in this process means that the user vehicle 201 and the provider vehicle 202 run in the same direction side by side in lanes adjacent to each other.

For example, the planning unit 312 communicates with the provider vehicle 202 via the communication unit 316 and, if necessary, the network 204, and cooperates with the provider vehicle 202, to set the route for the user vehicle 201 to run in parallel with the provider vehicle 202 (this route will be hereinafter referred to as the parallel-running route). The planning unit 312 plans a route, a velocity, and the like so as to reach the parallel-running route at the same time as the provider vehicle 202. Under the control of the operation control unit 315, the user vehicle 201 runs according to the plan made by the planning unit 312.

In step S502, the operation control unit 315 determines whether or not the user vehicle 201 has succeeded in running in parallel with the provider vehicle 202. If it is determined that the user vehicle 201 has succeeded in running in parallel with the provider vehicle 202, the process moves on to step S503.

In step S503, the operation control unit 315 determines whether or not another vehicle is running in front of the user vehicle 201. If there exists another vehicle within a predetermined distance range in front of the user vehicle 201 in the lane in which the user vehicle 201 is running, the operation control unit 315 determines that another vehicle is running in front of the user vehicle 201, and the process moves on to step S504.

In step S504, the user vehicle 201 decelerates, under the control of the operation control unit 315. That is, the user vehicle 201 decelerates so that the provider vehicle 202 can cut into the space between the user vehicle 201 and the vehicle running in front of the user vehicle 201, and thus, increases the distance to the vehicle running in front of the user vehicle 201.

After that, the process moves on to step S505.

If any other vehicle does not exist within the predetermined distance range in front of the user vehicle 201 in the lane in which the user vehicle 201 is running in step S503, on the other hand, the operation control unit 315 determines that any other vehicle is not running in front of the user vehicle 201. The process in step S504 is then skipped, and the process moves on to step S505.

In step S505, it is determined whether or not the user vehicle 201 has succeeded in following the provider vehicle 202, as in the process in step S405 in FIG. 36. If it is determined that the user vehicle 201 has succeeded in following the provider vehicle 202, the process moves on to step S506. This is a case where the provider vehicle 202 has cut in front of the user vehicle 201 due to a lane change, and the user vehicle 201 has succeeded in following the provider vehicle 202, for example.

In step S506, the energy reception process described above with reference to FIG. 37 is performed, and the multiple lane joining process comes to an end.

If it is determined in step S502 that the user vehicle 201 has failed to run in parallel with the provider vehicle 202, or if it is determined in step S505 that the user vehicle 201 has failed to follow the provider vehicle 202, on the other hand, the process moves on to step S507.

In step S507, the user vehicle 201 gives up receiving energy. For example, the service use unit 313 communicates with the provider vehicle 202 via the communication unit 316 and, if necessary, the network 204, and notifies that energy reception from the provider vehicle 202 is given up.

After that, the multiple lane joining process comes to an end.

Referring back to FIG. 36, if it is determined in step S407 that there is not a plurality of lanes in the traveling direction, or if there is one lane in the traveling direction of the user vehicle 201 on the road on which the user vehicle 201 is running, on the other hand, the process moves on to step S409.

In step S409, the self-location estimation unit 314 determines whether or not the user vehicle 201 is running on a road without an intersection. If it is determined that the user vehicle 201 is running on a road with an intersection, the process moves on to step S410.

Here, a road without an intersection may be an expressway, an exclusive motorway, or the like, for example, and the roads other than that may be roads with intersections.

In step S410, the user vehicle 201 performs an intersection joining process, and the energy supply/reception service use process comes to an end.

Figure 47:
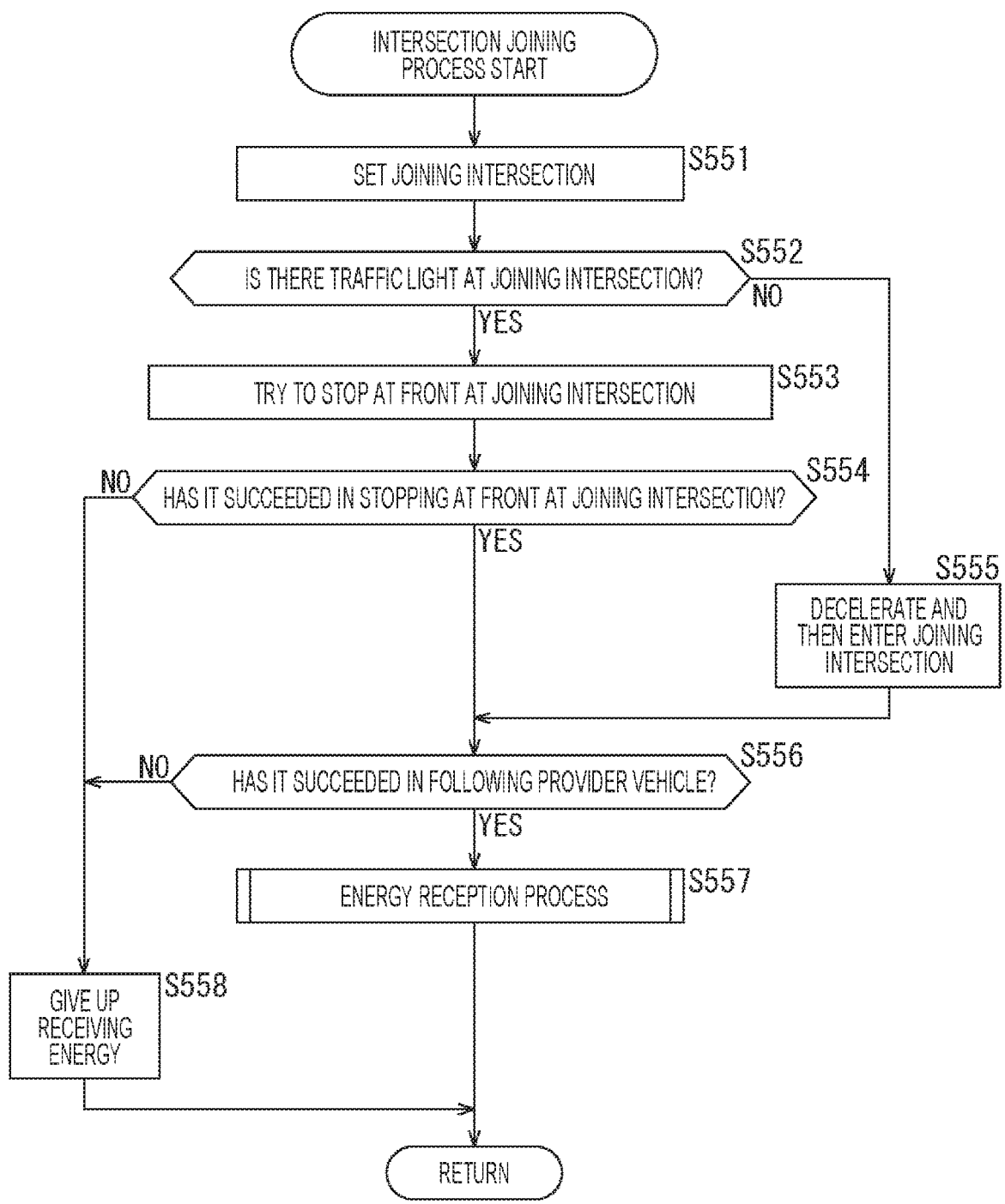
FIG. 47 is a flowchart for explaining an intersection joining process in detail.

Referring now to the flowchart in FIG. 47, the intersection joining process is described in detail.

In step S551, the planning unit 312 sets a joining intersection. Specifically, the planning unit 312 communicates with the provider vehicle 202 via the communication unit 316 and, if necessary, the network 204, and cooperates with the provider vehicle 202, to set a joining intersection that is the intersection at which the two vehicles are to join.

Figure 48:
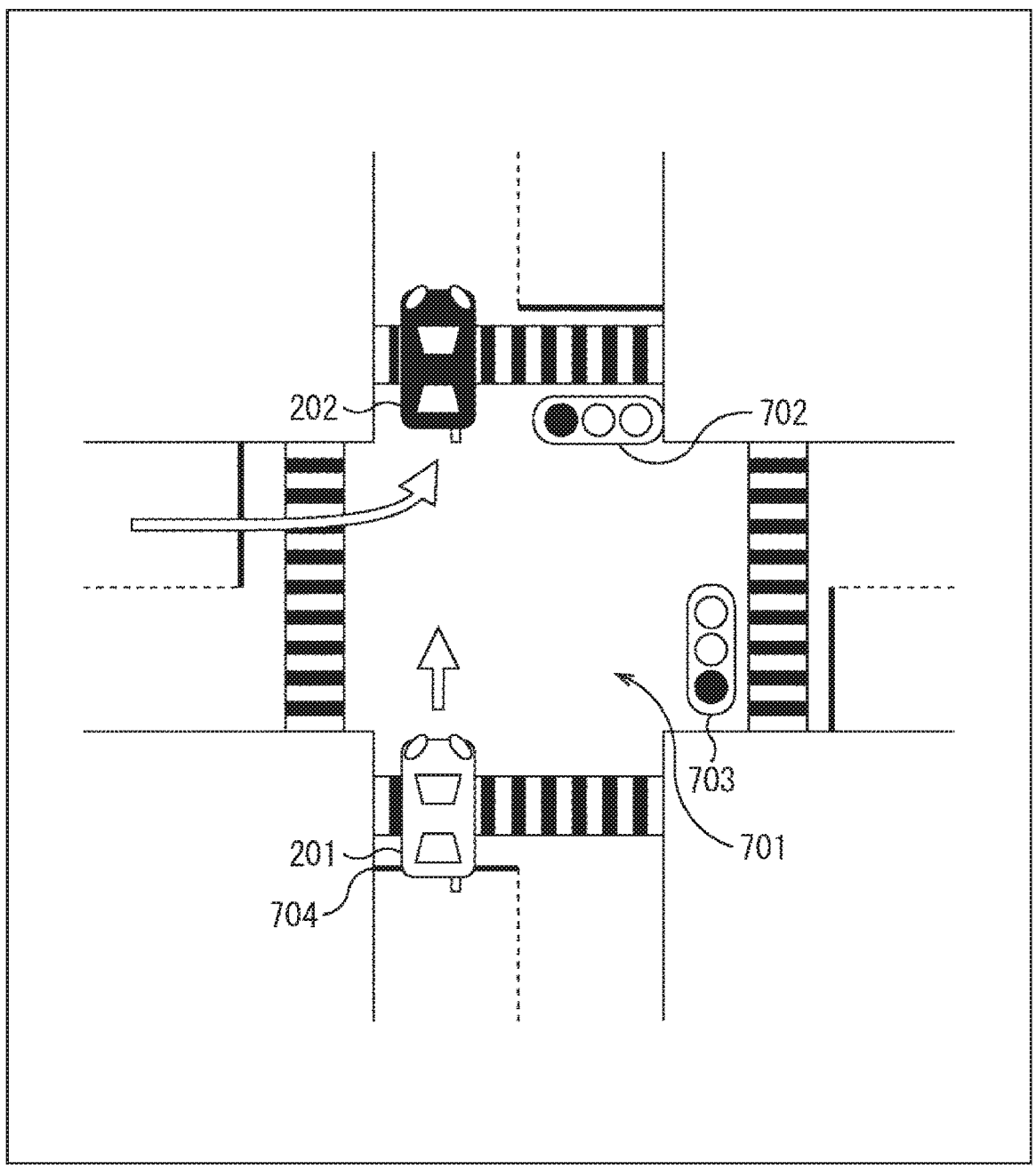
FIG. 48 is a diagram for explaining a specific example of the intersection joining process.
Figure 49:
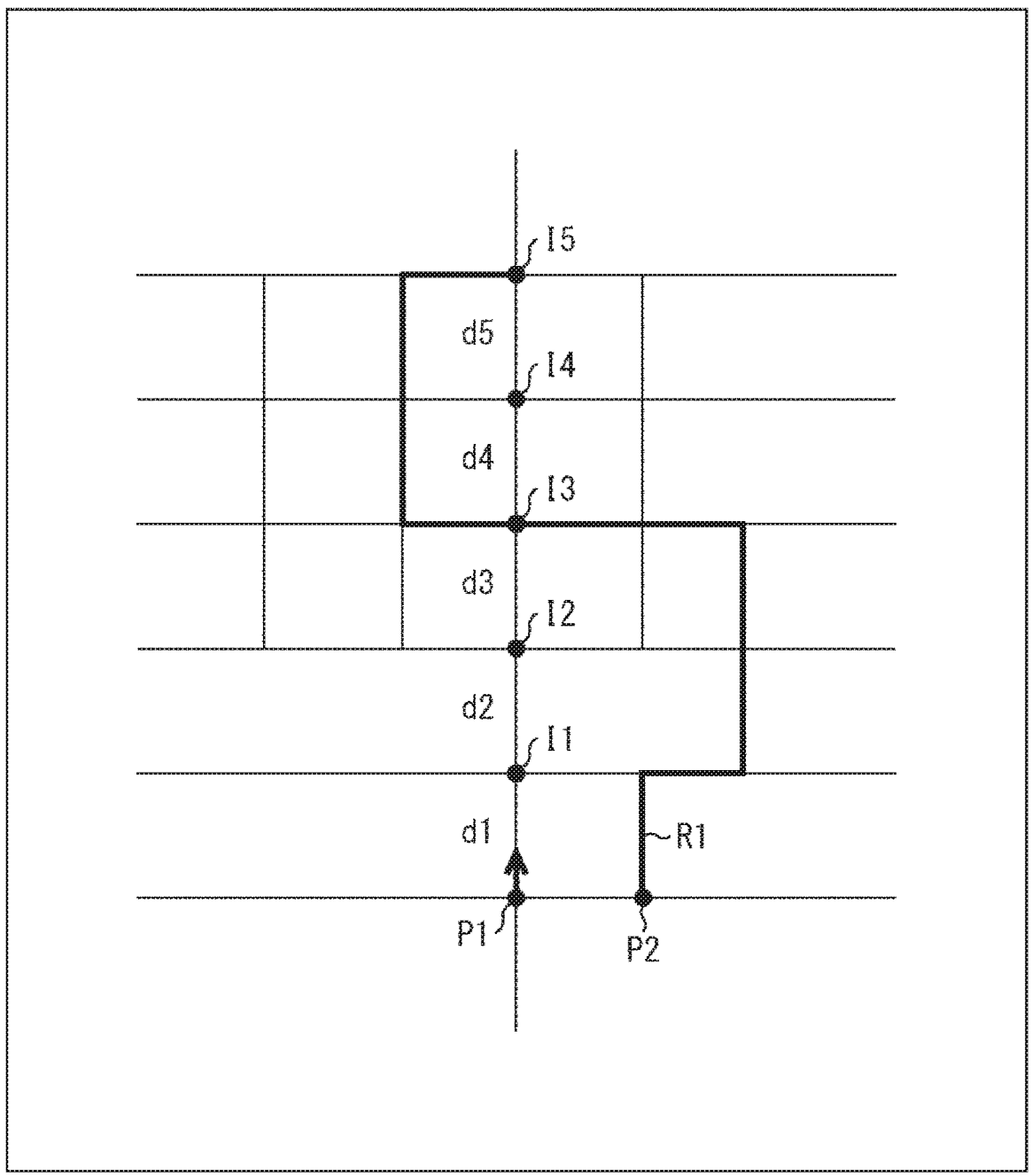
FIG. 49 is a diagram for explaining a specific example of the intersection joining process.

Referring now to FIGS. 48 and 49, an example of a joining intersection setting method is described.

For example, in a case where the user vehicle 201 and the provider vehicle 202 join at an intersection 701 as shown in FIG. 48, a travel plan for the user vehicle 201 and the provider vehicle 202 are made so that the provider vehicle 202 enters the intersection 701 by turning left immediately before the user vehicle 201 enters the intersection 701, and travels in the same direction as the user vehicle 201. Thus, the provider vehicle 202 can travel in the same direction in front of the user vehicle 201, and the user vehicle 201 can follow the provider vehicle 202.

Note that, in an area where vehicles run on the right side, the provider vehicle 202 is planned to enter the intersection 701 by turning right.

For example, as shown in FIG. 49, the current location of the user vehicle 201 is a position P1, the current location of the provider vehicle 202 is a position P2, and the user vehicle 201 is traveling in the direction indicated by an arrow. There also exist intersections I1 through I5 on the route of the user vehicle 201. Further, the distance between the position P1 and the intersection I1 is d1, and the distance between an intersection Ii-1 and an intersection Ii is di. For example, the distance between the intersection I1 and the intersection I2 is d2.

Meanwhile, a predicted velocity of the user vehicle 201 between the position P1 and the intersection I1 is represented by vu1, and a predicted velocity of the user vehicle 201 between the intersection Ii-1 and the intersection Ii is represented by vui. For example, a predicted velocity of the user vehicle 201 between the intersection I1 and the intersection I2 is represented by vu2. Note that a predicted velocity of the user vehicle 201 is determined on the basis of traffic congestion information, velocity limit information, and the like, for example. Further, in a case where the above information cannot be acquired, the average velocity of the user vehicle 201 within the past predetermined period of time is set as the predicted velocity of the user vehicle 201, for example.

Where the number of intersections (including the joining intersection) existing between the current position P1 of the user vehicle 201 to the joining intersection is x, a predicted time Tux required before the user vehicle 201 reaches the joining intersection is calculated according to the expression (5) shown below.

[Mathematical Formula 1]

$$Tux = \sum_{i=1}^{x} \frac{di}{vui} \qquad (5)$$

Further, a route on which the provider vehicle 202 reaches one of the intersections on the route of the user vehicle 201 and enters the intersection from left with respect to the traveling direction of the user vehicle 201 is represented by Rj (j=1 through M). Note that FIG. 49 shows only the route R1. In a right-side driving area, on the other hand, such a route is a route for entering an intersection from right with respect to the traveling direction of the user vehicle 201.

Further, the length of the route Rj is represented by drj, and a predicted velocity of the provider vehicle 202 on the route Rj is represented by vpj. In that case, a predicted time Tpj required for the route Rj of the provider vehicle 202 is calculated according to the expression (6) shown below.

$$Tpj = drj \div vpj \qquad (6)$$

After that, x for minimizing |Tux−Tpj| is calculated, and the intersection that is "x" intersections ahead of the position P1 on the route of the user vehicle 201 is set as the joining intersection.

In step S552, the self-location estimation unit 314 determines whether or not there are traffic lights at the joining intersection. If it is determined that there are traffic lights at the joining intersection, the process moves on to step S553.

In step S553, the user vehicle 201 tries to stop at the front of the joining intersection. For example, in the example shown in FIG. 48, the user vehicle 201 tries to stop at the front of the intersection 701 when a traffic light 702 in the traveling direction of the user vehicle 201 at the intersection 701 is red (stop).

Figure 50:
FIG. 50 is a diagram for explaining a specific example of the intersection joining process.

Referring now to FIG. 50, a specific example of the process in step S553 in the example shown in FIG. 48 is described.

For example, the planning unit 312 calculates the time at which the traffic light 702 changes from yellow to red, on the basis of traffic light information indicating the timing of a change of a traffic light at the intersection 701 and the like. The traffic light information is provided by a server or the like, or is directly provided by the traffic light, for example. The planning unit 312 then acquires time t2, which is closest to time t1 after the predicted required time Tux from the current time t0 till arrival of the user vehicle 201 at the intersection 701, among the times when the traffic light 702 changes from yellow to red. Note that time t2 may be earlier than time t1, but is preferably later than time t1.

The planning unit 312 then calculates the velocity necessary for the user vehicle 201 to reach a stop line 704 in front of the intersection 701 at time t2. Under the control of the operation control unit 315, the user vehicle 201 runs on the route to the intersection 701 at the calculated velocity.

In step S554, the operation control unit 315 determines whether or not the user vehicle 201 has succeeded in stopping at the front at the joining intersection. If it is determined that the user vehicle 201 has succeeded in stopping at the front at the joining intersection, the process moves on to step S556. For example, in the example shown in FIG. 48, in a case where the user vehicle 201 has succeeded in stopping at the front at the intersection 701 when the traffic light 702 turned red, the process moves on to step S556.

If it is determined in step S552 that there are no traffic lights at the joining intersection, on the other hand, the process moves on to step S555.

In step S555, the user vehicle 201 decelerates and enters the joining intersection. That is, under the control of the operation control unit 315, the user vehicle 201 decelerates before the joining intersection, and then enters the joining intersection. For example, in a case where the traffic light 702 and the traffic light 703 do not exist in the example shown in FIG. 48, the user vehicle 201 decelerates before the intersection 701, and then enters the intersection 701.

After that, the process moves on to step S556.

In step S556, it is determined whether or not the user vehicle 201 has succeeded in following the provider vehicle 202, as in the process in step S405 in FIG. 36. If it is determined that the user vehicle 201 has succeeded in following the provider vehicle 202, the process moves on to step S557.

In step S557, the energy reception process described above with reference to FIG. 37 is performed, and the intersection joining process comes to an end.

If it is determined in step S554 that the user vehicle 201 has failed to stop at the front at the joining intersection, or if it is determined in step S556 that the user vehicle 201 has failed to follow the provider vehicle 202, on the other hand, the process moves on to step S558.

In step S558, reception of energy is given up, as in the process in step S507 in FIG. 46.

After that, the intersection joining process comes to an end.

Referring back to FIG. 36, if it is determined in step S409 that the user vehicle 201 is traveling on a road without any intersection, the process moves on to step S411.

In step S411, reception of energy is given up, as in the process in step S507 in FIG. 46. This is a case where the user vehicle 201 is traveling on a single-lane road without any intersection, and it is difficult for the user vehicle 201 to promptly follow the provider vehicle 202 without a route change.

After that, the energy supply/reception service use process comes to an end.

<Energy Supply/Reception Service Provision Process>

Next, a description of an energy supply/reception service provision process to be performed by the provider vehicle 202 in correspondence with the energy supply/reception service use process being performed by the user vehicle 201 as shown in FIG. 36 is described with reference to the flowchart shown in FIG. 51.

In step S601, the service provision unit 365 determines whether or not the user vehicle 201 is following the provider vehicle 202. For example, the service provision unit 365 communicates with the provider vehicle 202 via the communication unit 368 and, if necessary, the network 204, uses the results of estimation of the provider vehicle 202 by the self-location estimation unit 366, or uses external information acquired by the data acquisition unit 102, to detect relative positions of the user vehicle 201 and the provider vehicle 202. If the service provision unit 365 determines that the user vehicle 201 is not following the provider vehicle 202 on the basis of the detection results, the process then moves on to step S602.

Note that this process is performed in correspondence with the process performed by the user vehicle 201 in step S401 in FIG. 36.

In step S602, the service provision unit 365 determines whether or not the user vehicle 201 is running behind the provider vehicle 202. If it is determined that the user vehicle 201 is running behind the provider vehicle 202, the process moves on to step S603.

Note that this process is performed in correspondence with the process performed by the user vehicle 201 in step S402 in FIG. 36.

In step S603, the service provision unit 365 determines whether or not another vehicle exists between the user vehicle 201 and the provider vehicle 202. If it is determined that any other vehicle does not exist between the user vehicle 201 and the provider vehicle 202, the process moves on to step S604.

Note that this process is performed in correspondence with the process performed by the user vehicle 201 in step S403 in FIG. 36.

In step S604, the provider vehicle 202 shortens the distance to the user vehicle 201. Specifically, the operation control unit 367 communicates with the user vehicle 201 via the communication unit 368 and, if necessary, the network 204, and cooperates with the user vehicle 201, to control the velocity and the like of the provider vehicle 202 so that the distance between the two vehicles falls within the service providable range.

Note that this process is performed in correspondence with the process performed by the user vehicle 201 in step S404 in FIG. 36.

In step S605, the service provision unit 365 determines whether or not the user vehicle 201 has succeeded in following the provider vehicle 202. If it is determined that the user vehicle 201 has succeeded in following the provider vehicle 202, the process moves on to step S606.

Note that this process is performed in correspondence with the process performed by the user vehicle 201 in step S405 in FIG. 36.

In step S606, the provider vehicle 202 performs an energy supply process, and the energy supply/reception service provision process comes to an end.

Figure 52:
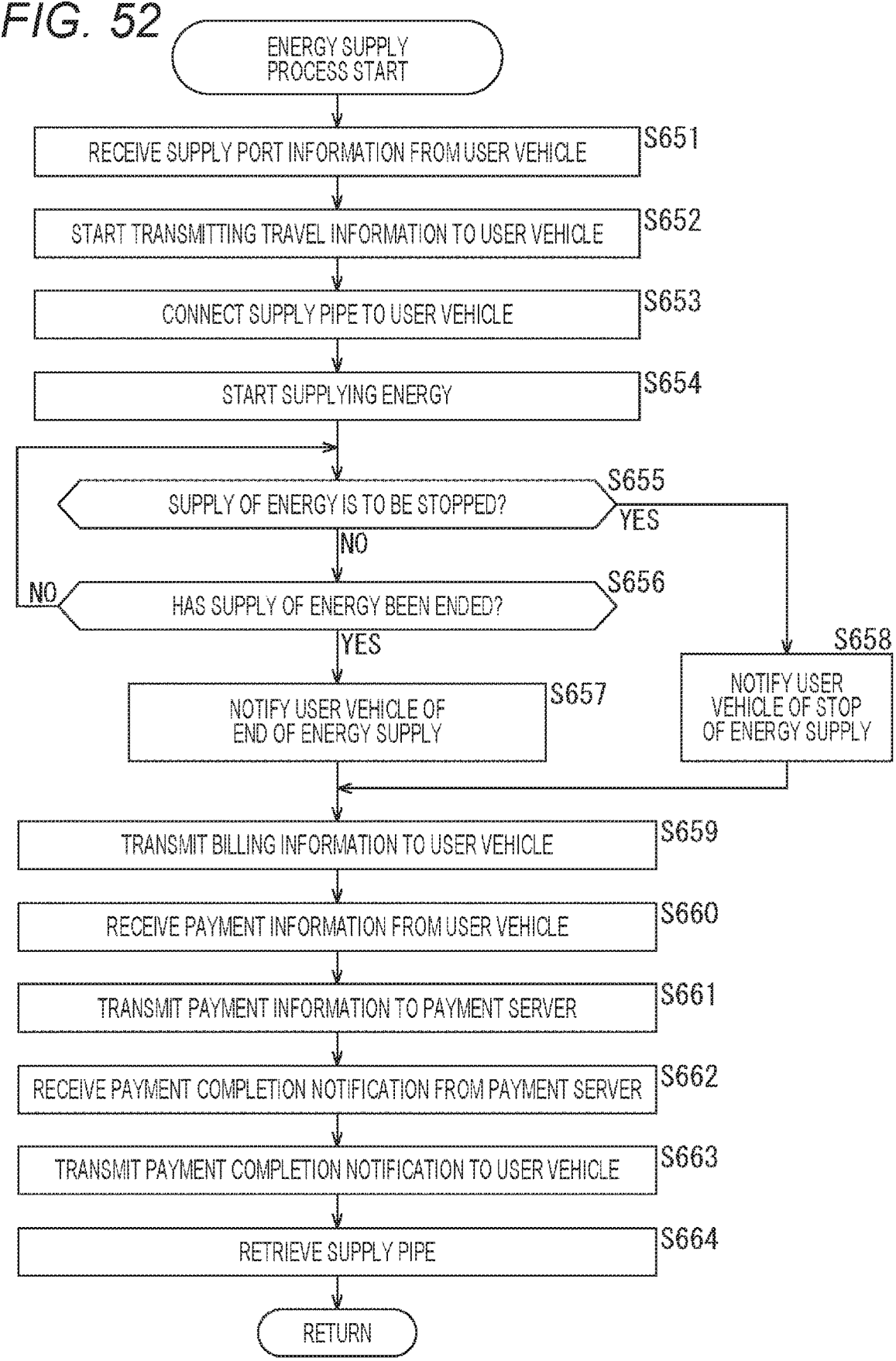
FIG. 52 is a flowchart for explaining an energy supply process in detail.

Referring now to the flowchart in FIG. 52 and the sequence diagram in FIG. 38, the energy supply process is described in detail.

In step S651, the service provision unit 365 receives, via the communication unit 368 and, if necessary, the network 204, the supply port information transmitted from the user vehicle 201 in the process in step S451 in FIG. 37.

In step S652, the provider vehicle 202 starts transmitting travel information to the user vehicle 201. Specifically, the service provision unit 365 generates the travel information described above, and transmits the travel information to the user vehicle 201 via the communication unit 368 and, if necessary, the network 204.

In step S653, the provider vehicle 202 connects the supply pipe to the user vehicle 201. Specifically, the operation control unit 367 communicates with the user vehicle 201 via the communication unit 368 and, if necessary, the network 204, and cooperates with the user vehicle 201, to connect the supply pipe to the supply port of the user vehicle 201.

Note that this process is performed in correspondence with the process performed by the user vehicle 201 in step S454 in FIG. 37.

In step S654, the provider vehicle 202 starts supplying energy. Specifically, the service provision unit 365 communicates with the user vehicle 201 via the communication unit 368 and, if necessary, the network 204, and cooperates with the user vehicle 201, to start supplying energy to the user vehicle 201.

In step S655, the service provision unit 365 determines whether or not to stop the supply of energy. If it is determined that the supply of energy is not to be stopped, the process moves on to step S656.

In step S656, the service provision unit 365 determines whether or not the supply of energy has ended. If it is determined that the supply of energy has not ended, the process returns to step S655.

After that, the processes in step S655 and S656 are repeatedly performed, until it is determined in step S655 that the supply of energy is to be stopped, or until it is determined in step S656 that the supply of energy has ended.

If it is determined in step S656 that the supply of energy has ended, on the other hand, the process moves on to step S657.

In step S657, the service provision unit 365 notifies the user vehicle 201 of the end of the energy supply. Specifically, the service provision unit 365 generates a supply end notification for notifying that the supply of energy has ended, and transmits the supply end notification to the user vehicle 201 via the communication unit 368 and the supply pipe.

After that, the process moves on to step S659.

If it is determined in step S656 that the supply of energy is to be stopped, on the other hand, the process moves on to step S658.

For example, in a case where it is difficult to supply energy from the provider vehicle 202 to the user vehicle 201 or it is difficult for the user vehicle 201 to follow the provider vehicle 202 due to an abnormality in the provider vehicle 202 or the user vehicle 201, a road condition, or the like, it is determined that the supply of energy is to be stopped.

In step S658, the service provision unit 365 notifies the user vehicle 201 of the stop of the energy supply. Specifically, the service provision unit 365 generates a supply stop notification for notifying that the supply of energy is stopped, and transmits the supply stop notification to the user vehicle 201 via the communication unit 368 and the supply pipe.

After that, the process moves on to step S659.

In step S659, the service provision unit 365 transmits billing information to the user vehicle 201. Specifically, the service provision unit 365 generates the billing information described above. The service provision unit 365 transmits the billing information to the user vehicle 201 via the communication unit 368 and the supply pipe.

In step S660, the service provision unit 365 receives, via the communication unit 368 and the supply pipe, the payment information transmitted from the user vehicle 201 in the process in step S459 in FIG. 37.

In step S661, the service provision unit 365 transmits the payment information received from the user vehicle 201 to the payment server 501 via the communication unit 368 and the network 204.

The payment server 501 conducts payment, on the basis of the payment information. The payment server 501 then transmits, via the network 204, a payment completion notification for notifying that the payment has been completed.

In step S662, the service provision unit 365 receives the payment completion notification from the payment server 501 via the communication unit 368 and the network 204.

In step S663, the service provision unit 365 transmits, via the communication unit 368 and the supply pipe, payment information received from the payment server 501 to the user vehicle 201.

In step S664, the provider vehicle 202 retrieves the supply pipe. Specifically, the operation control unit 367 communicates with the user vehicle 201 via the communication unit 368 and the supply pipe, and cooperates with the user vehicle 201, to remove the supply pipe from the supply port of the user vehicle 201 and retrieve the supply pipe.

Note that this process is performed in correspondence with the process performed by the user vehicle 201 in step S461 in FIG. 37.

After that, the energy supply process comes to an end.

Referring back to FIG. 51, if it is determined in step S602 that the user vehicle 201 is not running behind the provider vehicle 202, if it is determined in step S603 that another vehicle exists between the user vehicle 201 and the provider vehicle 202, or if it is determined in S605 that the user vehicle 201 has failed to follow the provider vehicle 202, the process moves on to step S607.

In step S607, the service provision unit 365 determines whether or not there is a plurality of lanes in the traveling direction of the user vehicle 201. If it is determined that there is a plurality of lanes in the traveling direction of the user vehicle 201, the process moves on to step S608.

Note that this process is performed in correspondence with the process performed by the user vehicle 201 in step S407 in FIG. 36.

In step S608, the provider vehicle 202 performs a multiple lane joining process, and the energy supply/reception service provision process comes to an end.

Figure 53:
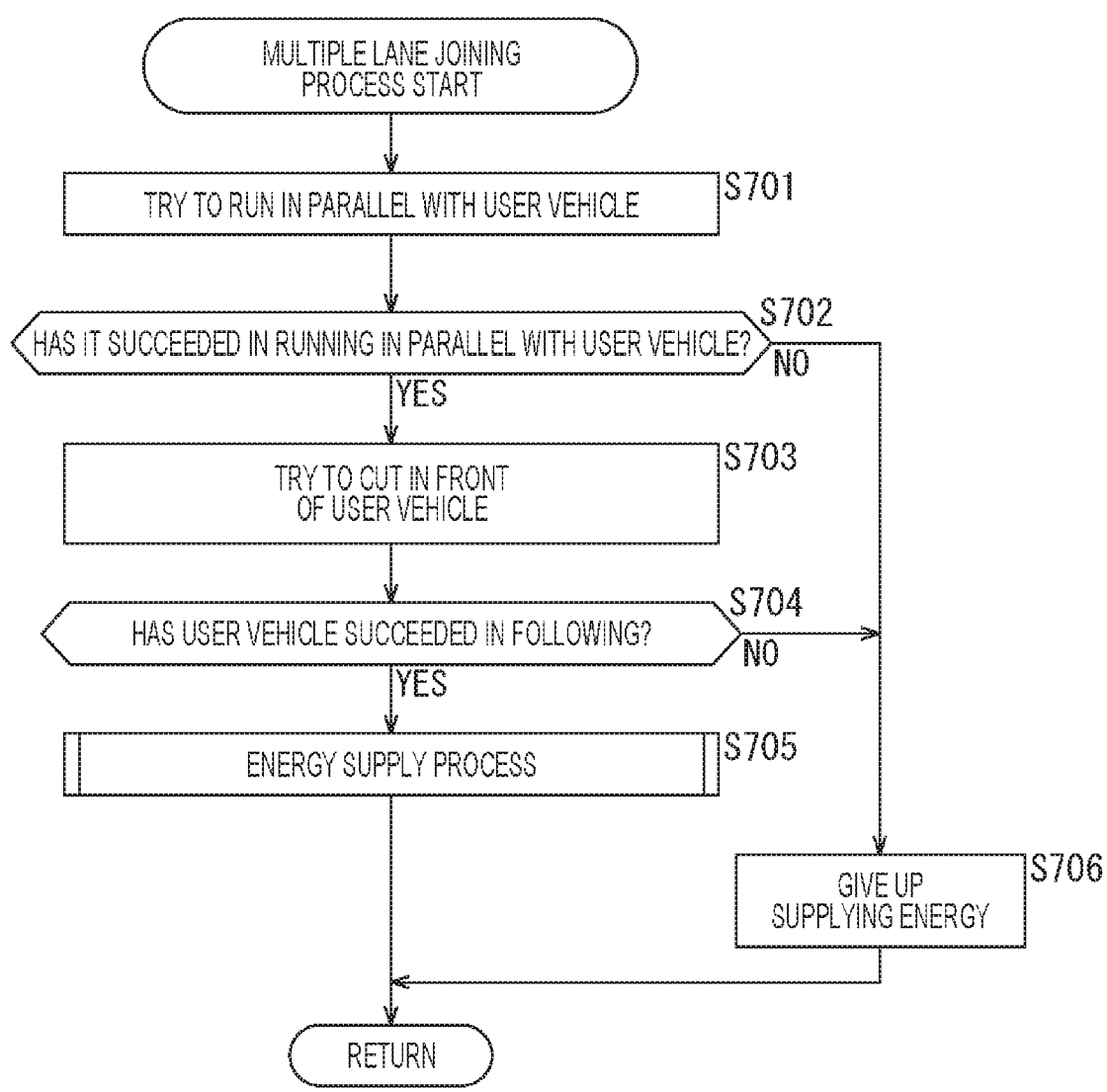
FIG. 53 is a flowchart for explaining a multiple lane joining process in detail.

Referring now to the flowchart in FIG. 53, the multiple lane joining process is described in detail.

In step S701, the provider vehicle 202 attempts to run in parallel with the user vehicle 201.

For example, the planning unit 362 communicates with the user vehicle 201 via the communication unit 368 and, if necessary, the network 204, and cooperates with the user vehicle 201, to set a parallel-running route. The planning unit 362 plans a route, a velocity, and the like so as to reach the parallel-running route at the same time as the user vehicle 201. Under the control of the operation control unit 367, the provider vehicle 202 runs according to the plan made by the planning unit 362.

Note that this process is performed in correspondence with the process performed by the user vehicle 201 in step S501 in FIG. 46.

In step S702, the operation control unit 367 determines whether or not the provider vehicle 202 has succeeded in running in parallel with the user vehicle 201. If it is determined that the provider vehicle 202 has succeeded in running in parallel with the user vehicle 201, the process moves on to step S703.

Note that this process is performed in correspondence with the process performed by the user vehicle 201 in step S502 in FIG. 46.

In step S703, the provider vehicle 202 attempts to cut in front of the user vehicle 201, under the control of the operation control unit 367. For example, the provider vehicle 202 attempts to cut in front of the user vehicle 201 by changing its lane to the traveling lane of the user vehicle 201 after moving slightly ahead of the user vehicle 201 in the state in which the provider vehicle 202 was running in parallel with the user vehicle 201.

Figure 51:
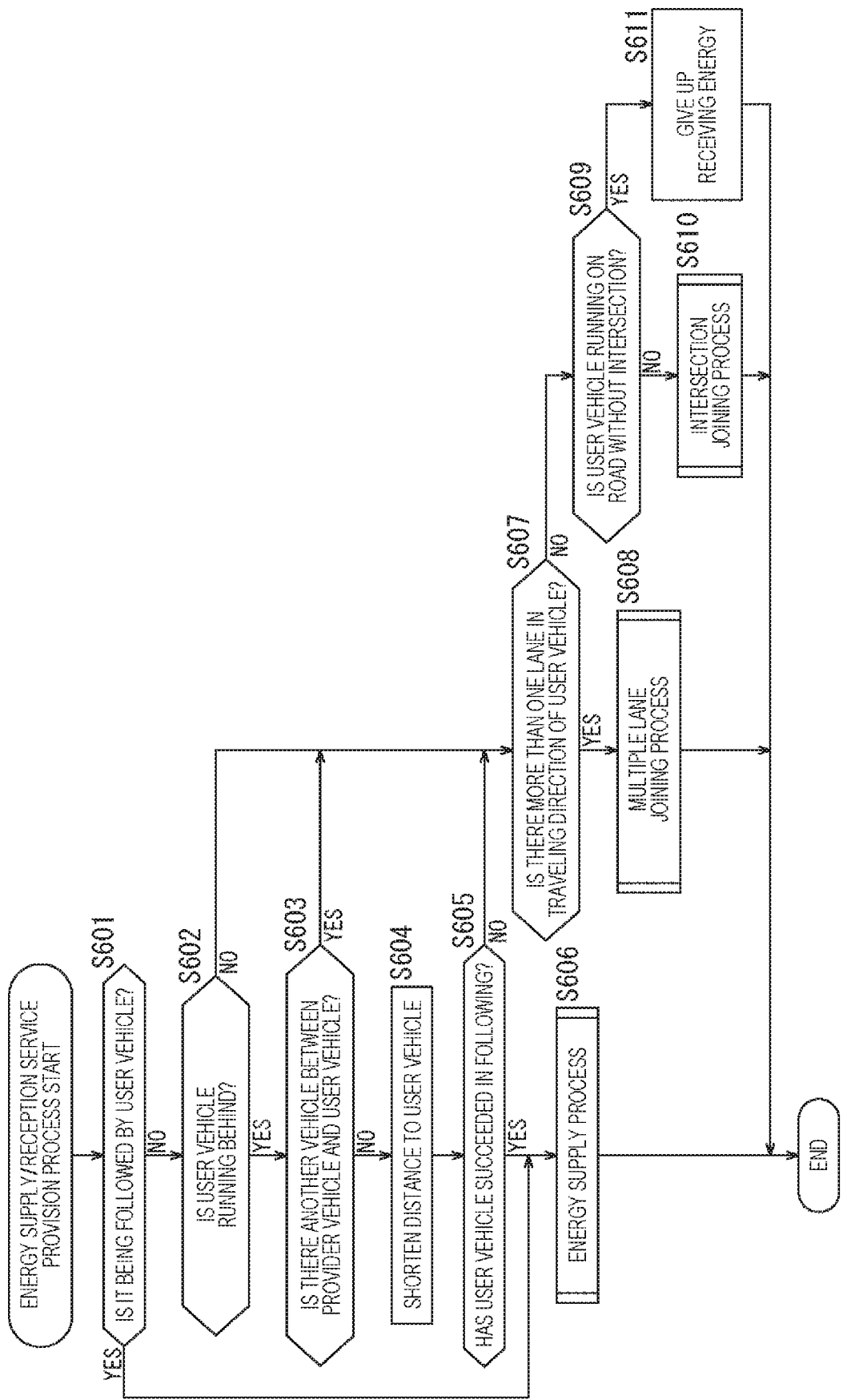
FIG. 51 is a flowchart for explaining an energy supply/reception service provision process.

In step S704, it is determined whether or not the user vehicle 201 has succeeded in following the provider vehicle 202, as in the process in step S605 in FIG. 51. If it is determined that the user vehicle 201 has succeeded in following the provider vehicle 202, the process moves on to step S705.

Note that this process is performed in correspondence with the process performed by the user vehicle 201 in step S505 in FIG. 46.

In step S705, the energy supply process described above with reference to FIG. 52 is performed, and the multiple lane joining process comes to an end.

If it is determined in step S702 that the provider vehicle 202 has failed to run in parallel with the user vehicle 201, or if it is determined in step S704 that the user vehicle 201 has failed to follow the provider vehicle 202, on the other hand, the process moves on to step S706.

In step S706, the provider vehicle 202 gives up supplying energy. For example, the service provision unit 365 communicates with the user vehicle 201 via the communication unit 368 and, if necessary, the network 204, and notifies that the supply of energy to the user vehicle 201 is given up.

After that, the multiple lane joining process comes to an end.

Referring back to FIG. 51, if it is determined in step S607 that there is not a plurality of lanes in the traveling direction of the user vehicle 201, on the other hand, the process moves on to step S609.

In step S609, the planning unit 362 determines whether or not the user vehicle 201 is running on a road without any intersection. The planning unit 362 receives information about the self-location of the user vehicle 201 from the user vehicle 201 via the communication unit 368 and, if necessary, the network 204. If the planning unit 362 determines that the user vehicle 201 is running on a road having an intersection on the basis of the received information, the process then moves on to step S610.

Note that this process is performed in correspondence with the process performed by the user vehicle 201 in step S409 in FIG. 36.

In step S610, the provider vehicle 202 performs an intersection joining process, and the energy supply/reception service provision process comes to an end.

Figure 54:
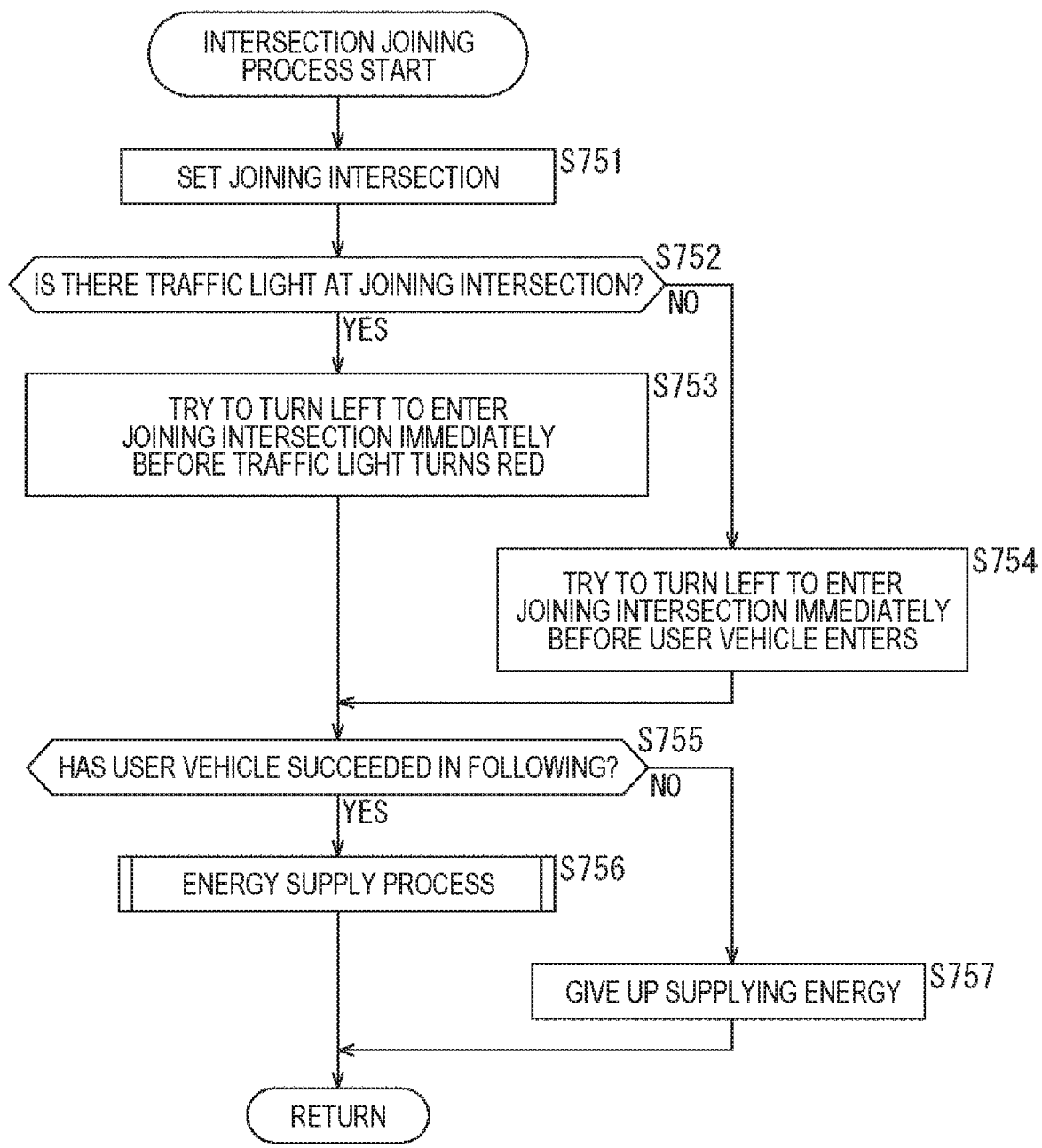
FIG. 54 is a flowchart for explaining an intersection joining process in detail.

Referring now to the flowchart in FIG. 54, the intersection joining process is described in detail.

In step S751, the planning unit 362 sets a joining intersection. Specifically, the planning unit 362 communicates with the user vehicle 201 via the communication unit 368 and, if necessary, the network 204, and cooperates with the user vehicle 201, to set a joining intersection.

Note that this process is performed in correspondence with the process performed by the user vehicle 201 in step S551 in FIG. 47.

In step S752, the self-location estimation unit 366 determines whether or not there are traffic lights at the joining intersection. If it is determined that there are traffic lights at the joining intersection, the process moves on to step S753.

In step S753, the provider vehicle 202 tries to enter the joining intersection by turning left immediately before the traffic light turns red. For example, in the example case shown in FIG. 48, the provider vehicle 202 tries to enter the intersection 701 immediately before the traffic light 703 in the traveling direction of the provider vehicle 202 turns red (stop), and turn left (change of direction).

Referring now to FIG. 50, a specific example of the process in step S753 in the example shown in FIG. 48 is described.

For example, the planning unit 362 communicates with the user vehicle 201 via the communication unit 368 and, if necessary, the network 204, and acquires, from the user vehicle 201, information indicating time t2 at which the traffic light 702 turns red when the user vehicle 201 stops at the intersection 701, and time t3 at which the traffic light 703 turns red again after time t2.

The planning unit 362 then calculates the velocity of the provider vehicle 202 necessary for the provider vehicle 202 to enter the intersection 701 immediately before time t3. Where the distance from the current location of the provider vehicle 202 to the inside of the intersection 701 is represented by dp, for example, the velocity necessary for the provider vehicle 202 to have is dp/(t3−t0). Under the control of the operation control unit 367, the provider vehicle 202 runs on the route to the intersection 701 at the calculated velocity.

After that, the process moves on to step S755.

If it is determined in step S753 that there are no traffic lights at the joining intersection, on the other hand, the process moves on to step S754.

In step S754, the provider vehicle 202 tries to enter the joining intersection by turning left immediately before the user vehicle 201 enters the joining intersection. For example, in a case where the traffic light 702 and the traffic light 703 do not exist in the example shown in FIG. 48, the provider vehicle 202 tries to enter the intersection 701 immediately before the user vehicle 201 enters the intersection 701, then turn left, and travel in the same direction as the user vehicle 201.

For example, the planning unit 362 communicates with the user vehicle 201 via the communication unit 368 and, if necessary, the network 204, and acquires, from the user vehicle 201, information indicating the estimated time of arrival of the user vehicle 201 at the intersection 701. The planning unit 362 then calculates the velocity necessary for the provider vehicle 202 to complete the left turn at the intersection 701 at the predicted arrival time, for example. Under the control of the operation control unit 367, the provider vehicle 202 runs on the route to the intersection 701 at the calculated velocity, and turns left at the intersection 701.

After that, the process moves on to step S755.

In step S755, it is determined whether or not the user vehicle 201 has succeeded in following the provider vehicle 202, as in the process in step S704 in FIG. 51. If it is determined that the user vehicle 201 has succeeded in following the provider vehicle 202, the process moves on to step S756.

Note that this process is performed in correspondence with the process performed by the user vehicle 201 in step S556 in FIG. 47.

In step S756, the energy supply process described above with reference to FIG. 52 is performed, and the intersection joining process comes to an end.

If it is determined in step S755 that the user vehicle 201 has failed to follow the provider vehicle 202, on the other hand, the process moves on to step S757.

In step S757, a notification that the supply of energy to the user vehicle 201 is given up is issued, as in the process in step S706 in FIG. 53.

After that, the intersection joining process comes to an end.

Referring back to FIG. 51, if it is determined in step S609 that the user vehicle 201 is running on a road without any intersection, the process moves on to step S611.

In step S757, a notification that the supply of energy to the user vehicle 201 is given up is issued, as in the process in step S706 in FIG. 53.

After that, the energy supply/reception service provision process comes to an end.

As described above, it is possible to safely and stably supply energy from the provider vehicle 202 to the user vehicle 201.

3. Modifications

The following is a description of modifications of the above described embodiment of the present technology.

The sharing of processing between the provider vehicles 202 and the server 203 is not limited to the above example, and may be changed as appropriate.

For example, the server 203 may not be provided, and each provider vehicle 202 may have the functions of the server 203. In this case, a service is ordered from a user vehicle 201 directly to a provider vehicle 202, for example. In a case where the provider vehicle 202 cannot provide the service, the provider vehicle 202 then searches for another provider vehicle 202 that can provide the service, or requests another provider vehicle 202 to search for a provider vehicle 202 that can provide the service.

Meanwhile, the planning unit 412 of the server 203 may set a joining route between the user vehicle 201 and the provider vehicle 202, and instruct the user vehicle 201 and the provider vehicle 202, for example. Alternatively, the planning unit 412 may set a joining route with the user vehicle 201, and search for a provider vehicle 202 that can provide the service on the joining route. In these cases, the planning unit 412 may plan the route(s) and the velocity (velocities) of the user vehicle 201 and/or the provider vehicle 202.

Further, a single vehicle may have the functions of both a user vehicle 201 and a provider vehicle 202, for example. That is, the single vehicle may be in a position to use a service, and be in a position to provide a service.

Further, a user vehicle 201 and a provider vehicle 202 may be manned or unmanned. Note that, in a case where a user vehicle 201 is unmanned, a service that can be received unattended (such as repair of the user vehicle 201, gasoline supply, or charging, for example) is provided by a provider vehicle 202.

Further, in a case where there is no designation of a desired time for using a service, a route that facilitates provision/reception of the service is preferably set as the joining route. For example, a road having wide lanes, a road having wide shoulders, a road having a long straight line distance, a road having a small traffic volume, a road having a long stoppage time at a traffic light or at a railroad crossing, or the like is preferably set as the joining route.

Further, in a case where a user vehicle 201 and a provider vehicle 202 can stop, the vehicles may stop to provide and receive a service.

Furthermore, in a case where there is enough time or the like, a parking area, a parking lot of a store, or the like may be set as the joining point at which services are provided and received, for example.

Further, a user vehicle 201 and a provider vehicle 202 are basically vehicles that perform self-driving, but the user vehicle 201 may be a vehicle that is manually driven, for example. In this case, the provider vehicle 202 joins the user vehicle 201 in synchronization with the movement of the user vehicle 201, for example, and provides a service. Further, a route and a velocity for joining the provider vehicle 202 may be presented to the driver of the user vehicle 201, for example.

Further, a user vehicle 201 may detect a provider vehicle 202, and receives s service, for example. For example, a user vehicle 201 may detect a provider vehicle 202 by using inter-vehicle communication or on the basis of body information (such as a company name or a logo, for example) about the provider vehicle 202, and receive a service. In this case, the user vehicle 201 may select the provider vehicle 202 in accordance with a predetermined condition, for example. For example, the user vehicle 201 may receive services only from the provider vehicles 202 of a company whose services the user vehicle 201 always uses.

Further, in the energy supply/reception service described above, the provider vehicle 202 may follow the user vehicle 201, for example. In this case, the provider vehicle 202 supplies energy to the user vehicle 201 while following the user vehicle 201 by a method similar to that for the user vehicle 201 described above, for example.

Furthermore, in the multiple lane joining process described above, after the user vehicle 201 and the provider vehicle 202 run in parallel with each other, the user vehicle 201 may change lanes, for example.

Further, in the intersection joining process described above, after the user vehicle 201 and the provider vehicle 202 enter an intersection from different directions, the user vehicle 201 may change directions at the intersection, or both vehicles may change directions, for example.

Furthermore, in a case where the traffic light information cannot be acquired in the intersection joining process, the user vehicle 201 or the provider vehicle 202 may detect the timing of change of the traffic light through image recognition, for example. Alternatively, the user vehicle 201 or the provider vehicle 202 may acquire a database indicating the timing of change of each traffic signal at each place and the like, for example.

Further, in the energy supply/reception service, the provider vehicle 202 and the user vehicle 201 may transfer energy while running side by side in a lateral direction, instead of running while one following the other as described above, for example.

Furthermore, in a case where the user vehicle 201 detects the provider vehicle 202 in the energy supply/reception service, the user vehicle 201 may transmits the route information about the user vehicle 201 to the provider vehicle 202 before or after the connection of the supply pipe, for example.

Further, in the example described above, the user vehicle 201 and the provider vehicle 202 conduct payment via the payment server 501, but payment may be conducted without the payment server 501.

Furthermore, the method for following between the provider vehicle 202 and the user vehicle 201 may also be applied to services other than the energy supply/reception service.

Moreover, the type of vehicle to which the present technology can be applied is not limited to any particular type. Further, the present technology can be applied not only to the example vehicles described above, but also in cases where services are provided and received between various kinds of mobile units, such as personal mobility, airplanes, ships, construction machines, agricultural machines (tractors), and the like. Further, mobile units to which the present technology can be applied include mobile units that are remotely driven (operated) by users who are not on board, such as drones and robots, for example. In this case, a movement plan (such as a travel plan or a flight plan, for example) for a mobile unit is made so that service provision/reception can be conducted, for example. Furthermore, the present technology can also be applied in cases where services are provided and received between different types of mobile units.

4. Other Aspects

<Example Configuration of a Computer>

The series of processes described above can be performed by hardware, and can also be performed by software. In a case where the series of processes are to be performed by software, the program that form the software is installed into a computer. Here, the computer may be a computer incorporated into special-purpose hardware, a general-purpose personal computer that has various kinds of programs installed thereinto and thus is capable of executing various kinds of functions, or the like, for example.

Figure 55:
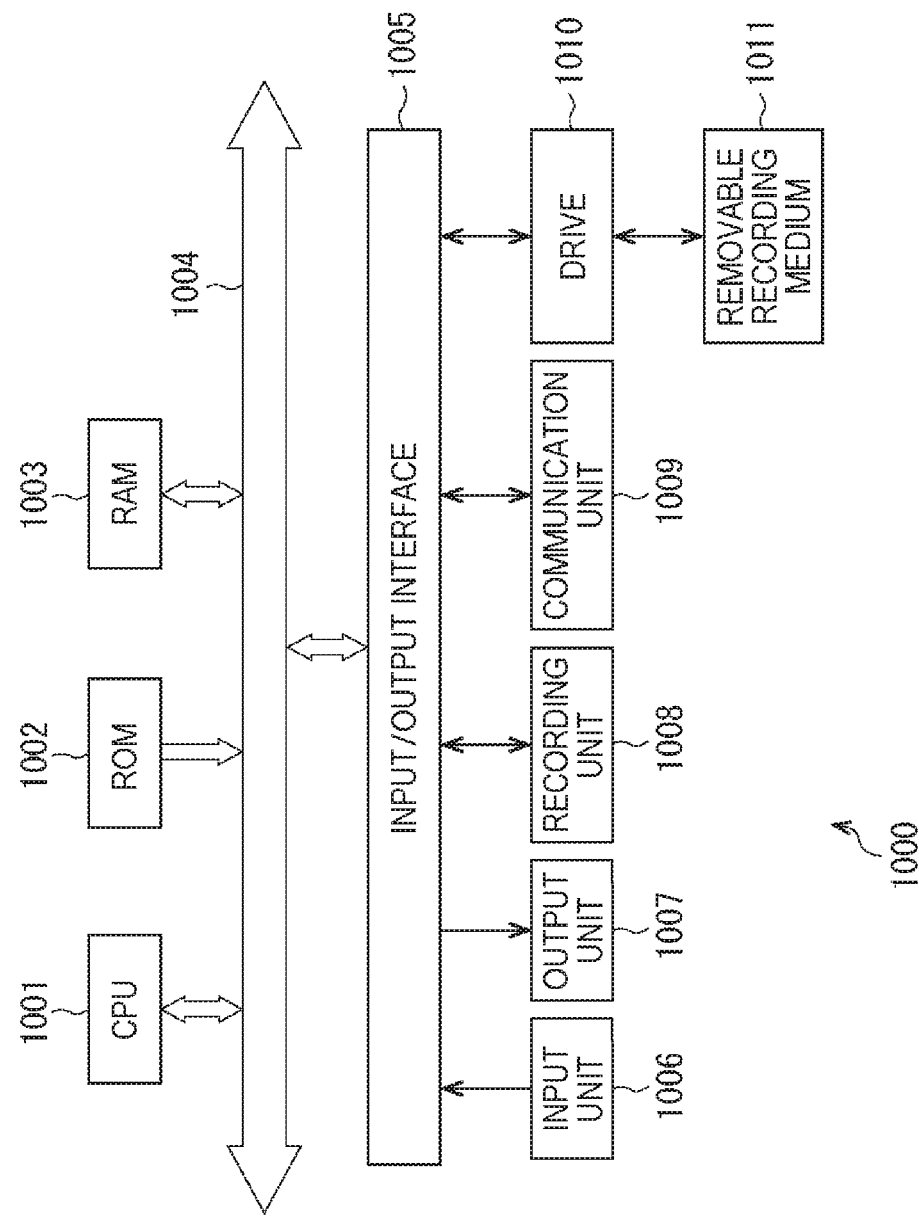
FIG. 55 is a diagram showing an example configuration of a computer.

FIG. 55 is a block diagram showing an example configuration of the hardware of a computer that performs the above described series of processes in accordance with a program.

In a computer 1000, a central processing unit (CPU) 1001, a read only memory (ROM) 1002, and a random access memory (RAM) 1003 are connected to one another by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 is formed with an input switch, a button, a microphone, an imaging element, and the like. The output unit 1007 is formed with a display, a speaker, and the like. The recording unit 1008 is formed with a hard disk, a nonvolatile memory, or the like. The communication unit 1009 is formed with a network interface or the like. The drive 1010 drives a removable recording medium 1011 such as a magnetic disc, an optical disc, a magneto optical disc, or a semiconductor memory.

In the computer 1000 having the above configuration, the CPU 1001 loads a program recorded in the recording unit 1008 into the RAM 1003 via the input/output interface 1005 and the bus 1004, for example, and executes the program, so that the series of processes described above are performed.

The program to be executed by the computer 1000 (the CPU 1001) may be recorded on the removable recording medium 1011 as a packaged medium or the like, for example, and be then provided. Alternatively, the program can be provided via a wired or wireless transmission medium, such as a local area network, the Internet, or digital satellite broadcasting.

In the computer 1000, the program can be installed into the recording unit 1008 via the input/output interface 1005 when the removable recording medium 1011 is mounted on the drive 1010. The program can also be received by the communication unit 1009 via a wired or wireless transmission medium, and be installed into the recording unit 1008. Alternatively, the program may be installed beforehand into the ROM 1002 or the recording unit 1008.

Note that the program to be executed by the computer may be a program for performing processes in chronological order in accordance with the sequence described in this specification, or may be a program for performing processes in parallel or performing a process when necessary, such as when there is a call.

Also, in this specification, a system means an assembly of plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Further, embodiments of the present technology are not limited to the above described embodiments, and various modifications may be made to them without departing from the scope of the present technology.

For example, the present technology may be embodied in a cloud computing configuration in which one function is shared among a plurality of devices via a network, and processing is performed by the devices cooperating with one another.

Further, the respective steps described with reference to the flowcharts described above may be carried out by one device or may be shared among a plurality of devices.

Furthermore, in a case where a plurality of processes is included in one step, the plurality of processes included in the one step may be performed by one device or may be shared among a plurality of devices.

<Example Combinations of Configurations>

The present technology may also be embodied in the configurations described below.

(1)

An information processing device including:

a planning unit that sets a joining route on the basis of information about at least one of a planned route of a user mobile unit that is a mobile unit to use a service or a planned route of a provider mobile unit that is a mobile unit to provide the service, the joining route being a zone for the user mobile unit and the provider mobile unit to receive and provide the service, and makes a movement plan including at least one of a route plan for the user mobile unit or a route plan for the provider mobile unit in accordance with the joining route; and a service provision unit that controls provision of the service so that the user mobile unit and the provider mobile unit receive and provide the service while moving on the joining route.

(2)

The information processing device according to (1), in which the mobile unit is a vehicle, and the service provision unit controls provision of the service so that the provider mobile unit and the user mobile unit provide and receive the service while running with one following the other or side by side.

(3)

The information processing device according to (2), in which the planning unit makes the movement plan so that the provider mobile unit and the user mobile unit enter an intersection from different directions, at least one of the provider mobile unit or the user mobile unit changes directions at the intersection, and the provider mobile unit and the user mobile unit travel in the same direction.

(4)

The information processing device according to (2), in which the planning unit makes the movement plan so that, after the provider mobile unit and the user mobile unit run side by side, at least one of the provider mobile unit or the user mobile unit changes lanes, and the provider mobile unit and the user mobile unit run with one following the other, and the service provision unit controls provision of the service so that the provider mobile unit and the user mobile unit provide and receive the service while running with one following the other.

(5)

The information processing device according to any one of (1) to (4), further including:

a search unit that searches for another provider mobile unit that provides the service; and a request unit that request the another provider mobile unit found through the search to provide the service.

(6)

The information processing device according to (5), in which when handing over provision of the service to the another provider mobile unit, the service provision unit provides the another provider mobile unit with what is to be used in providing the service.

(7)

The information processing device according to any one of (1) to (6), in which when taking over provision of the service from the another provider mobile unit, the service provision unit acquires, from the another provider mobile unit, what is to be used in providing the service.

(8)

The information processing device according to any one of (1) to (7), further including an operation control unit that controls operation of the provider mobile unit so that the provider mobile unit joins the user mobile unit on the joining route, in which on the basis of motion information about motion of the user mobile unit, the planning unit makes the movement plan to cause the user mobile unit to follow the provider mobile unit, and, in accordance with the movement plan, the operation control unit causes the user mobile unit to follow the provider mobile unit.

(9)

The information processing device according to any one of (1) to (8), in which the service provision unit provides the user mobile unit with motion information about motion of the provider mobile unit.

(10)

The information processing device according to any one of (1) to (9), in which the movement plan further includes at least one of a plan of a velocity of the user mobile unit or a plan of a velocity of the provider mobile unit in accordance with the joining route.

(11)

The information processing device according to any one of (1) to (10), further including a request unit that requests the provider mobile unit to provide the service.

(12)

The information processing device according to (11), in which the request unit selects the provider mobile unit to be requested to provide the service, on the basis of at least one of evaluation items including a fee for the service, flexibility of a route on which the provider mobile unit can move, a time required for the provider mobile unit to join the user mobile unit, a load amount of the provider mobile unit, a level of the service of the provider mobile unit, or difficulty for the provider mobile unit to provide the service.

(13)

The information processing device according to (11) or (12), further including a mobile unit search unit that searches for the provider mobile unit that provides the service, in which the request unit requests the provider mobile unit found through the search to provide the service.

(14)

The information processing device according to any one of (1) to (13), in which the planning unit sets the joining route on a route of the user mobile unit.

(15)

The information processing device according to (14), in which when the joining route is not to be set on the route of the user mobile unit, the planning unit sets the joining route on a route of the provider mobile unit, or on a route that is neither the route of the user mobile unit nor the route of the provider mobile unit.

(16)

An information processing method implemented by an information processing device, the information processing method including:

setting a joining route on the basis of information about at least one of a planned route of a user mobile unit that is a mobile unit to use a service or a planned route of a provider mobile unit that is a mobile unit to provide the service, the joining route being a zone for the user mobile unit and the provider mobile unit to receive and provide the service, and making a movement plan including at least one of a route plan for the user mobile unit or a route plan for the provider mobile unit in accordance with the joining route; and controlling provision of the service so that the user mobile unit and the provider mobile unit receive and provide the service while moving on the joining route.

(17)

A program for causing a computer to perform a process including:

setting a joining route on the basis of information about at least one of a planned route of a user mobile unit that is a mobile unit to use a service or a planned route of a provider mobile unit that is a mobile unit to provide the service, the joining route being a zone for the user mobile unit and the provider mobile unit to receive and provide the service, and making a movement plan including at least one of a route plan for the user mobile unit or a route plan for the provider mobile unit in accordance with the joining route; and controlling provision of the service so that the user mobile unit and the provider mobile unit receive and provide the service while moving on the joining route.

(18)

A mobile unit including:

a planning unit that sets a joining route on the basis of information about at least one of a planned route of a user mobile unit that is a mobile unit to use a service or a planned route of the mobile unit, the joining route being a zone for performing provision/reception of the service with the user mobile unit, and makes a movement plan including a route plan in accordance with the joining route; and a service provision unit that controls provision of the service so that provision/reception of the service is conducted while the mobile unit is moving together with the user mobile unit on the joining route.

(19)

A mobile unit including:

a planning unit that sets a joining route on the basis of information about at least one of a planned route of a provider mobile unit that is a mobile unit to provide a service or a planned route of the mobile unit, the joining route being a zone for performing provision/reception of the service with the provider mobile unit, and makes a movement plan including a route plan in accordance with the joining route; and a service use unit that controls use of the service so that provision/reception of the service is conducted while the mobile unit is moving together with the provider mobile unit on the joining route.

(20)

The mobile unit according to (19), further including an operation control unit that controls an operation so that the mobile unit joins the provider mobile unit on the joining route, in which on the basis of motion information about motion of the provider mobile unit, the planning unit makes the movement plan to cause the mobile unit to follow the provider mobile unit, and, in accordance with the movement plan, the operation control unit controls an operation to cause the mobile unit to follow the provider mobile unit.

Note that the advantageous effects described in this specification are merely examples, and the advantageous effects of the present technology are not limited to them and may include other effects.

REFERENCE SIGNS LIST

10 Vehicle
100 Vehicle control system
102 Data acquisition unit
105 Output control unit
106 Output unit
132 Self-location estimation unit
133 Situation analysis unit
135 Operation control unit
141 External information detection unit
162 Action planning unit
163 Operation planning unit
200 Service provision/reception system
201-1 through 201-m User vehicle
202-1 through 202-n Provider vehicle
203 Server
204 Network
301 Service use processing unit
311 Order unit
312 Planning unit
313 Service use unit
314 Self-location estimation unit
315 Operation control unit
351 Service provision processing unit
361 Order reception unit
362 Planning unit
363 Vehicle search unit
364 Request unit
365 Service provision unit
366 Self-location estimation unit
367 Operation control unit
401 Service distribution processing unit
411 Order reception unit
412 Planning unit
413 Vehicle search unit
414 Request unit

The invention claimed is:

1. An information processing device, comprising:
a processor configured to:
set a joining route based on information about at least one of
a planned route of a user mobile unit that uses a service, or
a planned route of a first provider mobile unit that provides the service, wherein the joining route is a zone for the user mobile unit and the first provider mobile unit to receive and provide the service;

generate a movement plan including at least one of a route plan for the user mobile unit or a route plan for the first provider mobile unit based on the joining route and motion information about motion of the first provider mobile unit, wherein the motion information includes brake information of the first provider mobile unit and lane change information of the first provider mobile unit;

control an operation of the first provider mobile unit so that the first provider mobile unit joins the user mobile unit on the joining route;

control, based on the movement plan, the user mobile unit to follow the first provider mobile unit; and control provision of the service so that the user mobile unit and the first provider mobile unit receive and provide the service in a state in which the user mobile unit and the first provider mobile unit move on the joining route.

2. The information processing device according to claim 1, wherein each of the user mobile unit and the first provider mobile unit is a vehicle, and the processor is further configured to control the provision of the service so that the first provider mobile unit and the user mobile unit provide and receive the service in one of a state in which the first provider mobile unit and the user mobile unit run side by side, a state in which the user mobile unit follows the first provider mobile unit, or a state in which the first provider mobile unit follows the user mobile unit.

3. The information processing device according to claim 2, wherein the processor is further configured to generate the movement plan so that the first provider mobile unit and the user mobile unit enter an intersection from different directions, at least one of the first provider mobile unit or the user mobile unit changes directions at the intersection, and the first provider mobile unit and the user mobile unit travel in the same direction.

4. The information processing device according to claim 2, wherein the processor is further configured to:

generate the movement plan so that, after the first provider mobile unit and the user mobile unit run side by side, at least one of the first provider mobile unit or the user mobile unit changes lanes, and one of the first provider mobile unit follows the user mobile unit run or the user mobile unit follows the first provider mobile unit; and control the provision of the service so that the first provider mobile unit and the user mobile unit provide and receive the service with the one of the first provider mobile unit following the user mobile unit or the user mobile unit following the first provider mobile unit.

5. The information processing device according to claim 1, wherein the processor is further configured to:

search a second provider mobile unit that provides the service; and request the second provider mobile unit to provide the service.

6. The information processing device according to claim 5, wherein the processor is further configured to provide, based on a handover of the provision of the service to the second provider mobile unit, information associated with the service to the second provider mobile unit.

7. The information processing device according to claim 1, wherein the processor is further configured to acquire, based on a takeover of the provision of the service from a second provider mobile unit, information associated with the service from the second provider mobile unit.

8. The information processing device according to claim 1, wherein the processor is further configured to provide the user mobile unit with the motion information about the motion of the first provider mobile unit.

9. The information processing device according to claim 1, wherein the movement plan further includes at least one of a plan of a velocity of the user mobile unit or a plan of a velocity of the first provider mobile unit based on the joining route.

10. The information processing device according to claim 1, wherein the processor is further configured to request the first provider mobile unit to provide the service.

11. The information processing device according to claim 10, wherein the processor is further configured to select the first provider mobile unit to provide the service, and the selection of the first provider mobile unit is based on at least one of evaluation items including a fee for the service, flexibility of a route on which the first provider mobile unit can move, a time required for the first provider mobile unit to join the user mobile unit, a load amount of the first provider mobile unit, a level of the service of the first provider mobile unit, or difficulty for the first provider mobile unit to provide the service.

12. The information processing device according to claim 10, wherein the processor is further configured to:

search for the first provider mobile unit that provides the service; and request the first provider mobile unit found through the search to provide the service.

13. The information processing device according to claim 1, wherein the processor is further configured to set the joining route on a route of the user mobile unit.

14. The information processing device according to claim 13, wherein the processor is further configured to set, in a case where the joining route is not to be set on the route of the user mobile unit, the joining route on one of a route of the first provider mobile unit, or on a route different from each of the route of the user mobile unit and the route of the first provider mobile unit.

15. An information processing method implemented by an information processing device, the information processing method comprising:

setting a joining route based on information about at least one of a planned route of a user mobile unit that uses a service, or a planned route of a provider mobile unit that provides the service, wherein the joining route is a zone for the user mobile unit and the provider mobile unit to receive and provide the service;

generating a movement plan including at least one of a route plan for the user mobile unit or a route plan for the provider mobile unit based on the joining route and motion information about motion of the provider mobile unit, wherein the motion information includes brake information of the provider mobile unit and lane change information of the provider mobile unit;

controlling an operation of the provider mobile unit so that the provider mobile unit joins the user mobile unit on the joining route;

controlling, based on the movement plan, the user mobile unit to follow the provider mobile unit; and controlling provision of the service so that the user mobile unit and the provider mobile unit receive and provide the service while moving on the joining route.

16. A non-transitory computer-readable medium having stored thereon, computer-executable instructions which, when executed by a computer, cause the computer to execute operations, the operations comprising:

setting a joining route based on information about at least one of a planned route of a user mobile unit that uses a service, or a planned route of a provider mobile unit that provides the service, wherein the joining route is a zone for the user mobile unit and the provider mobile unit to receive and provide the service;

generating a movement plan including at least one of a route plan for the user mobile unit or a route plan for the provider mobile unit based on the joining route and motion information about motion of the provider mobile unit, wherein the motion information includes brake information of the provider mobile unit and lane change information of the provider mobile unit;

controlling an operation of the provider mobile unit so that the provider mobile unit joins the user mobile unit on the joining route;

controlling, based on the movement plan, the user mobile unit to follow the provider mobile unit; and controlling provision of the service so that the user mobile unit and the provider mobile unit receive and provide the service while moving on the joining route.

17. A mobile unit, comprising:

a processor configured to:

set a joining route based on a basis of information about at least one of a planned route of a user mobile unit that uses a service, or a planned route of the mobile unit, wherein the joining route is a zone for provision of the service to the user mobile unit;

generate a movement plan including a route plan based on the joining route and motion information about motion of the mobile unit, wherein the motion information includes brake information of the mobile unit and lane change information of the mobile unit;

execute a specific operation so that the mobile unit joins the user mobile unit on the joining route;

control, based on the movement plan, the mobile unit to follow the user mobile unit; and control the provision of the service to the user mobile unit in a state in which the mobile unit moves together with the user mobile unit on the joining route.

18. A mobile unit, comprising:

a processor configured to:

set a joining route based on information about at least one of a planned route of a provider mobile unit that provides a service, or a planned route of the mobile unit, wherein the joining route is a zone for reception of the service from the provider mobile unit;

generate a movement plan including a route plan based on the joining route and motion information about motion of the provider mobile unit, wherein the motion information includes brake information of the provider mobile unit and lane change information of the provider mobile unit;

control an operation of the mobile unit so that the mobile unit joins the provider mobile unit on the joining route;

control, based on the movement plan, the mobile unit to follow the provider mobile unit; and control the reception of the service in a state in which the mobile unit moves together with the provider mobile unit on the joining route.

\* \* \* \* \*